US012594739B2

(12) United States Patent
Cheich et al.

(10) Patent No.: US 12,594,739 B2
(45) Date of Patent: Apr. 7, 2026

(54) DUNNAGE CONVERSION MACHINE AND METHOD

(71) Applicant: Ranpak Corp., Concord Township, OH (US)

(72) Inventors: Robert C. Cheich, Independence, OH (US); Steven M. Toneff, Painesville, OH (US); Hubertus J.M. Cals, Maastricht (NL); Raimond P.M. Demers, Landgraaf (NL); Ronny Hubertus Joseph Hendrix, Urmond (NL); Johannes Hermanus Wilhelmus Driehuijs, Sittard (NL); Stephen Louis Dominak, Brecksville, OH (US); Alexandra Snijders, Kerkrade (NL); Carrie A. Schlegel, Ashtabula, OH (US); Thomas Bayt, Jefferson, OH (US); Kevin W. Park, Chardon, OH (US); Dennis Wagner, Painesville, OH (US)

(73) Assignee: Ranpak Corp., Concord Township, OH (US)

( * ) Notice: Subject to any disclaimer, the term of this patent is extended or adjusted under 35 U.S.C. 154(b) by 0 days.

(21) Appl. No.: 18/884,206

(22) Filed: Sep. 13, 2024

(65) Prior Publication Data

US 2025/0018677 A1 Jan. 16, 2025

Related U.S. Application Data

(62) Division of application No. 18/303,153, filed on Apr. 19, 2023, now Pat. No. 12,115,751, which is a (Continued)

(51) Int. Cl.
*B31D 5/00* (2017.01)

(52) U.S. Cl.
CPC ................................. *B31D 5/0047* (2013.01)

(58) Field of Classification Search
None
See application file for complete search history.

(56) References Cited

U.S. PATENT DOCUMENTS 2,882,802 A 4/1959 Walker
3,586,006 A 6/1971 Wendt
(Continued)

FOREIGN PATENT DOCUMENTS

CN 1147226 A 4/1997
CN 101970221 A 2/2011
(Continued)

OTHER PUBLICATIONS

International Search Report and Written Opinion mailed Nov. 29, 2017, for priority International Patent Application No. PCT/US2017/040168.
(Continued)

*Primary Examiner* — Tanzim Imam
(74) *Attorney, Agent, or Firm* — Renner, Otto, Boisselle & Sklar, LLP

(57) ABSTRACT

A conversion assembly for a dunnage conversion machine includes both a downstream pair of rotatable members and an upstream pair of rotatable members upstream of the downstream rotatable members. The downstream rotatable members include a pair of gears, and each gear has a plurality of teeth and is rotatable about a respective axis. The gears are positioned so that the teeth of one gear are sequentially interlaced with the teeth of the other gear as the gears rotate. The upstream rotatable members include a pair of feed wheels, and the gears and the feed wheels define a path for a sheet stock material from between the upstream pair of feed wheels to between the downstream pair of gears.
(Continued)

The rate at which the sheet stock material is advanced by the feed wheels is the same as the rate at which the sheet stock material is advanced by the gears.

8 Claims, 51 Drawing Sheets

Related U.S. Application Data division of application No. 17/455,369, filed on Nov. 17, 2021, now Pat. No. 11,780,202, which is a division of application No. 16/314,185, filed as application No. PCT/US2017/040168 on Jun. 30, 2017, now abandoned.

(60) Provisional application No. 62/357,322, filed on Jun. 30, 2016.

(56) References Cited

U.S. PATENT DOCUMENTS

| | | | | |
|---|---|---|---|---|
| 4,116,399 | A | 9/1978 | Mosburger et al. | |
| 4,968,291 | A | 11/1990 | Baldacci et al. | |
| 5,713,825 | A * | 2/1998 | Ratzel | B31F 1/0067 347/14 |
| 5,755,656 | A | 5/1998 | Beierlorzer | |
| 5,836,538 | A * | 11/1998 | Lencoski | B65H 16/06 242/399.1 |
| 5,906,569 | A | 5/1999 | Ratzel | |
| 6,387,029 | B1 | 5/2002 | Lencoski | |
| 6,699,167 | B2 * | 3/2004 | Manley | B31D 5/0047 493/464 |
| 7,041,043 | B2 * | 5/2006 | Lucassen | B31D 5/0047 493/464 |
| 7,955,245 | B2 | 6/2011 | Cheich et al. | |
| 8,348,818 | B2 | 1/2013 | Mierzejewski et al. | |
| 2006/0040817 | A1 | 2/2006 | Ratzel et al. | |
| 2007/0021286 | A1 | 1/2007 | Kobben et al. | |
| 2008/0200325 | A1 | 8/2008 | Harding | |
| 2009/0082187 | A1 | 3/2009 | Cheich et al. | |
| 2011/0061986 | A1 | 3/2011 | Orsini et al. | |
| 2011/0218089 | A1 * | 9/2011 | Demers | B31D 5/0047 493/338 |
| 2011/0295409 | A1 | 12/2011 | Mierzejewski et al. | |
| 2014/0162024 | A1 | 6/2014 | Deis et al. | |

FOREIGN PATENT DOCUMENTS

| | | | |
|---|---|---|---|
| EP | 2295355 | A2 | 3/2011 |
| JP | H03502671 | A | 6/1991 |
| JP | 2003508269 | A | 3/2003 |
| JP | 2013530068 | A | 7/2013 |
| WO | 95/24298 | A1 | 9/1995 |
| WO | 01/17763 | A2 | 3/2001 |

OTHER PUBLICATIONS

International Preliminary Report on Patentability issued Jan. 1, 2019, for priority International Patent Application No. PCT/US2017/040168.

Translation of First Chinese Office Action issued Mar. 23, 2020, for corresponding Chinese Patent Application No. 2017800535361.

European Office Action issued May 7, 2020, for corresponding European Patent Application No. 17745217.4.

Office Action issued Jan. 31, 2022, for co-pending Canadian Patent Application No. 3,088,636.

Search Report issued Feb. 25, 2022, for corresponding European Patent Application No. 17745217.4.

Examination Report dated Oct. 20, 2022, for corresponding Canadian Patent Application No. 3,088,636.

* cited by examiner

DUNNAGE CONVERSION MACHINE AND METHOD

RELATED APPLICATIONS

This application is a divisional of U.S. patent application Ser. No. 18/303,153, filed Apr. 19, 2023; which is a divisional of U.S. patent application Ser. No. 17/455,369, filed Nov. 17, 2021; which is a divisional of U.S. patent application Ser. No. 16/314,185, filed Dec. 28, 2018; which is a National Phase of International Patent Application No. PCT/US2017/040168, filed Jun. 30, 2017, and published in the English language; which claims the benefit of U.S. Provisional Application No. 62/357,322 filed Jun. 30, 2016; each of which is hereby incorporated herein by reference.

FIELD OF THE INVENTION

This invention is related to dunnage machines, and more particularly to machines and methods for converting a sheet stock material into a relatively less dense dunnage product.

BACKGROUND

In the process of shipping one or more articles in a container, dunnage products typically are placed in the container to fill voids and to protect the articles during shipment. Such dunnage products can be made of plastic, such as air bags or bubble wrap, or paper, such as a crumpled paper dunnage product. Some examples of machines that convert plastic or paper sheets into dunnage products are described in U.S. Pat. Nos. 7,950,433 and 7,220,476. As a more environmentally-friendly dunnage product, paper, which is recyclable, reusable, and composed of a renewable resource, is an exemplary sheet stock material. Exemplary crumpled paper dunnage conversion machines are described in U.S. Pat. Nos. 8,177,697 and 8,114,490.

SUMMARY

Although prior dunnage conversion machines adequately produce a dunnage product, manufacturers and their customers are always looking for improvements to the dunnage conversion machine and process, and in the product produced. The present invention provides an improved dunnage conversion machine that is relatively compact, faster, easier to load, simpler to build, and produces an improved dunnage product.

More specifically, summarizing the claimed invention, the present invention provides a conversion assembly for a dunnage conversion machine that includes a pair of gears. Each gear has a plurality of teeth and is rotatable about a respective axis, with the gears positioned so that the teeth of one gear are sequentially interlaced with the teeth of the other gear as the gears rotate. At least one gear has a greater dimension parallel to its rotational axis and adjacent the rotational axis than at a peripheral extent of the teeth.

The conversion assembly can include one or more of the following additional features: (a) where at least one gear includes a plurality of axially-spaced segments, each segment representing a slice of the gear perpendicular to the rotational axis; (b) where axially-outer segments have a thicker dimension adjacent and parallel to the axis and a relatively thinner dimension at the peripheral extent of the teeth, and segments between the axially-outer segments are substantially planar; (c) where at least one segment is rotationally offset such that its gear teeth are not aligned with gear teeth of an adjacent segment; and (d) where both gears have a greater dimension parallel to its rotational axis adjacent the rotational axis than at a peripheral extent of the teeth.

The present invention further provides a dunnage conversion machine that includes the aforementioned conversion assembly. Such a conversion machine can further include a motor that drives at least one of the gears about its axis such that the interlaced teeth of the driven gear drive rotation of the other gear.

The present invention also provides a conversion assembly for a dunnage conversion machine that includes a downstream pair of rotatable members and an upstream pair of rotatable members upstream of the downstream pair of rotatable members. The downstream pair of rotatable members include a pair of gears, each gear having a plurality of teeth and being rotatable about respective axes, with the gears positioned so that the teeth of one gear are sequentially interlaced with the teeth of the other gear as the gears rotate. The upstream pair of rotatable members includes a pair of wheels. The rotatable members define a path for a sheet stock material from between the upstream pair of wheels to and between the downstream pair of gears, where at least one of the upstream rotatable member and at least one of the downstream rotatable members are driven to pass sheet stock material between the upstream rotatable members and between the downstream rotatable members at the same rate.

Such a conversion assembly can further include one or more of the following additional features: (a) where the first upstream rotatable member and the first downstream rotatable member rotate about parallel axes; (b) comprising a forming member that includes a planar surface, and at least one of the first upstream rotatable member and the first downstream rotatable member extend through an opening in the planar surface of the forming member; and (c) in combination with a stock supply assembly capable of supporting a supply of sheet stock material upstream of the upstream pair of rotatable members.

The present invention also provides a method of converting a sheet stock material into a relatively lower density dunnage product. The method includes the steps of pulling a sheet stock material from a supply of sheet stock material using a pair of rollers, feeding the sheet stock material from between the rollers to a pair of gears, and passing the sheet stock material between the pair of gears, where the feeding and passing steps occur at substantially the same rate.

Also provided by the present invention is a conversion assembly for a dunnage conversion machine that includes a downstream pair of rotatable members and an upstream pair of rotatable members upstream of the downstream pair of rotatable members, and a lever arm to which a first one of the downstream rotatable members and a first one of the upstream rotatable members are rotatably attached. The lever arm has a pivot axis removed from the axes of the rotatable members that enables pivoting movement of the lever arm and the first upstream and first downstream rotatable members from an operating position where the first upstream rotatable member and the first downstream rotatable member are in engagement with a respective second upstream rotatable member of the pair of upstream rotatable members and a respective second downstream rotatable member of the pair of downstream rotatable members, and a loading position where the first upstream rotatable member and the first downstream rotatable member are separated from and removed from the respective second upstream rotatable member and the second downstream rotatable member.

The conversion assembly described above may further include one or more of the following limitations: (a) a latching mechanism for holding the lever arm in the operating position; (b) where the downstream pair of rotatable members include a pair of gears, each gear having a plurality of teeth and being rotatable about respective axes, and in the operating position the gears are positioned so that the teeth of one gear are sequentially interlaced with the teeth of the other gear as the gears rotate; (c) where the upstream pair of rotatable members include a pair of wheels; (d) where the first upstream rotatable member and the first downstream rotatable member rotate about parallel axes; (e) where the pivot axis is parallel to an axis of rotation of the first downstream rotatable member and an axis of rotation of the first upstream rotatable member; and (f) comprising a forming member that includes a planar surface, and in the operating position at least one of the first upstream member and the first downstream member extend through an opening in the planar surface of the forming member.

The present invention also provides a stock supply assembly that includes a stock roll loading mechanism. The stock roll loading mechanism has a pair of laterally spaced arms that are pivotably mounted for rotation between a loading position for engaging an axle for a roll of sheet stock material and an operating position removed from the loading position. The stock supply assembly further includes a friction member pivotally mounted to rest against the roll. And the stock supply assembly includes a linkage connecting the arms to the friction member such that the friction member moves toward the arms when the arms move from the loading position to the operating position and away from the arms when the arms move from the operating position to the loading position.

According to another aspect, the present invention provides a dunnage conversion machine having a conversion assembly, a stock supply assembly that supports a supply of sheet stock material, and a constant entry member interposed in a path of the sheet stock material between the stock supply assembly and the conversion assembly. The constant entry member is mounted for pivotable movement about an axis spaced from the constant entry member, the constant entry member being biased to an operating position.

The present invention further provides a dunnage product having one or more plies of sheet stock material. Lateral edge portions of the stock material are crumpled and folded over a central portion. The dunnage product further has two parallel rows of slits in the overlapping edge portions and central portion. The slits are periodically spaced and the sheet material between and outside the slits is displaced out of a generally planar configuration to form a tab that holds the sheet stock material in its crumpled folded configuration.

The present invention also provides a dunnage conversion machine with a conversion assembly that converts a sheet stock material into a strip of relatively lower density dunnage. The conversion assembly includes a forming assembly that inwardly turns lateral regions of the stock material and randomly crumples the stock material as the stock material travels therethrough to form a crumpled strip. The forming assembly includes an external forming device and an internal forming device. The external forming device has an inlet, an outlet relatively smaller than the inlet, and surfaces therebetween that define an internal space. The internal forming device is positioned relative to the external forming device within the internal space so that the stock material passes through the internal space and around the internal forming device as it travels through the external forming device. The internal forming device has portions with laterally outer edges which at least partially define a turning perimeter around which lateral regions of the sheet stock material inwardly turn, and has a substantially continuous bottom surface and substantially continuous lateral side surfaces extending in a common direction from the side surface. The lateral side surfaces converge toward each other at downstream ends. The internal forming device also has outwardly-expanding cones expanding outwardly from the downstream ends of each of the lateral side surfaces, and a downstream end of the bottom surface contacts the cones.

The internal forming device may further include a pair of laterally-spaced apart extensions at an upstream end of the bottom surface extending from the bottom surface in an upstream direction away from the downstream end of the internal forming device. And the forming assembly may further include a forming plow spaced from a downstream end of the cones opposite the bottom surface to restrict the height of the dunnage strip.

The present invention further provides a method of making a dunnage product, that includes the steps of (a) feeding a first sheet stock material through a dunnage conversion machine for conversion into a dunnage product at a first rate, (b) detecting a trailing end of the first sheet stock material, (c) splicing a leading end of a second sheet stock material to the trailing end of the first sheet stock material; and (d) feeding the first sheet stock material and then the second sheet stock materials through the dunnage conversion machine at a second rate that is less than the first rate for a predetermined time after the detecting step.

The method may further include the step of (e) feeding the second sheet stock material through the dunnage conversion machine at the first rate after the predetermined time.

The present invention also provides a dunnage conversion machine that includes a conversion assembly that converts a sheet stock material into a strip of relatively lower density dunnage, a severing assembly downstream of the conversion assembly that facilitates severing discrete dunnage products from the strip of dunnage, and an output chute downstream of the severing assembly that has walls forming a generally rectangular cross-section. The output chute includes a shield that is rotatable between an operating position generally parallel to a wall of the output chute, and a severing position that restricts a height dimension of the output chute to no more than about 20 mm.

The dunnage conversion machine may further include one or more sensors that detect a position of the shield in the output chute.

The present invention also provides a method of making a dunnage product. The method includes the steps of (a) converting a sheet stock material into a strip of dunnage such that the strip of dunnage extends into an output chute having walls that define a rectangular cross-section, (b) stopping the converting step and rotating a shield in the output chute from an operating position where the shield is parallel to a wall of the output chute to a severing position where a height dimension of the output chute is reduced to no more than about 20 mm, and (c) cutting the strip dunnage to facilitate forming a discrete dunnage product in the output chute; where the cutting step (c) can only occur while the shield is in the severing position.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

Figure 1:
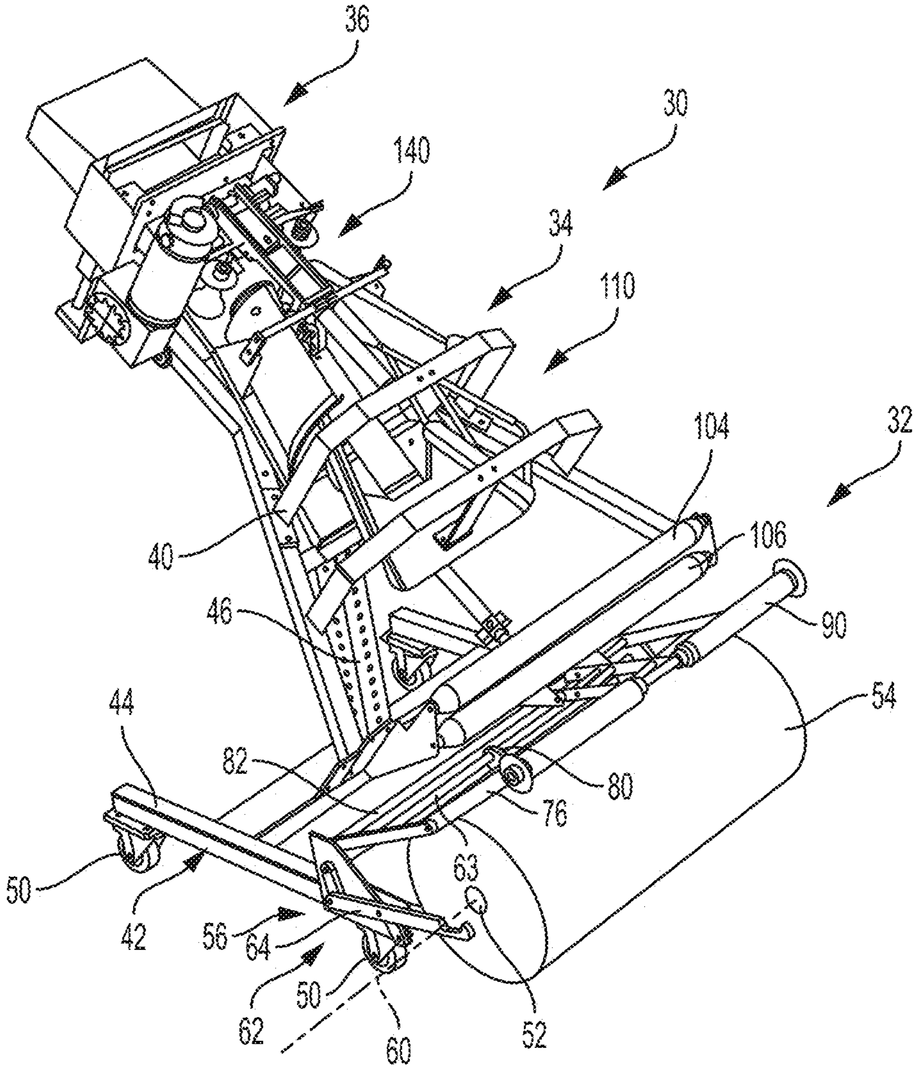
FIG. 1 is a perspective view of a dunnage conversion machine provided in accordance with the present invention, with the outer housing removed to reveal the internal components.
Figure 2:
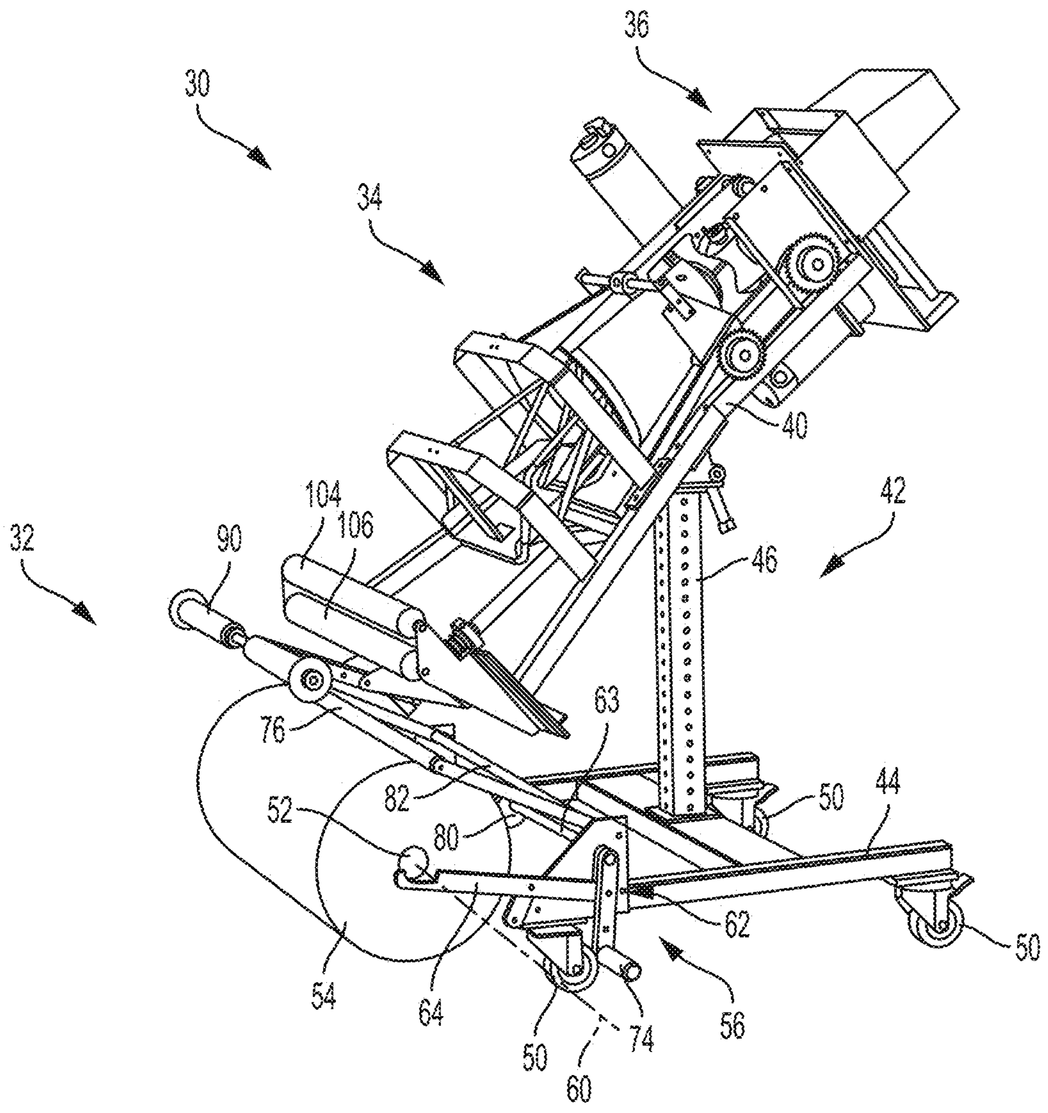
FIG. 2 is a perspective view of the dunnage conversion machine of FIG. 1 as seen from the right side of the machine.
Figure 3:
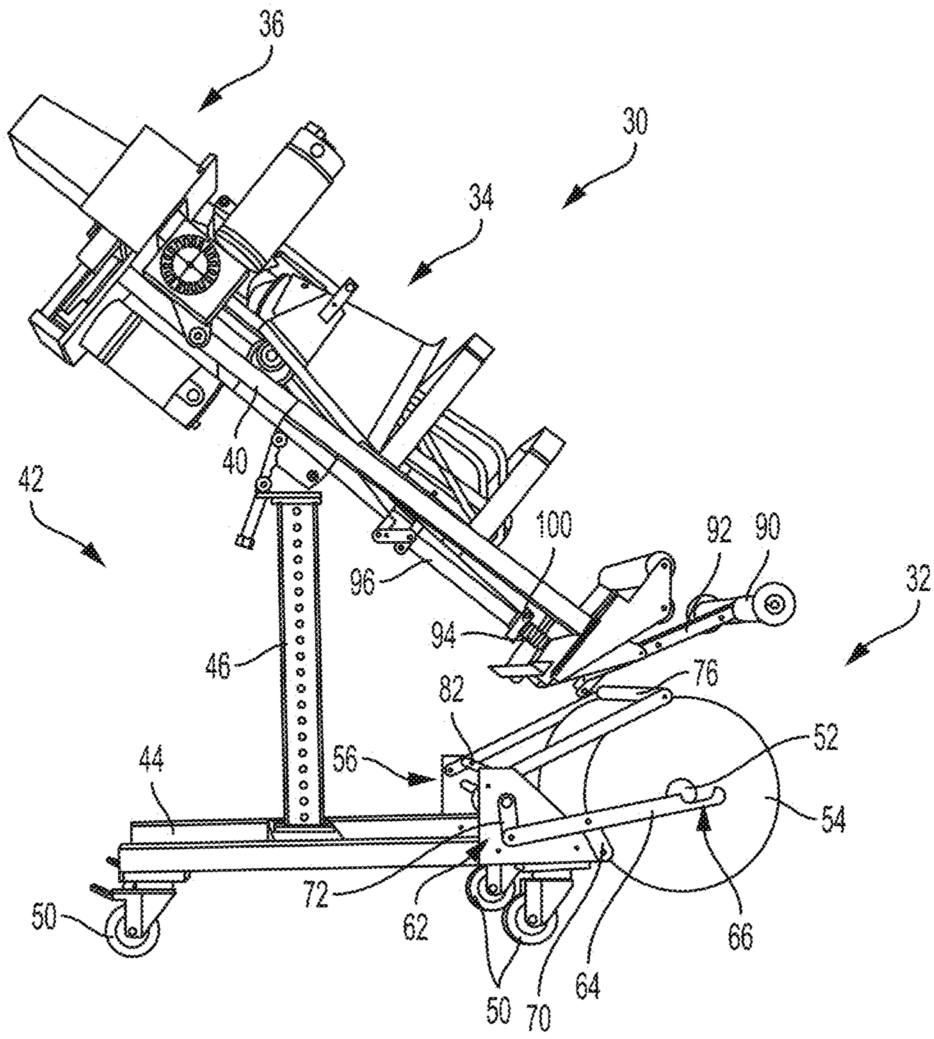
FIG. 3 Is a perspective view of the dunnage conversion machine of FIG. 1 as seen from the left side of the machine.
Figure 4:
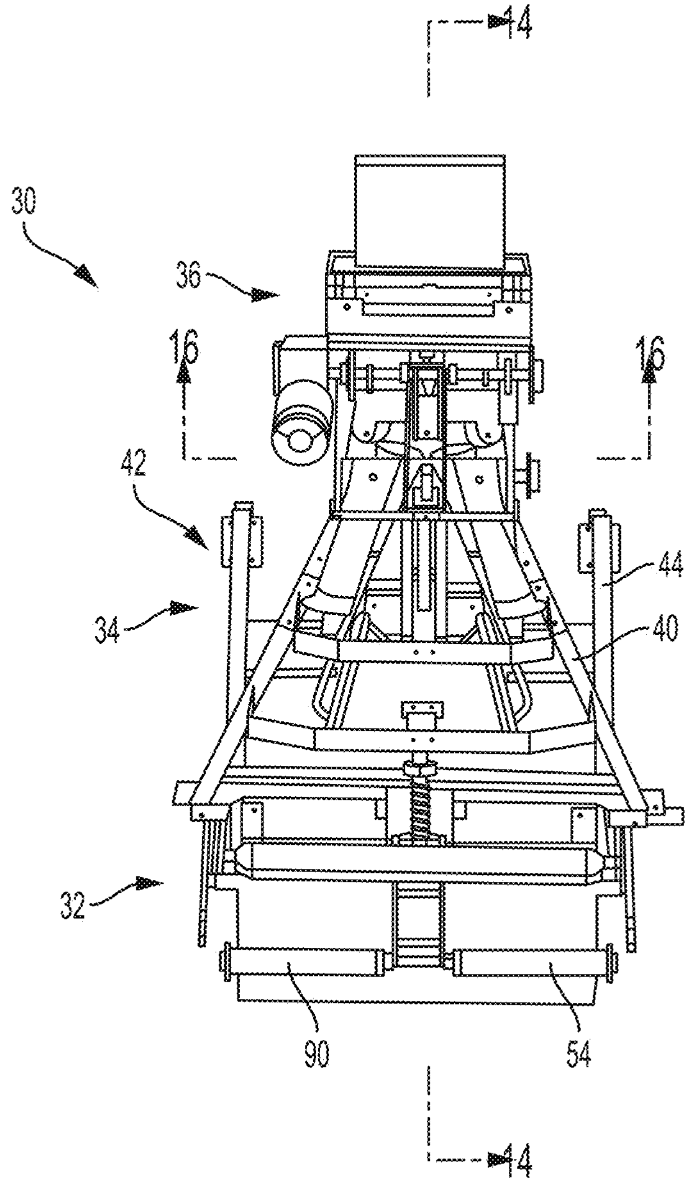
FIG. 4 is a top view of the dunnage conversion machine of FIG. 1.
Figure 5:
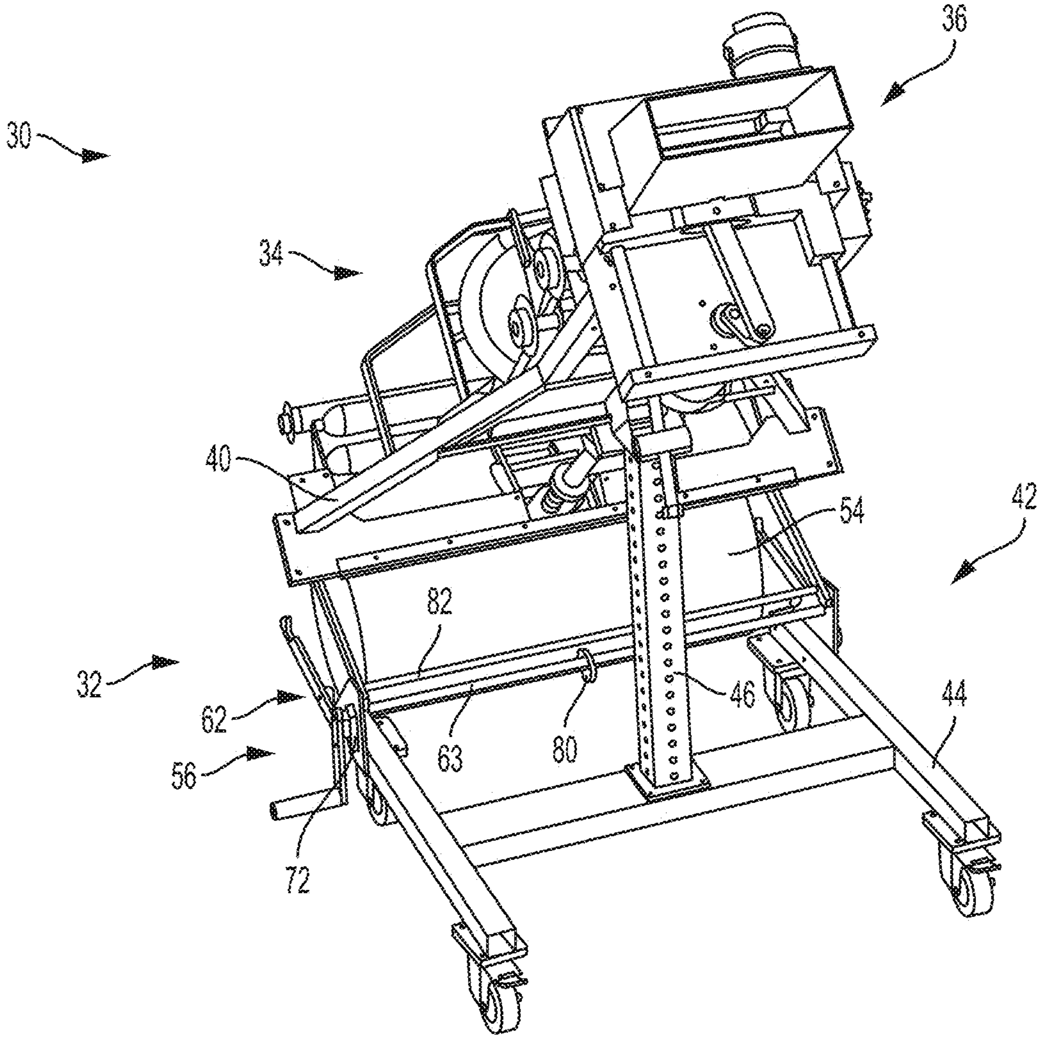
FIG. 5 is a perspective view of the dunnage conversion machine in FIG. 1 as seen from a front side.

Referring now to the drawings in detail, and initially FIGS. 1-5, an exemplary dunnage conversion machine 30 provided by the present invention includes a stock supply assembly 32, a conversion assembly 34, and a severing assembly 36. Sheet stock material generally travels from the stock supply assembly 32 at an upstream end of the system in a downstream direction into the conversion assembly 34 and past the severing assembly 36 downstream of the conversion assembly 34. The upstream direction is opposite the downstream direction. The conversion assembly 34 and the severing assembly 36 are mounted to a frame 40 for support, and generally are enclosed in a housing (not shown), most of which has been removed in the illustrated embodiment to reveal the internal components of the conversion assembly 34. The frame 40 is supported on a stand 42, which in the illustrated embodiment includes a base portion 44 and an upright support 46 extending from the base portion 44. The frame 40 is mounted to the upright support 46 to support the conversion assembly 34 and the severing assembly 36 at an elevated position. Four wheels 50 are mounted to the base portion 44 to allow the stand 42 to function as a mobile cart.

The stock supply assembly 32 is mounted to an upstream side of the stand 42 to supply sheet stock material to the conversion assembly 34 downstream of the stock supply assembly 32. An exemplary sheet stock material includes one or more plies of a sheet material that is accordion- or fan-folded to form a generally rectangular stack, or is wound around a hollow core 52 to form a roll 54, as shown. An exemplary sheet stock material is kraft paper, which can have various basis weights, such as twenty- or forty-pound kraft paper.

Figure 6:
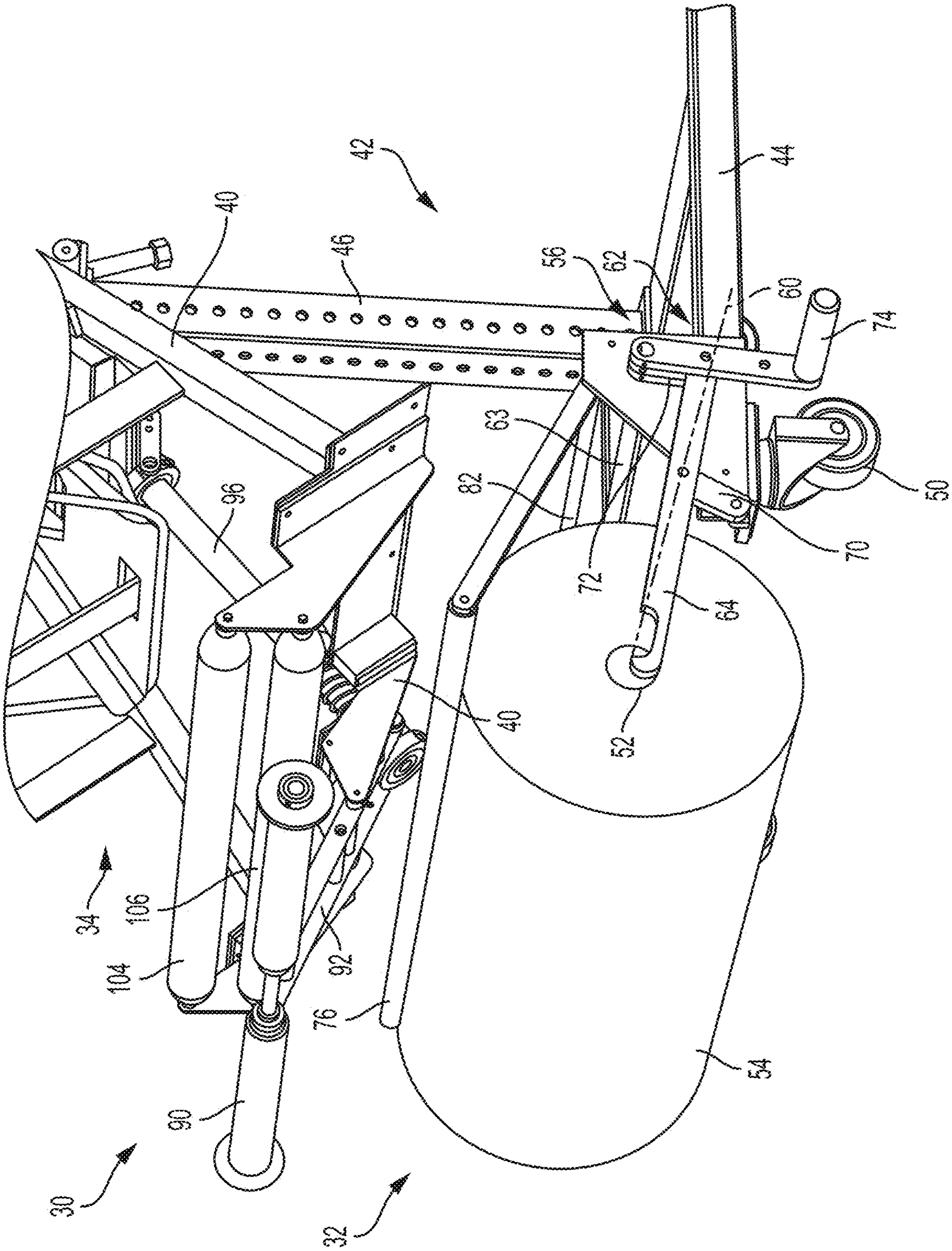
FIG. 6 is an enlarged perspective view of an upstream view of the dunnage conversion machine of FIG. 1 and a stock supply assembly.
Figure 7:
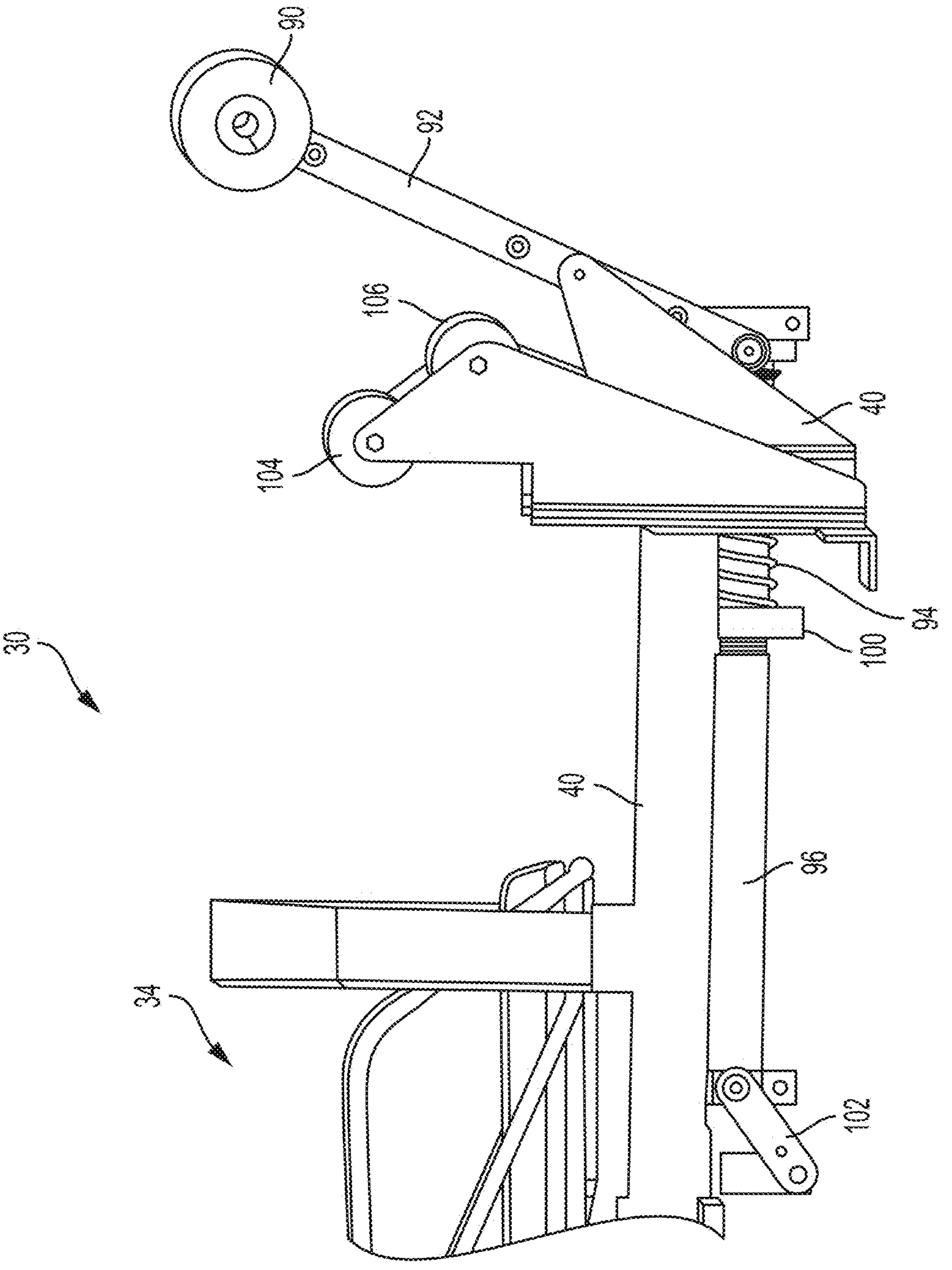
FIG. 7 is an enlarged view of a portion of the stock supply assembly in a loading position.
Figure 8:
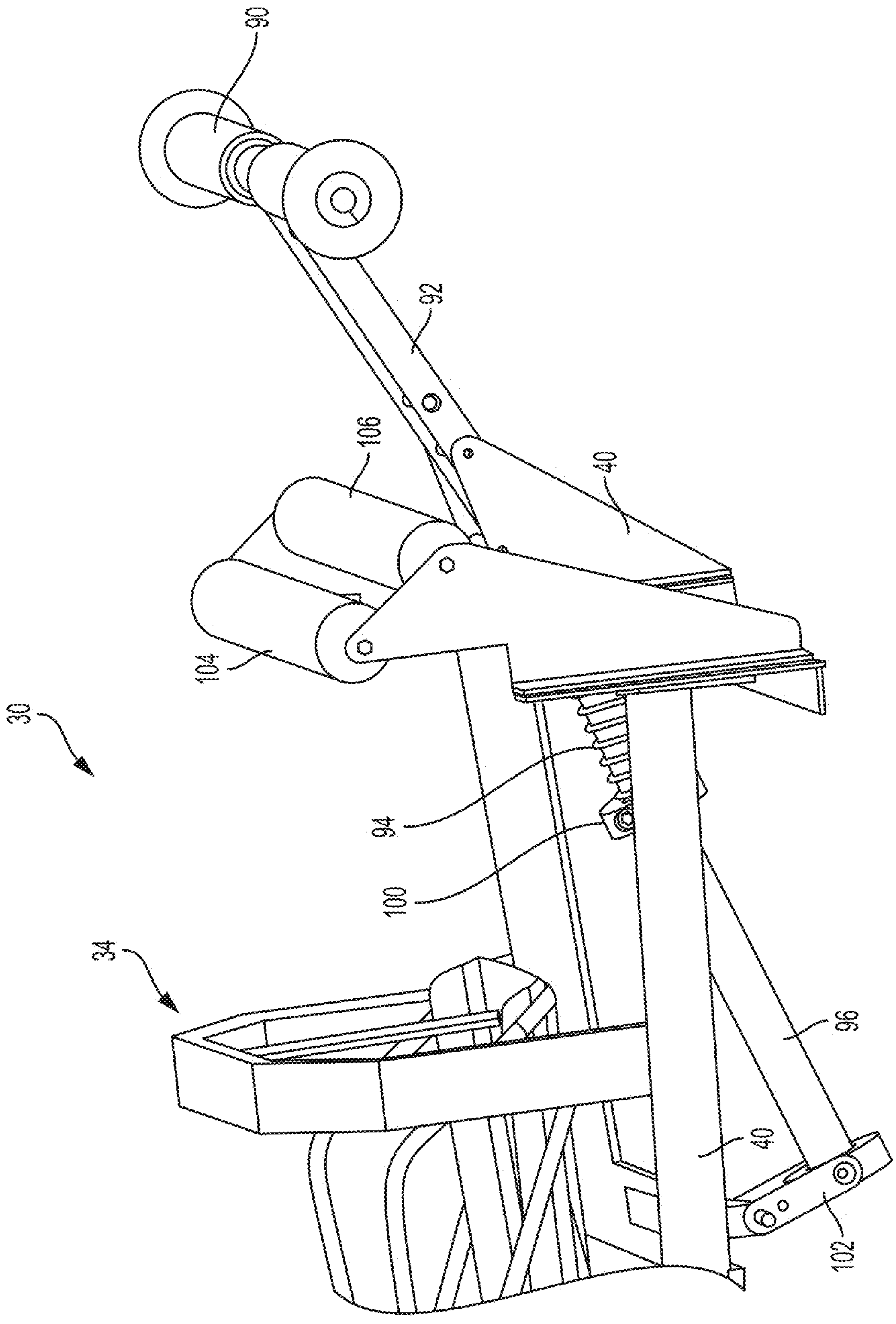
FIG. 8 is a portion of the stock supply assembly as seen in FIG. 7 in an operating position.

Referring now to FIGS. 6-8, the illustrated stock supply assembly 32 includes a stock roll loading mechanism 56, also called a stock roll lifter, mounted to the base portion 44 of the stand 42. The stock roll loading mechanism 56 facilitates lifting a stock roll 54 off the floor and rotatably supporting the stock roll 54 at an elevated operating position for feeding sheet material to the conversion assembly 34. The stock roll 54 is provided with an axle or spindle (not shown) that extends from the hollow core 52 on opposite ends of the stock roll 54. The axle may have multiple parts, such as two parts that are received in respective ends of the hollow core 52 of the stock roll 54. Alternatively, the axle may be a single unitary part that passes through the hollow core 52 and extends from one lateral end of the stock roll 54 to the other lateral end. The axle defines an axis of rotation 60 about which the stock roll 54 rotates relative to the stand 42 as the sheet material is withdrawn from the outer surface of the roll 54.

The stock roll loading mechanism 56 includes a linkage 62 having a pair of laterally spaced arms 64 that extend from the stand 42 to engage the ends of the axle protruding from the ends of the stock roll 54. The arms 64 are pivotably mounted for rotation between a loading position for engaging a roll 54 of sheet stock material and an operating position removed from the loading position for feeding sheet material to the conversion assembly 34. The arms 64 each have a notch 66 on an upper side, toward a proximal end of the arms 64, for receiving the axle. A pivot link 70 is pivotally mounted to the stand 42 and to a midpoint of the respective stock roll lifter arm 64. And a distal end of the stock roll lifter arm 64 is mounted to a second link 72 that is pivotally mounted for rotation about an axis removed from the axis of the stock roll 54. This second link 70 is connected to a handle or a foot pedal 74 for manipulating the stock roll lifter arms 64 from a first position, the loading position, with a proximal end of the stock roll lifter arms 64 at a lower elevation for receiving and engaging the ends of the stock roll axle, and a second position, the elevated operating position, where a stock roll 54 can freely rotate as sheet stock material is drawn from the roll 54 and fed into the conversion assembly 34.

Figure 14:
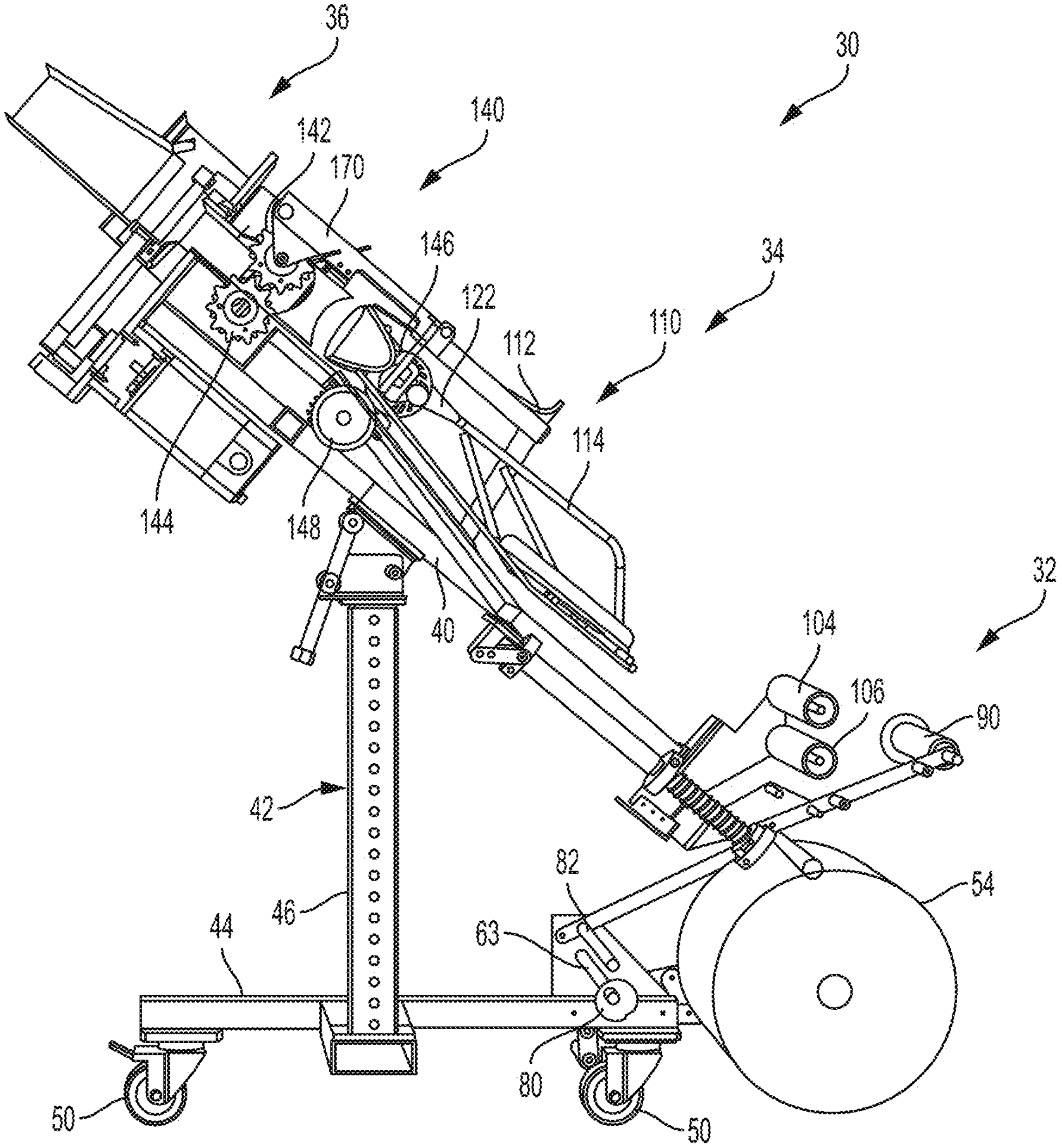
FIG. 14 is a cross-sectional view of the dunnage conversion machine of FIG. 1 as seen along lines 14-14 FIG. 4.
Figure 15:
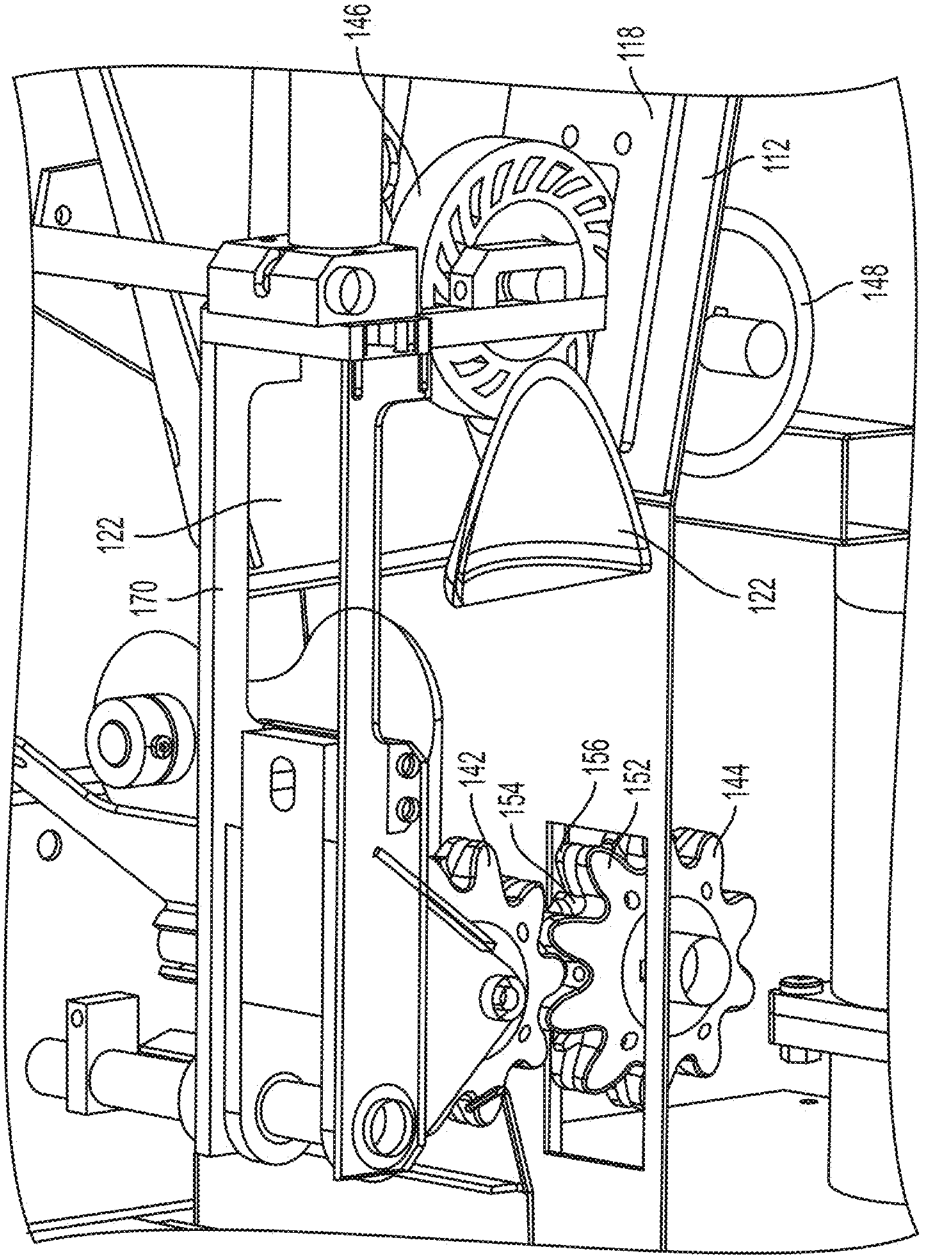
FIG. 15 is a enlarged perspective view of a portion of the dunnage conversion machine of FIG. 14.
Figure 16:
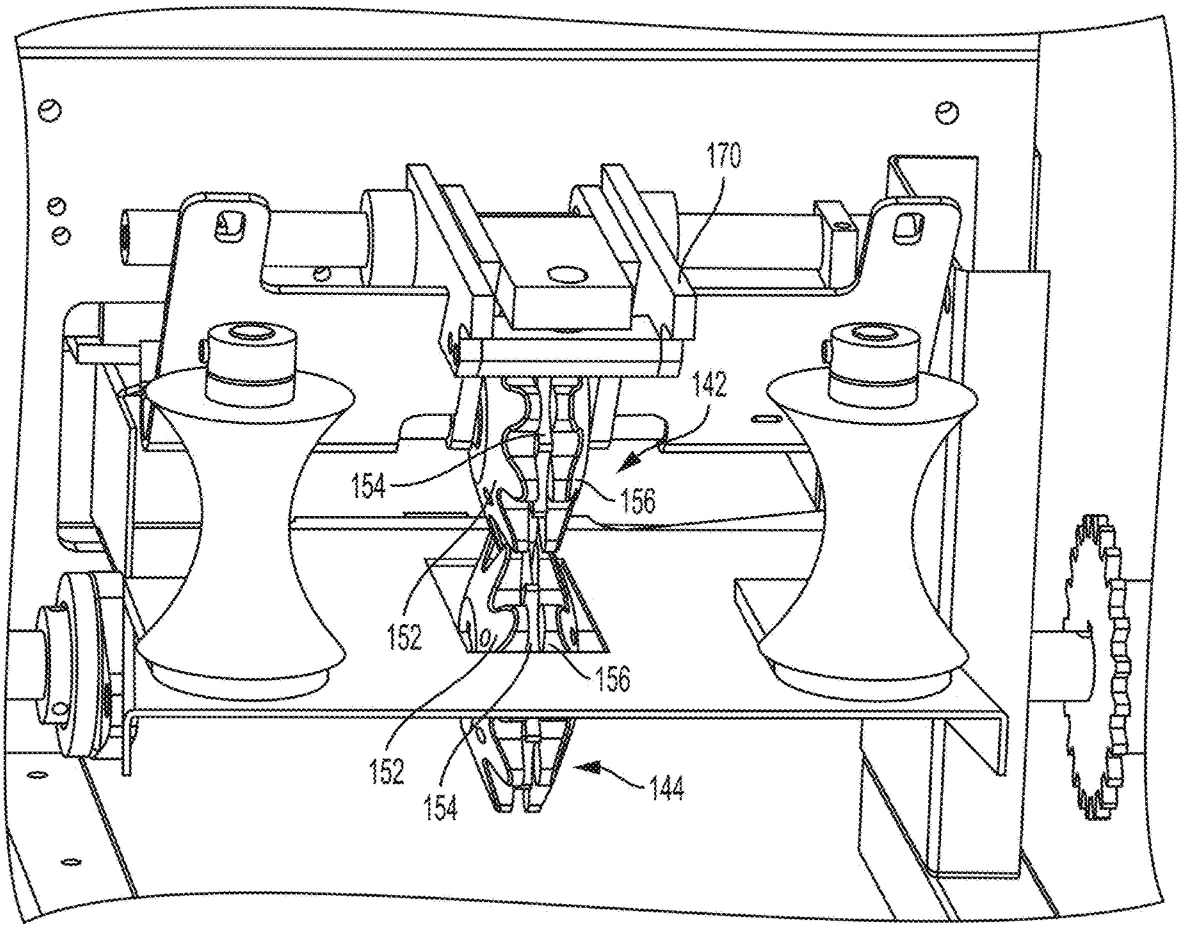
FIG. 16 is a cross-sectional perspective view of the dunnage conversion machine of FIG. 1 as seen along lines 16-16 of FIG. 4 or FIG. 9.
Figure 17:
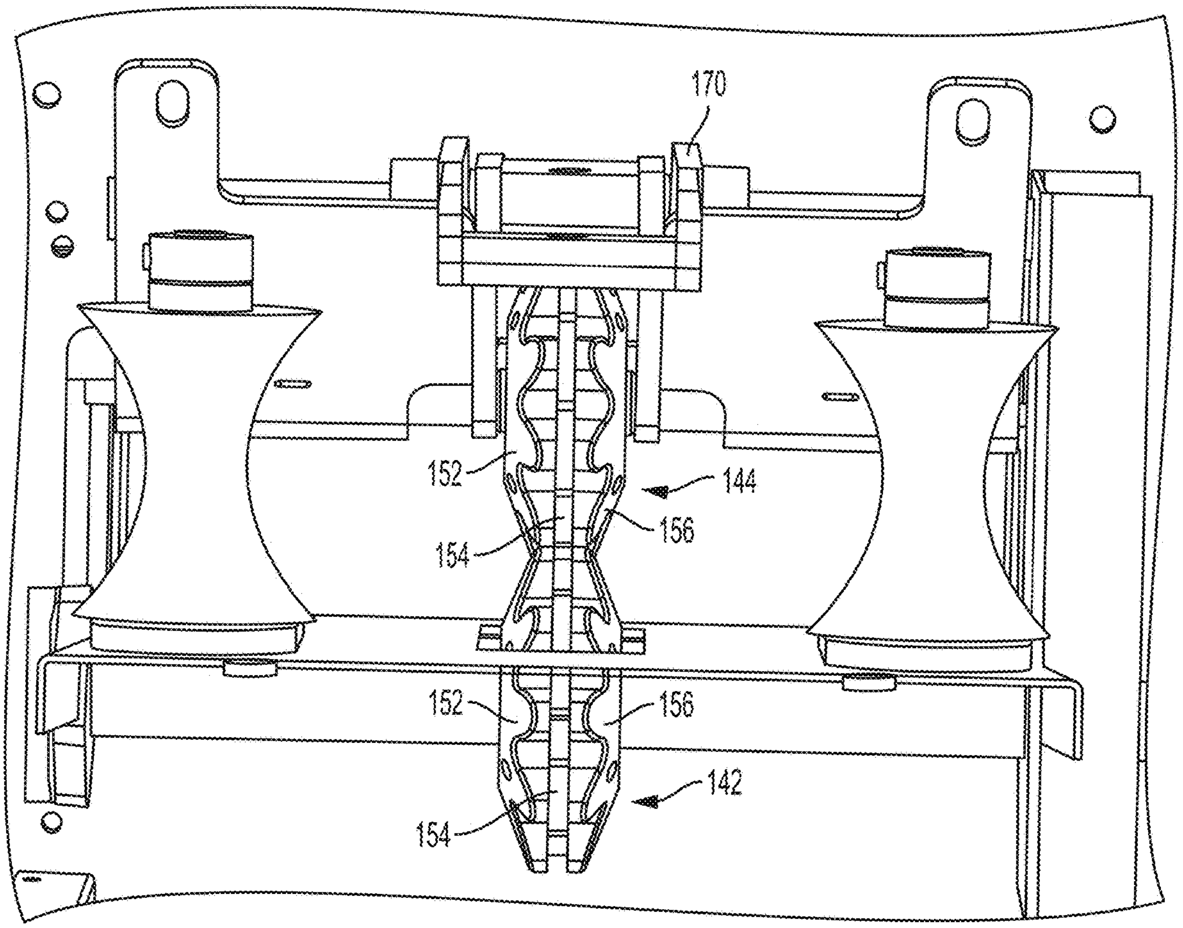
FIG. 17 is a enlarged perspective view of FIG. 16 as seen from another angle.

In addition to the stock roll loading mechanism 56, the stock supply assembly 32 includes a friction bar or member 76 that rests against an outer surface of the stock roll 54 and creates friction to limit continued rotation of the stock roll 54 when the conversion assembly 34 stops drawing sheet material from the roll 54. In other words, the friction bar 76 helps to minimize or to prevent overrun, and helps to maintain a more consistent tension in the sheet material, even as the sheet stock material is drawn from an increasingly smaller roll 54. The friction bar 76 is connected to the stock roll loading mechanism 56 through the linkage 62 such that the friction bar 76 moves toward the proximal end of the stock roll lifter arms 64, and the stock roll 54, if present, when the stock roll lifter arms 64 move from the loading position to the operating position. The friction bar 76 moves away from the stock roll lifter arms 64 when the stock roll lifter arms 64 move from the operating position to the loading position. Specifically, the linkage 62 includes a bar 63 coupled to the second link 72 for rotation with the second link 72. A cam 80 is mounted on the bar 63 for rotation therewith. (See also FIG. 14.) The friction bar 76 is supported for rotation about an axis parallel to the bar 63, and is coupled to a parallel bar 82 that is closely spaced from the bar 63. When the second link 72 rotates, the bar 63 coupled to the second link 72 of the stock roll loading mechanism 56 also rotates and the cam 80 rotates into or out of engagement with the bar 82 coupled to the friction bar 76, causing the friction bar 76 to move relative to the stock roll 54, either into or out of engagement with the stock roll 54 depending on the direction of rotation of the cam 80 and regardless of the size of the stock roll 54.

The stock supply assembly 32 provided by the invention thus makes loading a stock roll much easier, and via the friction bar 76 and associated linkage 62 includes automatically-applied features that help to maintain more consistent tension on sheet material being fed from the stock supply assembly 32 to the conversion assembly 34. As an alternative to the illustrated embodiment, the stock supply assembly 32 can include a shelf or other structure in place of the stock roll loading mechanism 56 and the friction bar 76 to support one or more stacks of fan-folded sheet stock material.

From the stock supply assembly 32, the sheet material passes over a constant entry roller 90 interposed in a path of the sheet material between the stock supply assembly 32 and the conversion assembly 34. As the stock roll 54 feeds sheet stock material off the roll, the roll 54 decreases in size and the constant entry roller 90 provides a substantially constant point of entry for the sheet stock material traveling from the stock supply assembly 32 into the conversion assembly 34. The constant entry roller 90 is mounted to an upstream end of the frame 40 for pivotable movement about an axis parallel to and spaced from the constant entry roller 90.

The constant entry roller 90 is biased to an operating position, but can move in response to changes in tension in the sheet material between the operating position and a position pivotably removed from the operating position, thereby minimizing or eliminating tearing of the sheet material that can be caused by increased tension, while also potentially relieving some of that tension. Consequently, the illustrated constant entry roller 90 can pivot as tension in the stock material increases to prevent premature tearing of the stock material as it passes over the constant entry roller 90, and pivot back under the influence of the biasing force as the tension decreases to help maintain a more constant tension in the sheet material.

The illustrated constant entry roller 90 is centrally supported by a support member 92 that is pivotally mounted to the frame 40. A spring 94 is interposed between the frame 40 and the support member 92 to bias the constant entry roller 90 toward its operating position. In the illustrated embodiment, the distal end of the support member 92 engages the spring 94, which is mounted to an arm 96 connected to the frame 40. A collar 100 is secured to the arm 96 and its position along the arm 96 can be adjusted to adjust the stiffness of the spring 94. The stiffness of the spring 94 can be adjusted by changing the position of the collar 100 along the arm 96 such that the spring 94 is supported on the arm 96 between the collar 100 and the support member 92 for the constant entry roller 90. The spring 94 thus acts against the support member 92 for the constant entry roller 90, and as the sheet stock material passes over the constant entry roller 90 and tension increases, the support member 92 is allowed to pivot as the tension in the sheet stock material overcomes the spring force. Although spring-biased constant entry rollers are known, the construction of the illustrated constant entry member 90 is unique and simpler than prior designs, while still providing the desired functionality of a substantially constant point of entry for the sheet stock material into the conversion assembly 34.

By supporting the constant entry roller 90 in the center, only one spring 94 is needed and an imbalance in the spring force is less likely at the outer ends of the constant entry roller 90 where tension in the sheet material tends to be higher. Central support of the constant entry roller 90 also provides an open space between an upstream end of the frame 40 and the constant entry roller 90, specifically at the lateral ends of the constant entry roller 90, that facilitate feeding sheet material from the stock supply assembly 32, over the constant entry roller 90, and into the conversion assembly 34 during loading.

The illustrated constant entry roller 90 also can be moved from its operating position (FIG. 7) to a loading position (FIG. 8) removed from the operating position to further facilitate feeding sheet stock material over the constant entry roller 90 and into the conversion assembly 34. This is accomplished using a latch link or lever 102 connecting a distal end of the arm 96 that supports the spring 94 relative to the frame 94. Rotating the latch link 102 in a first direction moves the constant entry roller 90 out of the operating position (FIG. 7) to the loading position (FIG. 8) where the distance between the constant entry roller 90 and the conversion assembly 34 is increased. Rotating the latch link 102 in a second direction opposite to the first direction moves the constant entry roller 90 to the operating position (FIG. 7) and locks the arm 96 in place to hold the constant entry roller 90 in the operating position to support and guide sheet material to the conversion assembly 34.

An exemplary sheet stock material has multiple plies, for example, two plies, that pass together over the constant entry roller 90 and then are separated by one or more separator rollers 104 and 106 mounted to the frame 40 downstream of the constant entry roller 90 before entry into the conversion assembly 34. The separator rollers 104 and 106 separate the plies and change the paths over which each ply travels into the conversion assembly 34, increasing the opportunity for each ply to randomly crumple in a different manner, creating more loft in the resulting dunnage product.

Figure 9:
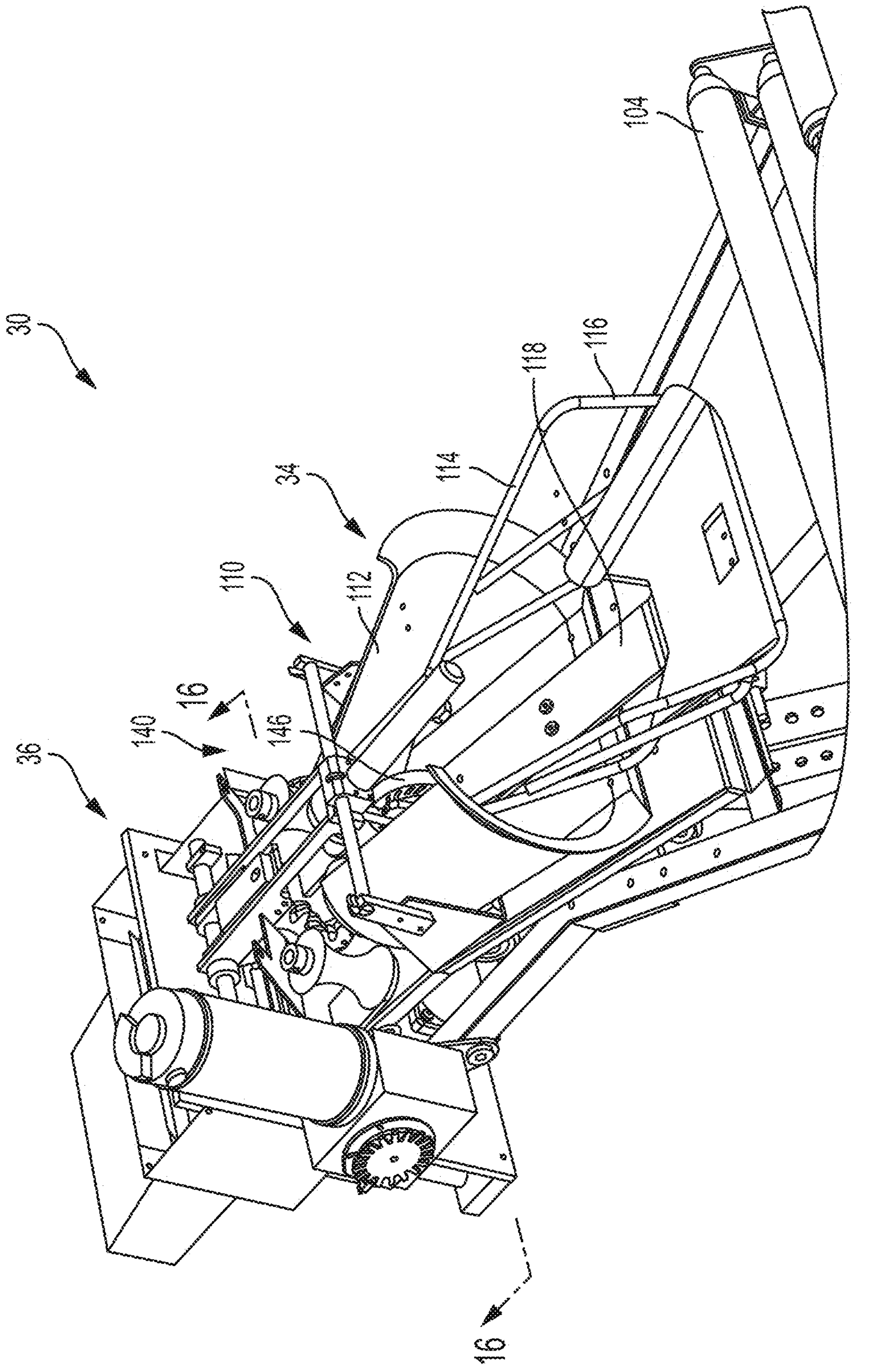
FIG. 9 is an enlarged perspective view of a conversion assembly portion of the dunnage conversion machine of FIG. 1.
Figure 10:
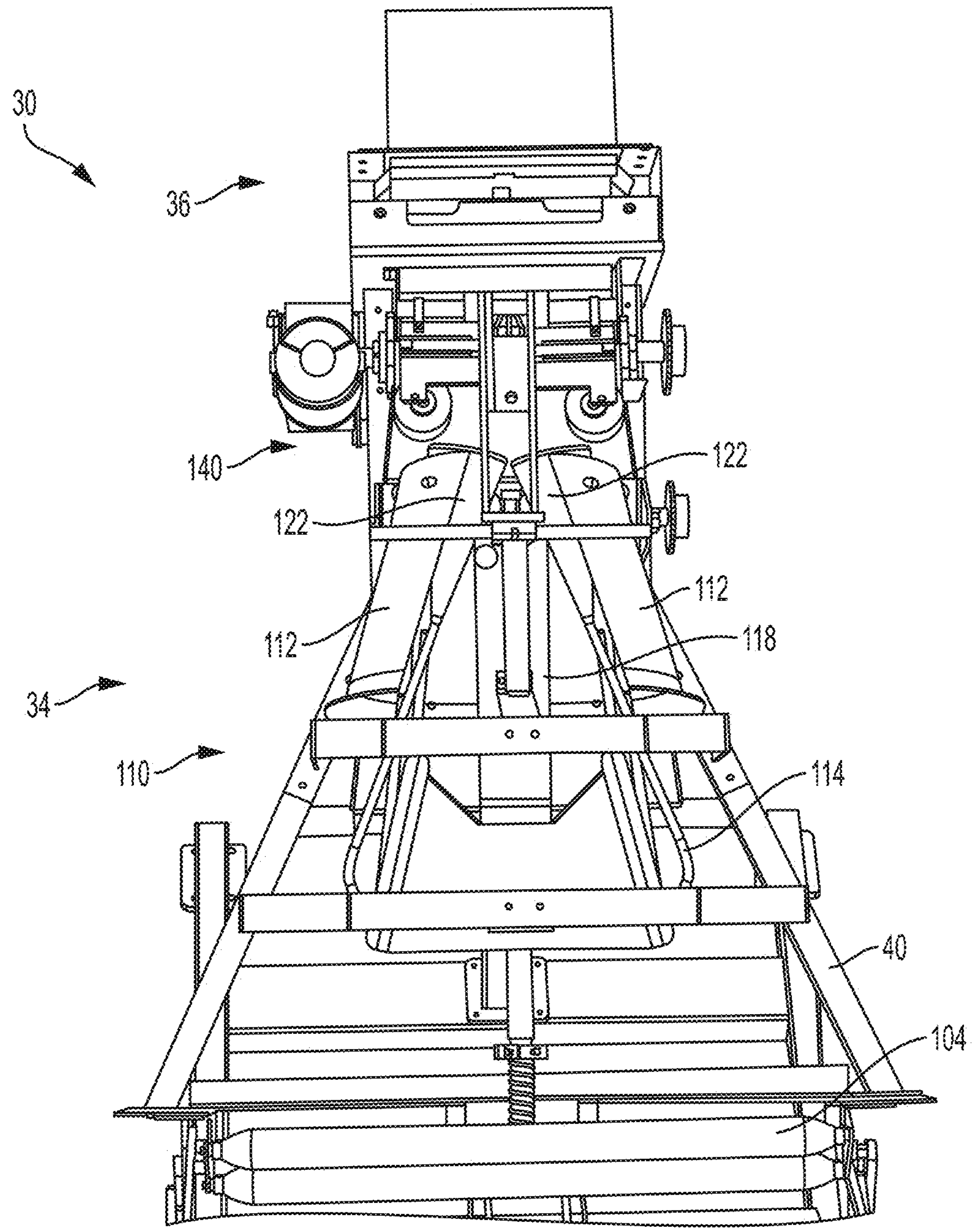
FIG. 10 is an enlarged top view of the dunnage conversion assembly portion of the dunnage conversion machine of FIG. 1.
Figure 11:
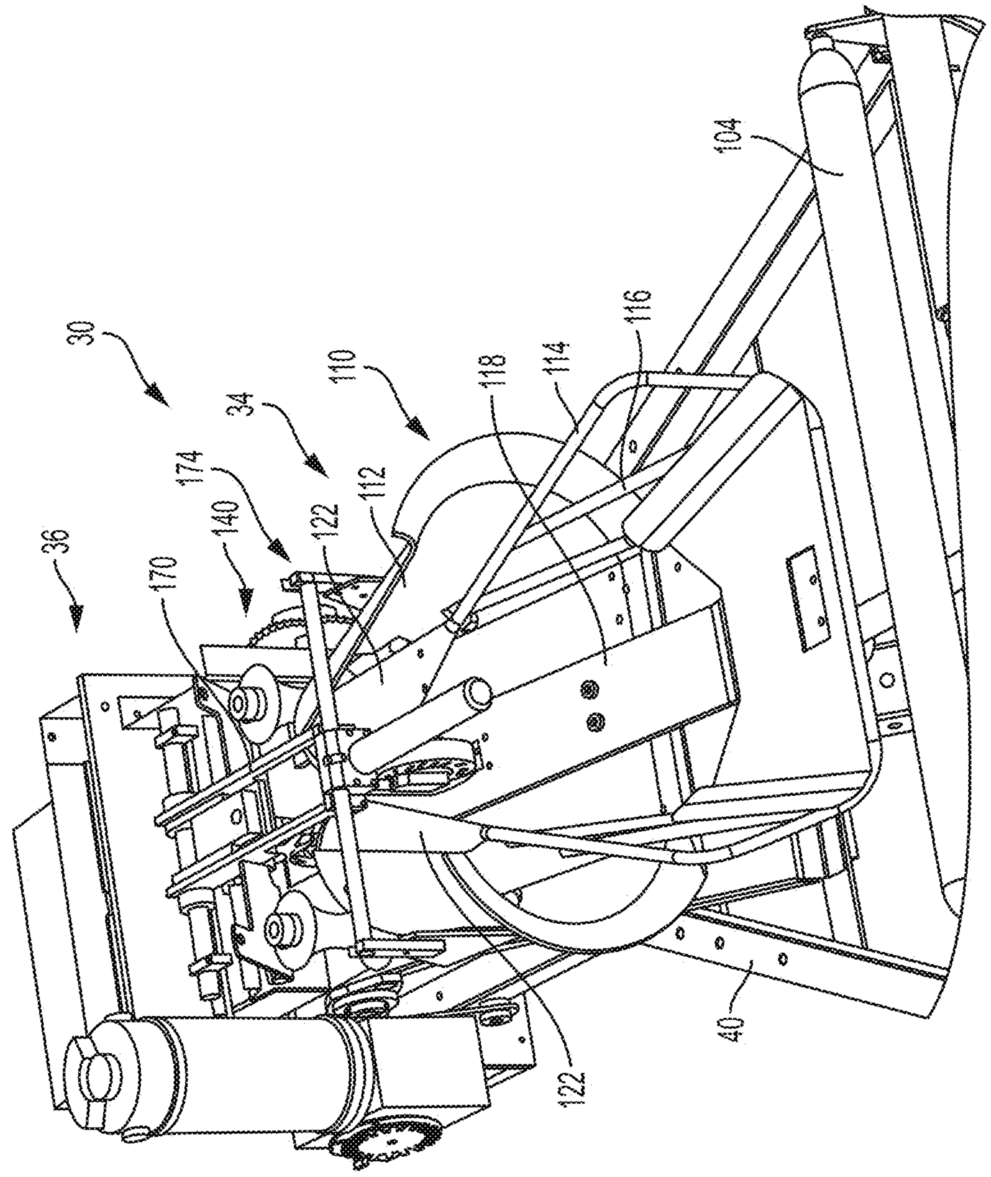
FIG. 11 is another perspective view of the dunnage conversion assembly portion of the dunnage conversion machine of FIG. 1.

An exemplary conversion assembly 34 is shown in FIGS. 9-11. Some of the components and the general structure of the conversion assembly 34 are similar to prior conversion assembly designs, but the illustrated conversion assembly 34 includes several improvements. As in prior conversion assemblies, the illustrated conversion assembly 34 includes a forming assembly 110 having a converging chute 112 and a forming frame 114, also referred to as a former, which extends into the chute 112. The former 114 includes a wire frame, formed of welded-together shafts 116, and a generally planar tongue 118, narrower than the wire frame, forming a central bottom surface. The planar bottom surface of the former 114 generally closely follows a facing inner surface of the converging chute 112. The wire frame former 114 has a generally U-shape cross-section with a progressively narrower width and height toward a downstream end of the former 114. Mounted above the bottom surface formed by the tongue 118, the downstream end of the former 114 includes a pair of laterally-spaced cones 122 that have an increasing diameter in the downstream direction. The cones 122 tend to move the sheet stock material outward, increasing loft and minimizing how much material accumulates in a center of the strip of dunnage being produced.

As the sheet material enters the converging chute 112, a central portion of the sheet material passes under the former 114 and between the bottom surface of the tongue of the former 114 and the chute 112. The converging chute 112 inwardly draws lateral portions of the sheet material inwardly, and then causes the lateral portions to wrap around a downstream end the former 114 as the sheet material is pulled through the chute 112. The interaction between the advancing sheet and both the former 114 and the chute 112 cause the sheet material to randomly crumple and form fold lines that enhance the loft and cushioning ability of the resulting dunnage product. As the sheet stock material passes over the expanding cones 122 and exits the converging chute 112, lateral edge portions of the sheet stock material have been folded over a central portion. The expanding cones 122 push the sheet material outward as the crumpled sheet material moves over the increasing diameter of the cones 122.

Figure 12:
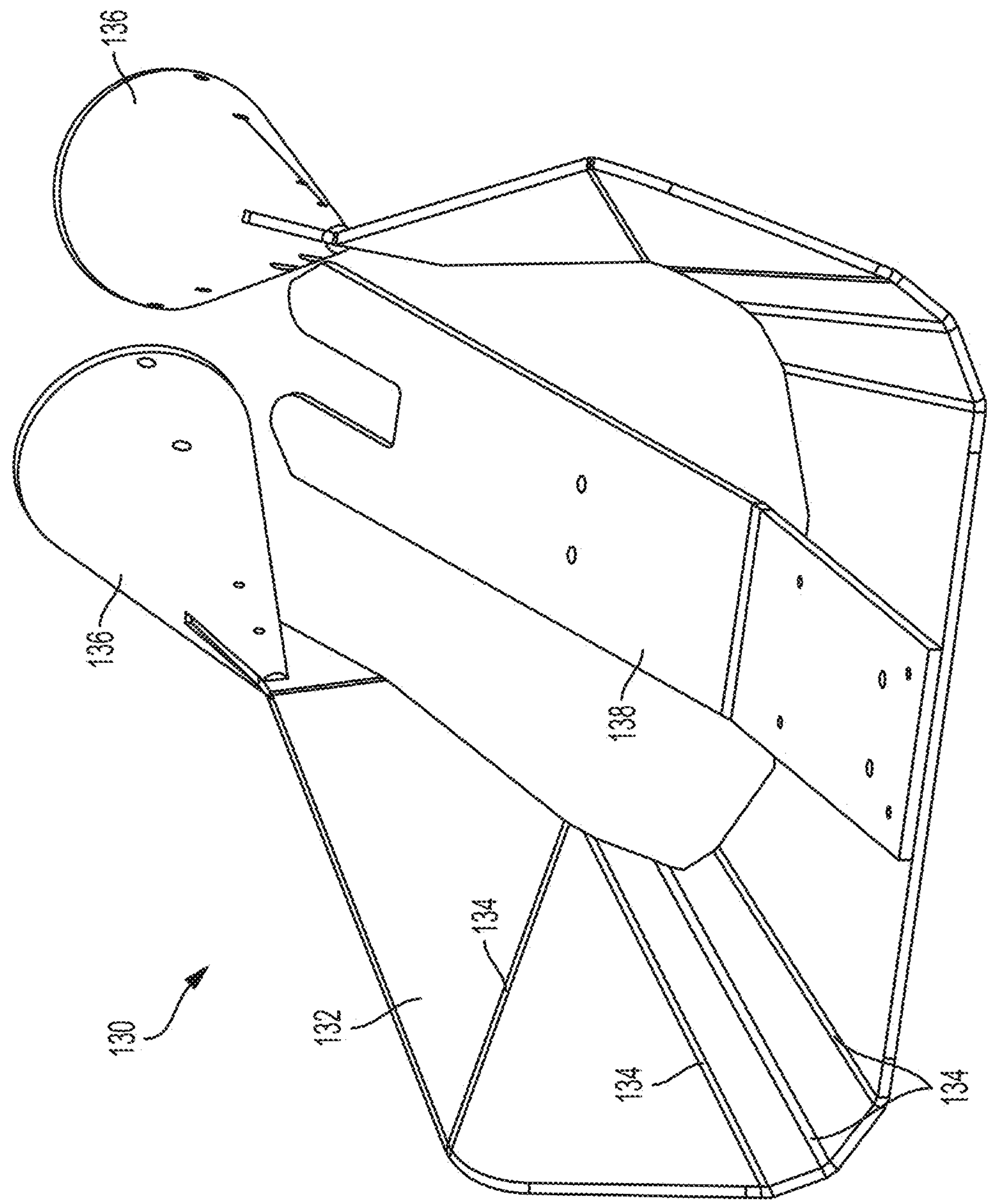
FIG. 12 is a perspective view of a former used in the conversion assembly of FIG. 1.

Referring briefly to FIG. 12, note that the former 114 can have a different shape and structure than what is shown in FIG. 11. As shown in FIG. 11 the former 114 is substantially a wire frame with the flat tongue 118 on a bottom side that extends downstream to define the bottom surface, and a pair of downstream-expanding cone-shape extensions 122 at an elevated position at a downstream end of the wire frame 114. In an alternative former 130 shown in FIG. 12, a body portion 132 of the former 130 is made of sheet metal that has been bent to provide the desired shape, with fold lines 134 in the sheet metal replacing the welded-together shafts 116. Building the former 130 out of bent sheet metal is much simpler, and less expensive, than welding shafts together to form the wire frame former 114 shown in FIG. 11.

Expanding cones 136 at the downstream end of the former 130 expand to their greatest diameter at the downstream or narrow end of the converging chute 112 (FIG. 10), and are affixed to a downstream end of the former 130 with any suitable means for fastening, including adhesives, screws, bolts, rivets, welding, or any other means of fastening the expanding cones 136 to the downstream end of the former 130. The cones 136 act to push the sheet stock material outward from inside the crumpled sheet material before the overlapping layers of sheet material in a center region are connected together. In addition, although a tongue or extension portion 138 at the bottom of the former 130 is shown as a separate component, the tongue 138 may be formed integrally with the body 132 of the former 130.

Turning now to FIGS. 13-17, in addition to the forming assembly 110, the conversion assembly 34 also includes a feeding/connecting assembly 140 downstream of the forming assembly 110 that both pulls the sheet material from the stock supply assembly 32 and through the forming assembly 110, and also connects overlapping layers of crumpled sheet stock material along a central portion between the lateral portions to form a strip of dunnage that maintains its shape.

The traditional method of loading the sheet stock material includes the steps of withdrawing a leading end of the sheet material from the stock supply assembly 32, such as the stock roll 54, passing it over the constant entry roller 90 and separating the plies as the sheet material passes the separator members 104 and 106. The leading end of the sheet stock material then has its corners folded down to form what is referred to as an airplane, an arrow, a triangle, or other pointed shape that is then fed into the forming assembly 110 and pushed forward to be engaged by rotatable members of the feeding/connecting assembly 140. Because of the distance through the forming assembly 110 to the feeding/connecting assembly 140, it is sometimes difficult, particularly with a lighter basis weight sheet stock material, to advance the leading end of the sheet stock material into engagement with the rotatable members of the feeding/connecting assembly 140 from the separator members 104 and 106 upstream of the forming assembly 110. Sometimes the rotatable members of the feeding/connecting assembly 140 fail to grasp the leading end of the stock material.

The feeding/connecting assembly 140 provided by the invention addresses this problem and makes feeding the leading end of a new supply of sheet stock material more reliable. The feeding/connecting assembly 140 provided by the invention includes a downstream pair of rotatable members 142 and 144 and an upstream pair of rotatable members 146 and 148 upstream of the downstream pair of rotatable members 142 and 144. The upstream rotatable members 146 and 148 and the downstream rotatable members 142 and 144 rotate about parallel axes, and define a path for the sheet stock material from between the upstream pair of rotatable members 146 and 148 to and between the downstream pair of rotatable members 142 and 144. In the operating position, at least one of the downstream pair of rotatable members 142 and 144 and one of the upstream pair of rotatable members 146 and 148 extend through an opening in the planar surface of the tongue portion 118 of the forming member 114 to engage its opposite rotatable member or to pinch the sheet stock material passing between the upstream rotatable members 146 and 148. In the illustrated embodiment, the lower one of the upstream rotatable members 148 extends through a bottom of the converging chute 112 and the upper one of the upstream rotatable members 146 extends through a notch in the tongue 118 of the former 114 to engage the rotatable member 148 below or to engage the sheet stock material passing therebetween.

The upstream pair of rotatable members 146 and 148 include a pair of closely spaced feed wheels or pinch rollers, also referred to as pad regulator rollers, at an upstream end of the feeding/connecting assembly 140. The upstream feed wheels 146 and 148 facilitate loading a fresh supply of sheet stock material into the dunnage conversion machine 30. The feed wheels 146 and 148 generally have a surface suitable for gripping and advancing the sheet stock material for which they are intended, and are close enough together to pinch the sheet stock material therebetween. The feed wheels 146 and 148 preferably are formed of a resilient material, such as a rubber or other polymer. Thus the feed wheels 146 and 148 pinch and advance the sheet stock material toward and preferably into the downstream rotatable members 142 and 144 that connect overlapping layers of sheet material together. Because of the feed wheels 146 and 148, the initial leading end of the sheet stock material does not have to be advanced as far before engaging the upstream rotatable members, feed wheels 146 and 148, that can take over and pull the sheet stock material from the stock supply assembly 32. The feed wheels 146 and 148 also provide another advantage, in that they buffer any excess tension in the sheet stock material, minimizing or preventing excess tension in the sheet material upstream of the feed wheels 146 and 148 from affecting the action of the feeding/connecting assembly 140.

The downstream pair of rotatable members 142 and 144 are a pair of gear-like members that can be referred to here as gears. Each gear 142 and 144 has a plurality of teeth, and the gears 142 and 144 are positioned so that when the gears 142 and 144 are in the operating position the teeth of one gear are sequentially interlaced with the teeth of the other gear as the gears 142 and 144 rotate.

Unlike many traditional gears, the gears 142 and 144 provided by the invention include a gap between the gear teeth of respective gears, sometimes called slop, to accommodate bunched or extra-thick layers of stock material passing between the gears. Although only the lower gear 144 is driven and it is the interengagement of the teeth that cause the upper gear 142 to rotate, the fit between the root and tooth of respective gears 142 and 144 is relatively loose to accommodate bunching of crumpled sheet material therethrough as the gears 142 and 144 advance the sheet material.

The gears 142 and 144 both draw the sheet stock material therethrough and perforate and punch overlapping layers of sheet material passing between the gears 142 and 144. Unlike prior gear-like members, each of gears 142 and 144 has a greater dimension parallel to its rotational axis and adjacent the rotational axis than at a peripheral extent of the teeth. As shown, each gear 142 and 144 includes a plurality of axially-spaced segments, specifically three segments 152, 154, and 156. Each segment 152, 154, and 156 represents a slice of the gear 142 or 144 perpendicular to its rotational axis. Axially-outer segments 152 and 156 have a wedge-like shape with a thicker dimension in a central portion of the gear 142 or 144 adjacent the axis, and a relatively thinner dimension at an outer periphery or the peripheral extent of the teeth. The inner or center segment 154 between the axially-outer segments 152 and 156 is substantially planar. The wedge shape of the gears 142 and 144 is believed to encourage the sheet stock material adjacent the gears 142 and 144 to be pushed outward rather than passing through the gears 142 and 144 and being compressed.

The inner center segment 154 also has shorter, narrower teeth that are rotationally offset relative to the teeth of the adjacent, outer segments 152 and 156. These teeth also are squared off at a distal end. Accordingly, as the longer teeth of the outer segments 152 and 156 of one gear 142 or 144 press sheet material toward the root of the opposing gear 144 or 142, a tooth of the center segment 154 presents its sharp, squared-off edges to the sheet material.

The edges of the teeth of the center segment 154 create a pair of parallel slits in the sheet material and tab portions, also referred to as tabs, between the slits. And as the teeth of the outer segments 152 and 156 push the sheet material outside the slits in one direction, the tooth of the center segment 154 of the opposing gear 142 or 144 pushes the sheet material of the tabs between the slits in an opposite direction. The gears 142 and 144 thus cooperate to displace the sheet material of the tab between the slits relative to the sheet material adjacent to and outside the slits. As multiple layers are effected simultaneously, the tab portion between the slits includes multiple layers as well. Friction between the edges of the sheet material in the tab portion relative to the sheet material outside the slits, tends to hold the layers of sheet material together.

Unlike some prior feeding/connecting gears, both of the gears 142 and 144 provided by the present invention form tabs, and thus the tabs are displaced in both directions, on both sides of the sheet material. Thus, the gears 142 and 144 form pairs of intermittent, regularly-spaced pairs of parallel slits in the sheet stock material with central portions between the slits displaced from the plane of adjacent portions of the sheet material to form tabs such that friction between the edges of the layers sheet stock material in the tabs helps the dunnage product maintain its crumpled cushioning state. While the illustrated gears 142 and 144 only include three segments 152, 154, and 156, additional segments can be provided to create additional rows of slits and tabs in the dunnage product to further enhance the connecting function of the feeding/connecting assembly 140.

The dunnage conversion machine 30 may further include a motor 160 that drives at least one of the gears 144 about its axis, and the interlaced teeth of the driven gear 144 drive rotation of the other gear 142. The motor 160 also drives at least one of the feed wheels 148, which drives the other feed wheel 146 through frictional contact with the driven feed wheel 148 or the sheet material interposed between the feed wheels 146 and 148. The feed wheels 146 and 148 feed the sheet stock material therethrough at the same rate as the gears 142 and 144 feed sheet stock material therethrough. Consequently, unlike in some other conversion machines, the feed wheels 146 and 148 and the gears 142 and 144 cause no longitudinal crumpling or bunching from differences in feed rates.

Accordingly, a method of converting a sheet stock material into a relatively lower density dunnage product includes the steps of pulling a sheet stock material from a supply of sheet stock material using a pair of rollers or feed wheels 146 and 148, feeding the sheet stock material from between the rollers 146 and 148 to a pair of gears 142 and 144, and passing the sheet stock material between the pair of gears 142 and 144, where the feeding and passing steps occur at substantially the same rate.

The feeding/connecting assembly 140 also includes a carriage 170 pivotally mounted to the frame 40 that supports a first one of the downstream rotatable members 142 and a first one of the upstream rotatable members 146. The carriage 170 has a pivot axis spaced from the axes of the rotatable members 142, 144, 146, and 148 that enables pivoting movement of the carriage 170 and the first gear 142 and the first feed wheel 146 from an operating position where the first gear 142 and the first feed wheel 146 are in engagement with a respective second gear 144 and second feed wheel 148, and a loading position where the first gear 142 and the first feed wheel 146 are removed from the respective second gear 144 and second feed wheel 148. The carriage pivot axis is parallel to the axes of rotation of the rotatable members 142, 144, 146, and 148. Pivoting the carriage 170 and raising the feed wheel 146 also raises the upper feeding/connecting gear 142 to facilitate clearing jams or otherwise performing maintenance on the dunnage machine 30.

Figure 13:
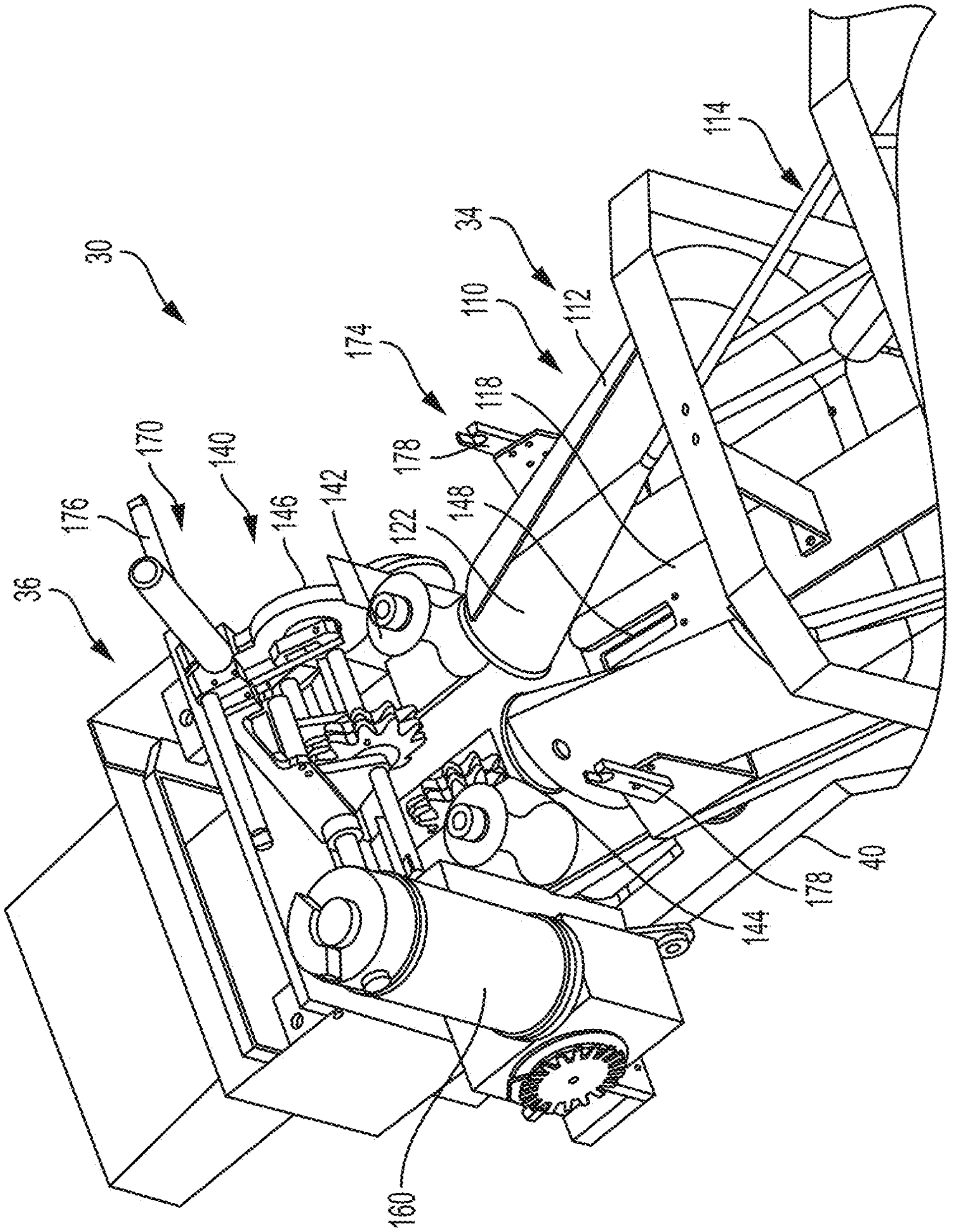
FIG. 13 is a perspective view of conversion assembly in the machine of FIG. 1 shown in a disengaged configuration.

The feeding/connecting assembly 140 further includes a latching mechanism 174 for holding the carriage 170 in the operating position. The latching mechanism 174 includes a transverse locking shaft 176 connected to the carriage 170. The shaft 176 has eccentrics on distal ends that are received in slots in respective laterally-spaced support members 178 extending from the frame 40. Consequently, the shaft 176 can only enter the slot in a particular orientation, and once the end of the shaft 176 enters the slot in the support members 178, rotation of the shaft 176 locks it in place and prevents the shaft 176 from lifting out of the slot and disengaging the support members 178. This makes it easier to rotate and move both the upper gear 142 and the upper wheel 146 out of the way to load a new supply of sheet stock material, to clear jams, etc., as shown in FIG. 13. A portion of the housing can be attached to the carriage 170 such that opening the housing also separates the respective upper and lower rotatable members 142, 144, 146, and 148 to facilitate greater access to the conversion assembly 34.

The feeding/connecting assembly 140 provided by the invention thus makes loading a new supply of sheet stock material more reliable because the feed wheels 146 and 148 can better ensure that the gears 142 and 144 engage the leading end of the sheet material. Moreover, the separation of the upper rotating members (gear 142 and feed wheel 146) and lower rotating members (gear 144 and feed wheel 148) facilitates feeding the leading end of the sheet material between the upper and lower rotating members. With the carriage 170 in the loading position, the leading end of the sheet stock material no longer has to be folded into an arrow shape, but is threaded into the converging chute 112, under the former 114, and around the expanding cones 136.

Once the leading end of the sheet material is in engagement with the lower gears 144, the carriage 170 can be returned to the operating position and latched, bringing the upper gear 142 into engagement with the lower driven gear 144, and the upper feed wheel 146 into engagement with the lower feed wheel 148, although now with sheet stock material interposed between the upper and lower rotating members. Now, when the gears 142 and 144 begin to rotate, even if the sheet material is not sufficiently advanced for the gears 142 and 144 to grasp the leading end of the sheet, the feed wheels 146 and 148 continue to advance the sheet material and thus more reliably ensure that the gears 142 and 144 grasp and advance (and connect) the sheet material.

Downstream of the feeding/connecting assembly 140 is a severing assembly 36 for severing discrete dunnage products from the strip of dunnage output from the feeding/connecting assembly 34.

Figure 18:
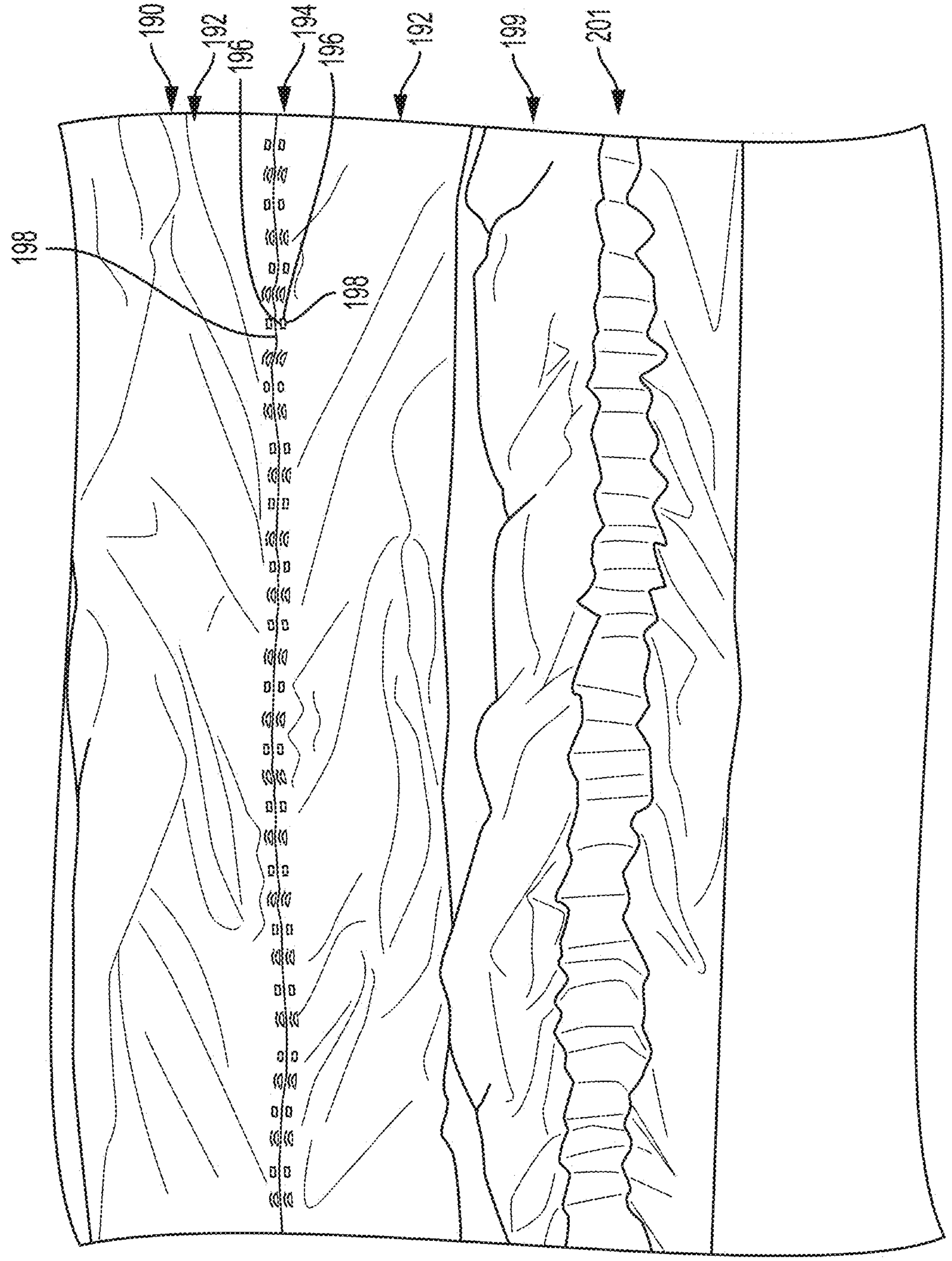
FIG. 18 is an illustration of a dunnage product produced by the dunnage conversion machine of FIG. 1 in comparison with a prior art dunnage product.
Figure 19:
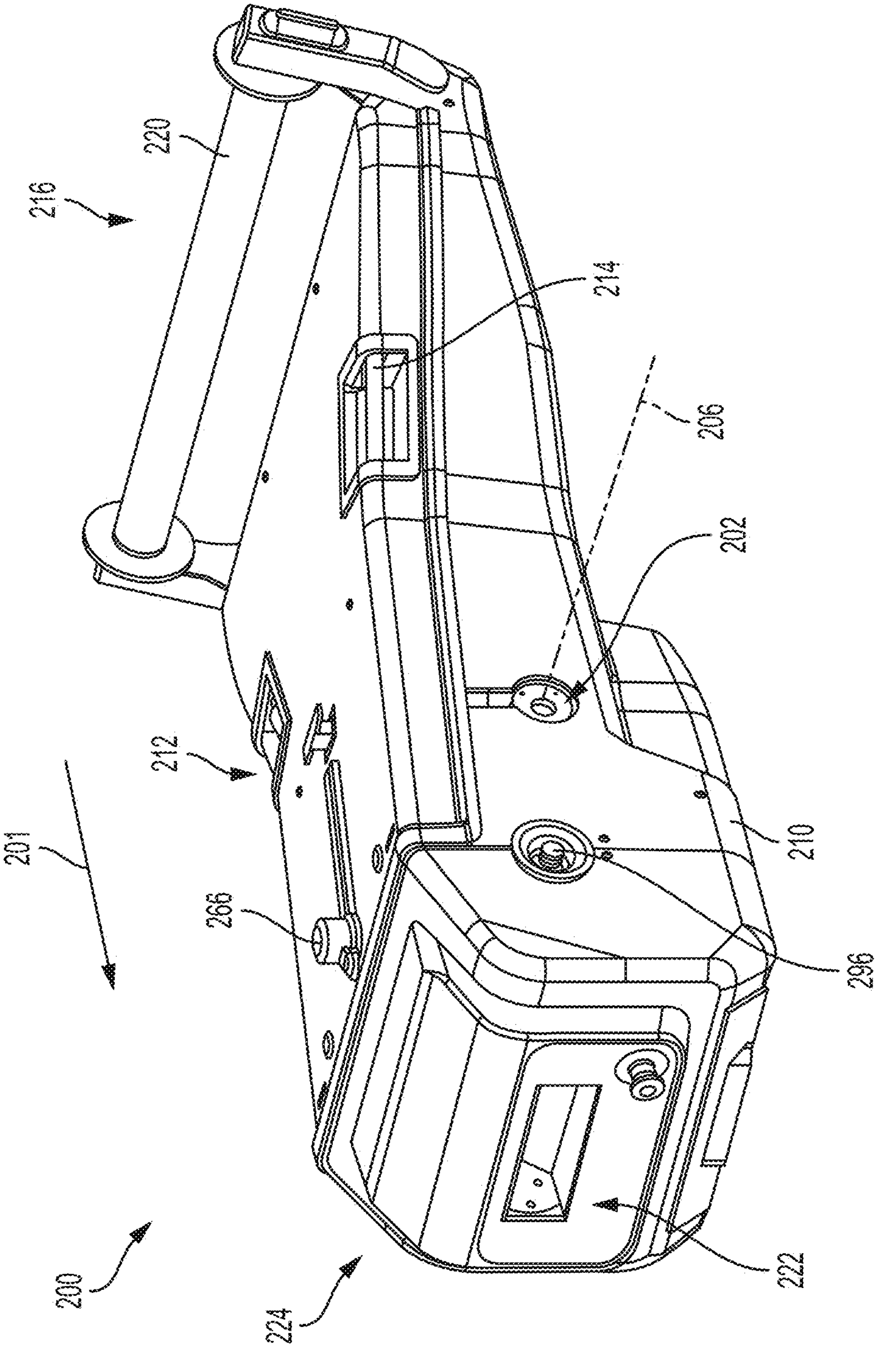
FIG. 19 is a perspective view of an alternative embodiment of a dunnage conversion machine provided in accordance with the present invention.
Figure 20:
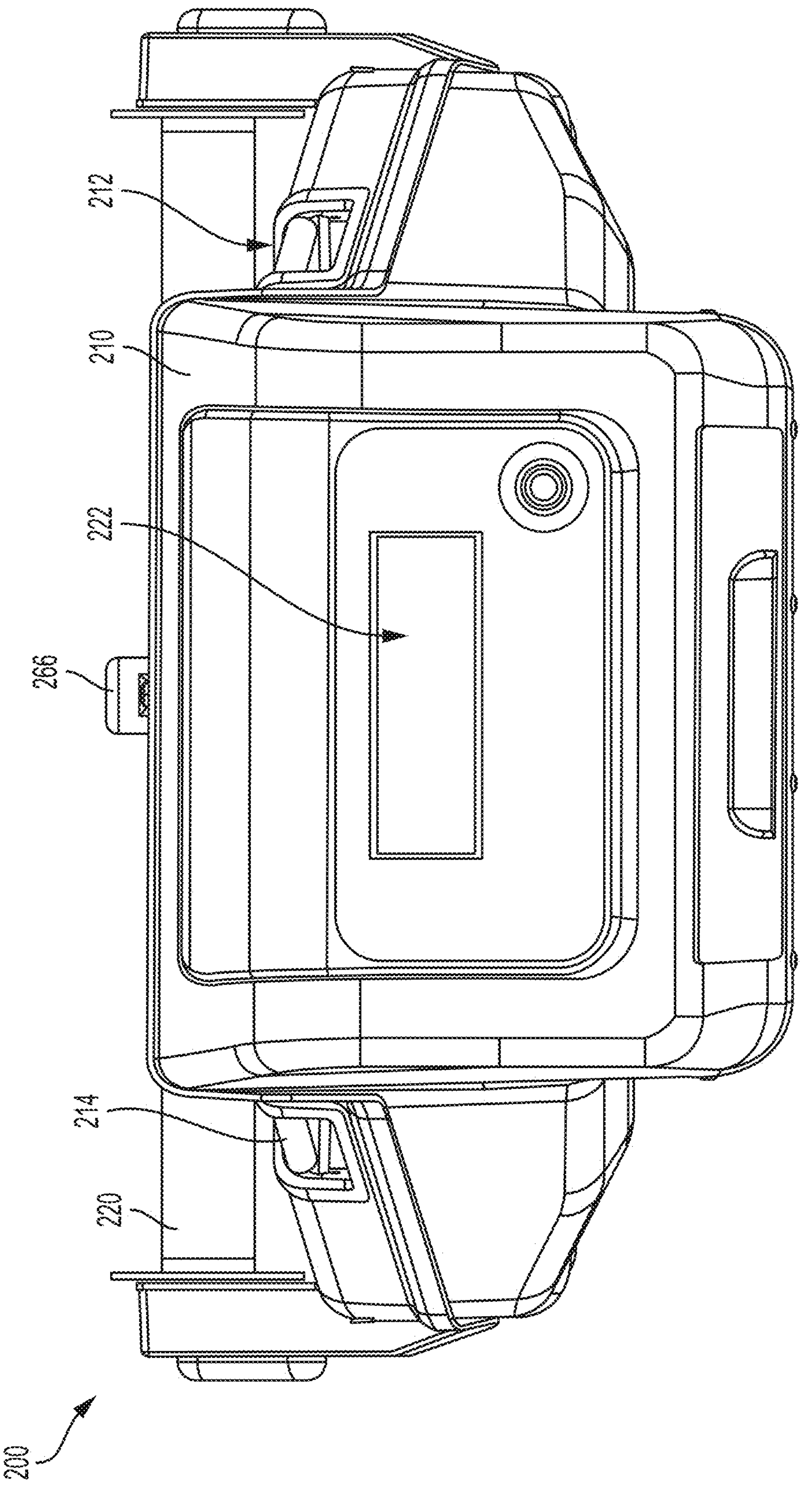
FIG. 20 is a front elevation view of the dunnage conversion machine of FIG. 19.
Figure 21:
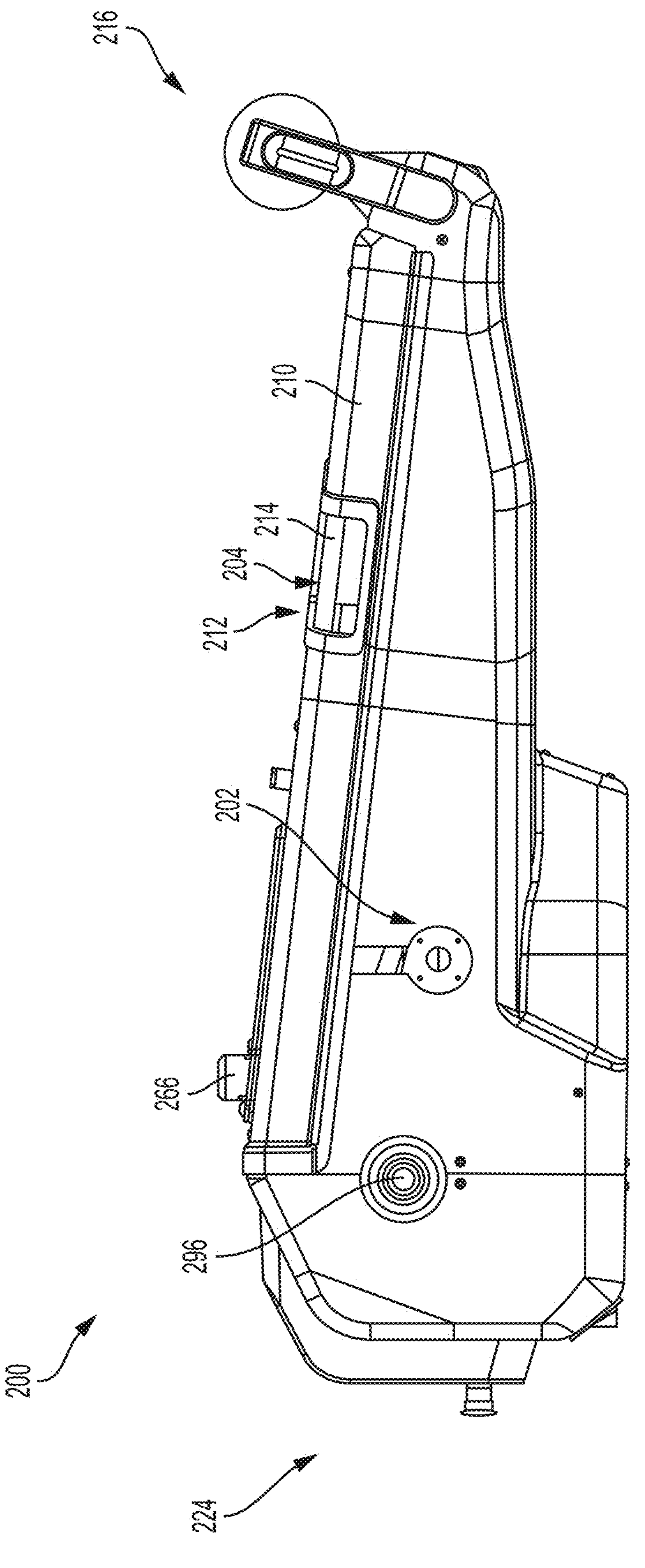
FIG. 21 is a right side elevation view of the dunnage conversion machine of FIG. 19.
Figure 22:
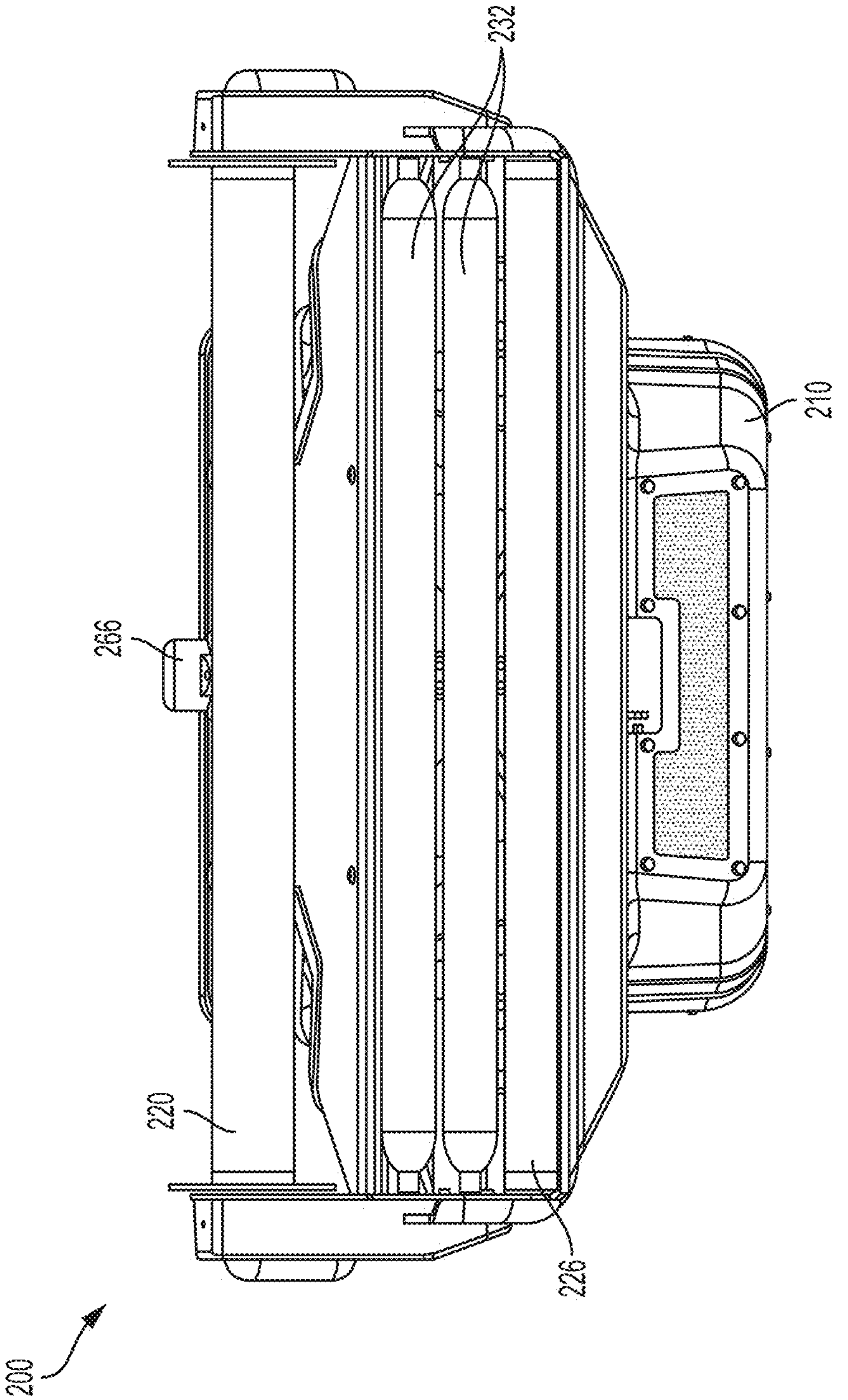
FIG. 22 is a rear elevation view of the dunnage conversion machine of FIG. 19.
Figure 23:
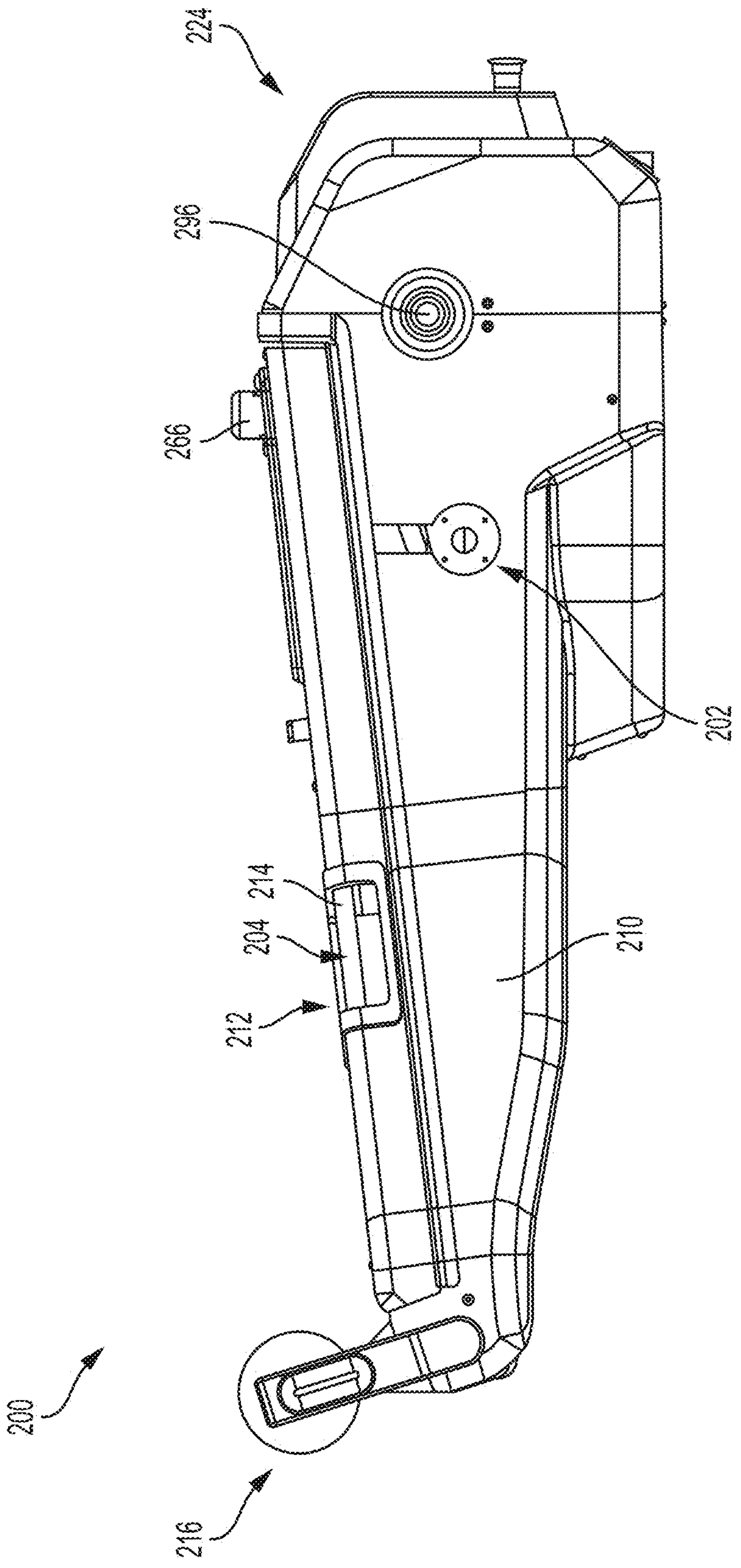
FIG. 23 is a left side elevation view of the dunnage conversion machine of FIG. 19.
Figure 24:
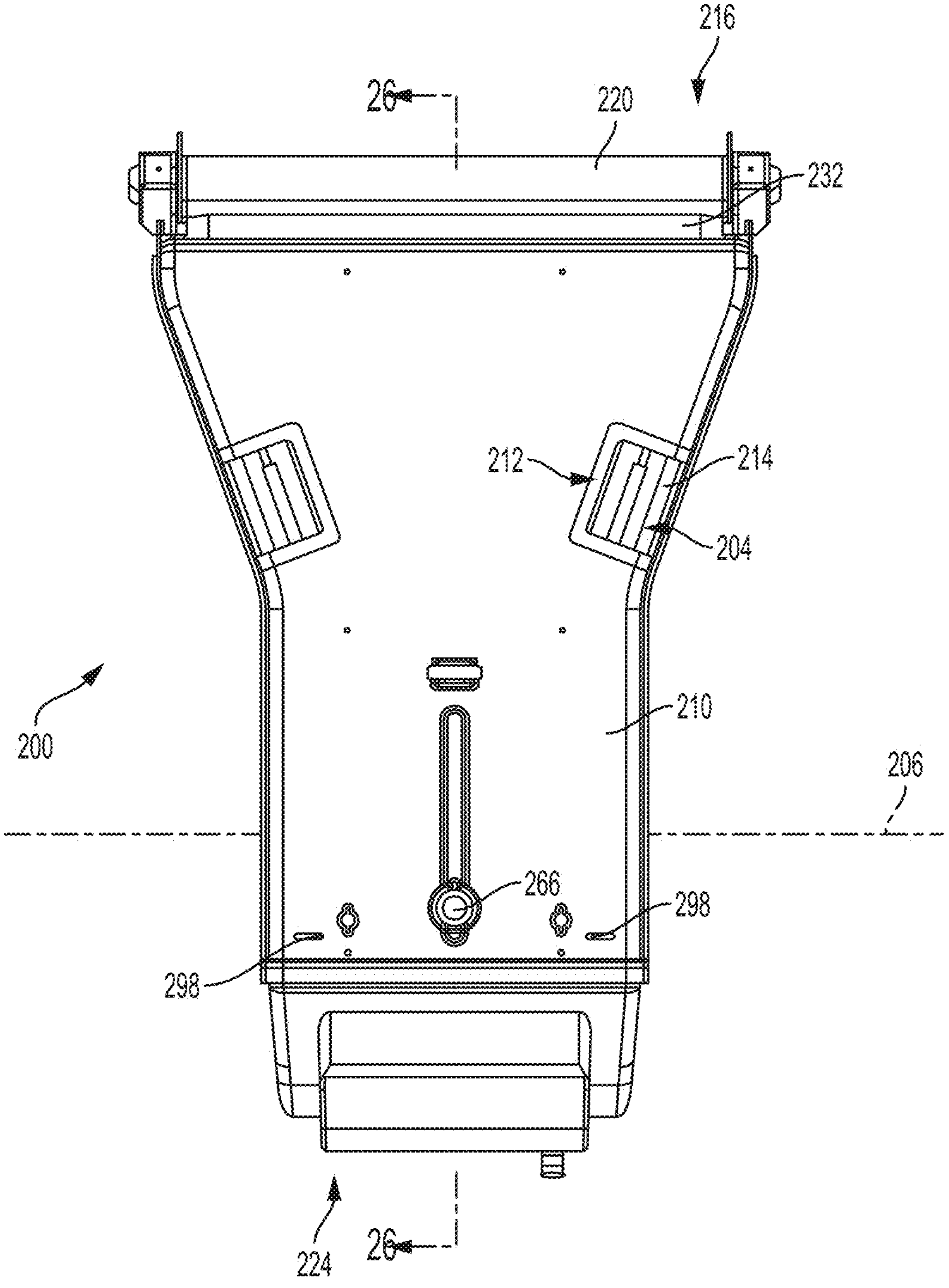
FIG. 24 is a top view of the dunnage conversion machine of FIG. 19.
Figure 25:
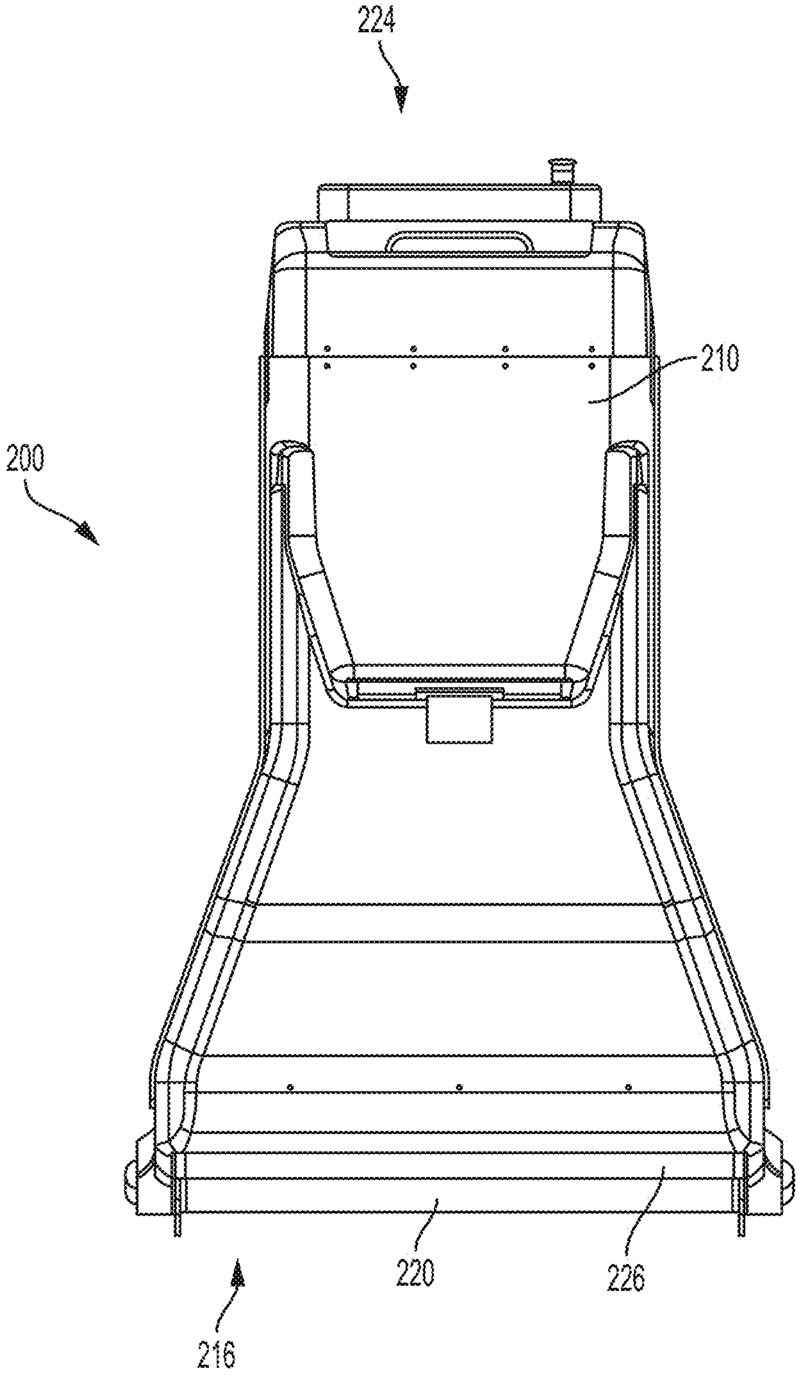
FIG. 25 is a bottom view of the dunnage conversion machine of FIG. 19.

As seen in FIG. 18, the present invention also provides a dunnage product 190 that includes one or more plies of sheet stock material. The dunnage product 190 has cushioning lateral pillow portions 192, and the overlapping layers of lateral portions of the sheet stock material are connected together along a central band 194 between the lateral pillow portions 192. During the conversion process, the sheet stock material is randomly crumpled and lateral edge portions are folded over a central portion of the sheet. The overlapping layers in the central portion are connected together with two parallel rows of slits 196 and corresponding tabs 198 between the slits 196. The slits 196 are periodically spaced and the sheet material between and outside the slits 196 is displaced out of a generally planar configuration to form a tab 198 between the slits 196 that holds the sheet stock material in its crumpled, folded configuration.

As seen in comparison to a prior dunnage product 199, the feeding/connecting assembly 140 (FIG. 1) provided by the invention stitches the sheet stock material in a central portion 194 of the dunnage product 190 over a much narrower area as compared to the central connecting band 201 of the prior dunnage product 199. This leaves much more of the sheet stock material to provide cushioning rather than being stamped down and compressed in a central connecting portion of the dunnage product.

In summary, the present invention provides a conversion assembly 34 for a dunnage conversion machine 30 that includes both a downstream pair of rotatable members 142 and 144 and an upstream pair of rotatable members 146 and 148 upstream of the downstream rotatable members 142 and 144. The downstream rotatable members 142 and 144 include a pair of gears, and each gear has a plurality of teeth and is rotatable about a respective axis. The gears 142 and 144 are positioned so that the teeth of one gear are sequentially interlaced with the teeth of the other gear as the gears rotate. The upstream rotatable members 146 and 148 include a pair of feed wheels, and the gears 142 and 144 and the feed wheels 146 and 148 define a path for a sheet stock material from between the upstream pair of feed wheels 146 and 148 to between the downstream pair of gears 142 and 144. The rate at which the sheet stock material is advanced by the feed wheels 146 and 148 is the same as the rate at which the sheet stock material is advanced by the gears 142 and 144. The gears 142 and 144 also are thicker adjacent an axis of rotation and thinner at a peripheral extent of the gear teeth. The conversion machine 30 further includes a stock roll lifting mechanism 56 for lifting a stock roll from the floor to an elevated operating position and holding it there. A friction bar 76 is provided to minimize overrun that is coupled to the lifting mechanism 56 to coordinate application of the friction bar 56 against the stock roll 54. From the stock roll 54, the sheet stock material passes over a spring-biased, centrally-supported constant entry roller 90 before separating the plies and entering the conversion assembly 34 and being pulled through the feed wheels 146 and 148.

Another embodiment of a dunnage conversion machine 200 provided by the present invention is shown in FIGS. 19-46. The conversion machine 200 may be mounted to a stand or other support (not shown) through a pair of laterally-spaced mounting brackets at 202. The mounting brackets 202 are coupled to a frame 204 of the conversion machine 200 to provide a pivotable connection between the conversion machine 200 and the stand or other support. The mounting brackets 202, located on opposing lateral sides of the conversion machine 200, define a lateral pivot axis 206 for the conversion machine 200 to pivot relative to the support.

As seen in FIGS. 19-25, the conversion machine 200 has an outer housing 210 that substantially encloses the frame 204. The housing 210 has relieved portions 212 that expose portions of the frame 204, and these exposed portions of the frame 204 function as handles 214 for lifting and transporting the conversion machine 200 or adjusting its angular position about the pivot axis 206.

Figure 26:
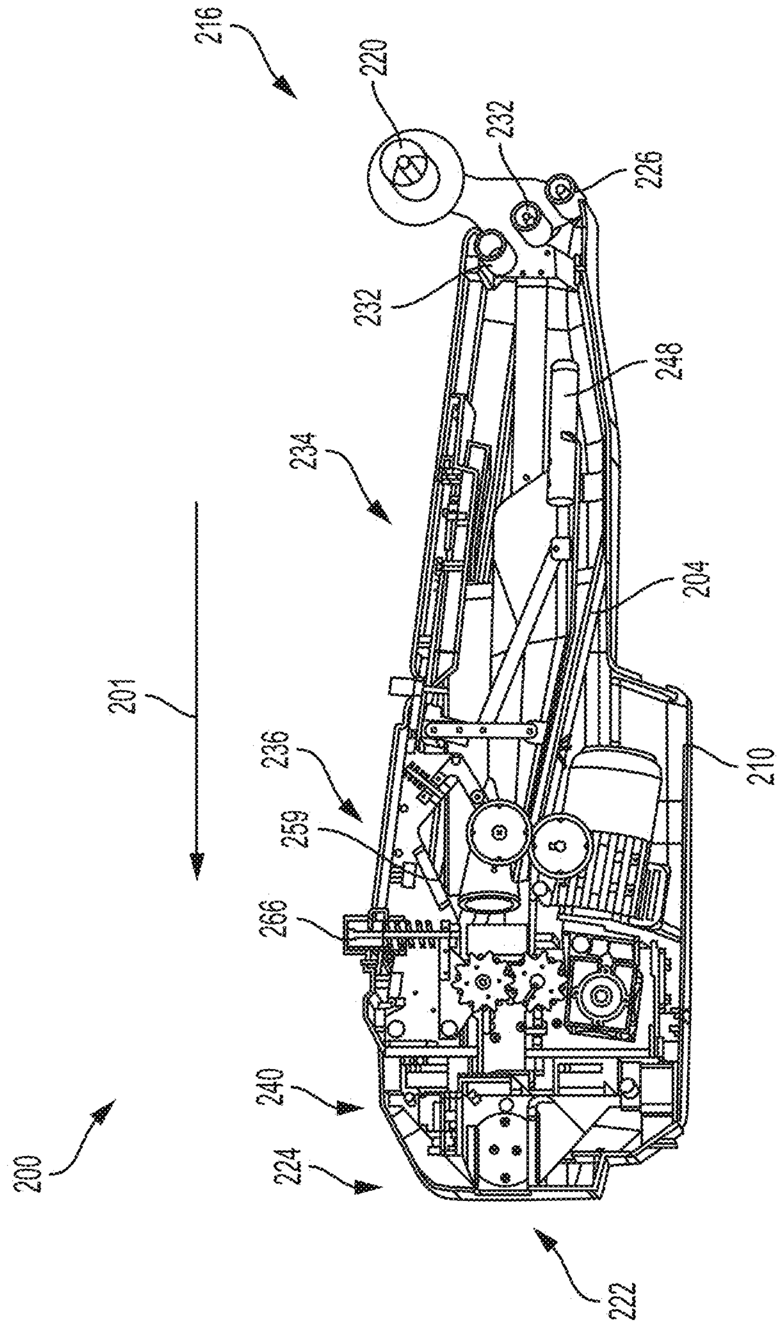
FIG. 26 is a cross-sectional right side elevation view of the dunnage conversion machine of FIG. 19, as seen along lines 26-26 of FIG. 24.

In operation, sheet stock material is fed from a supply (not shown) to an upstream end 216 of the conversion machine 200. The sheet stock material travels through the conversion machine 200 in a general upstream-to-downstream direction 201, as shown in FIG. 26, from a constant-entry roller 220 at the upstream end 216 to an outlet 222 at a downstream end 224 of the conversion machine 200.

Figure 27:
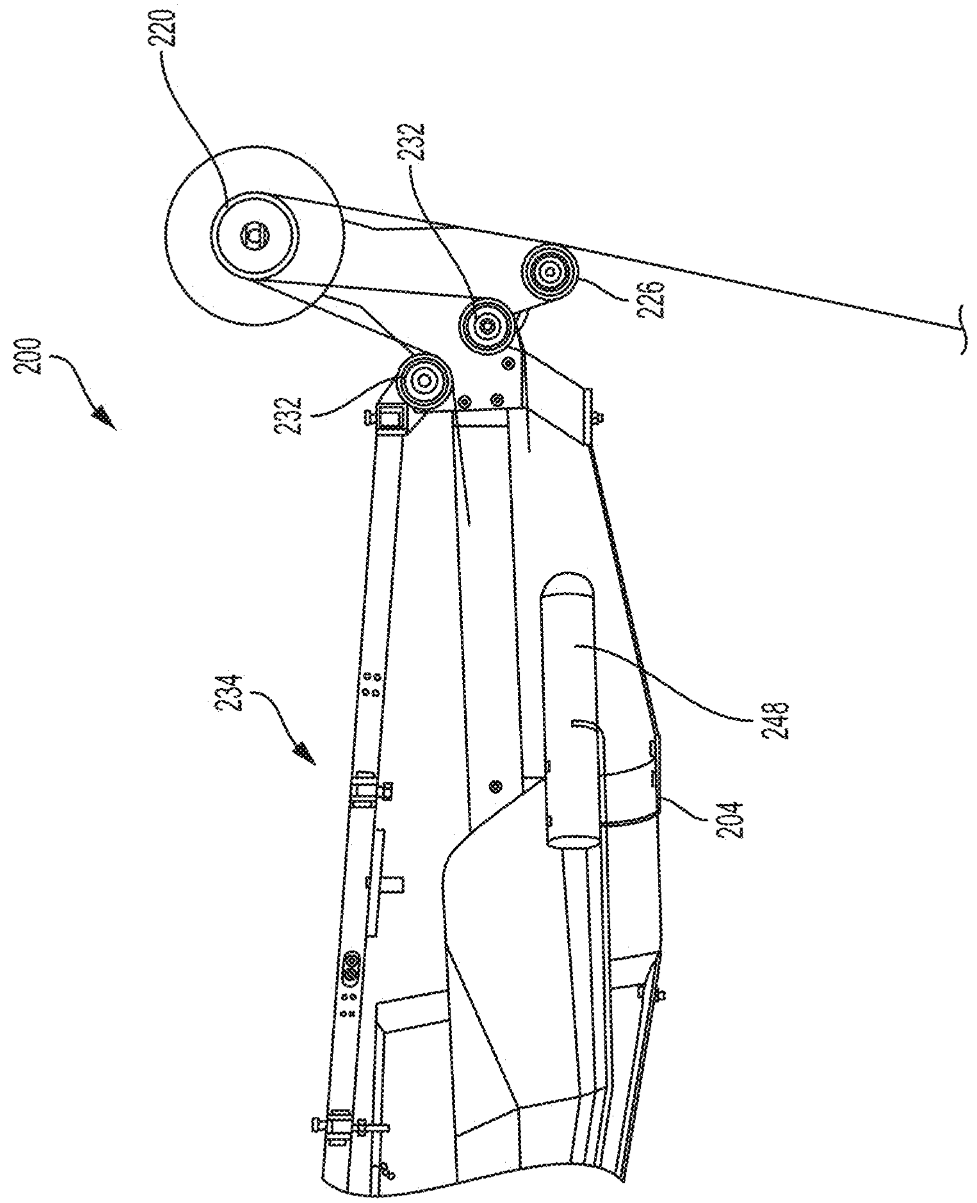
FIG. 27 is an enlarged view of an upstream end of the dunnage conversion machine of FIG. 26 with a housing portion removed to better illustrate internal components, and an added path of the sheet stock material entering the upstream end of the conversion machine.
Figure 28:
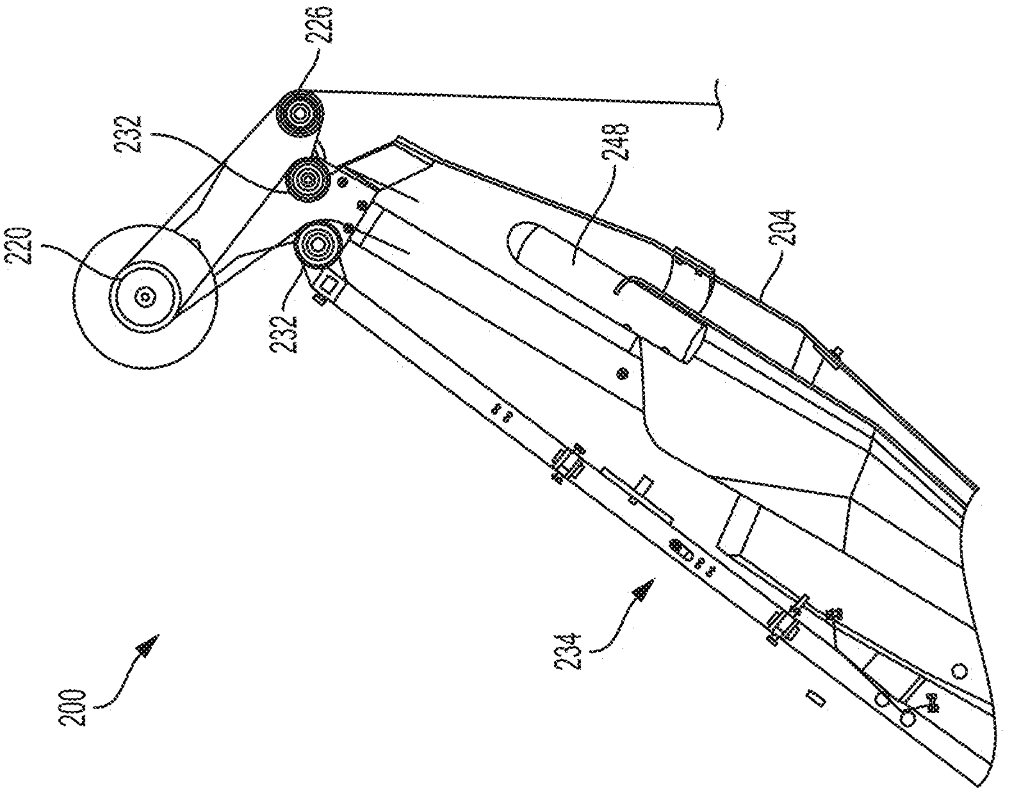
FIG. 28 is a rotated view of FIG. 27 that illustrates the effect of the rotation on the path of the sheet material.
Figure 29:
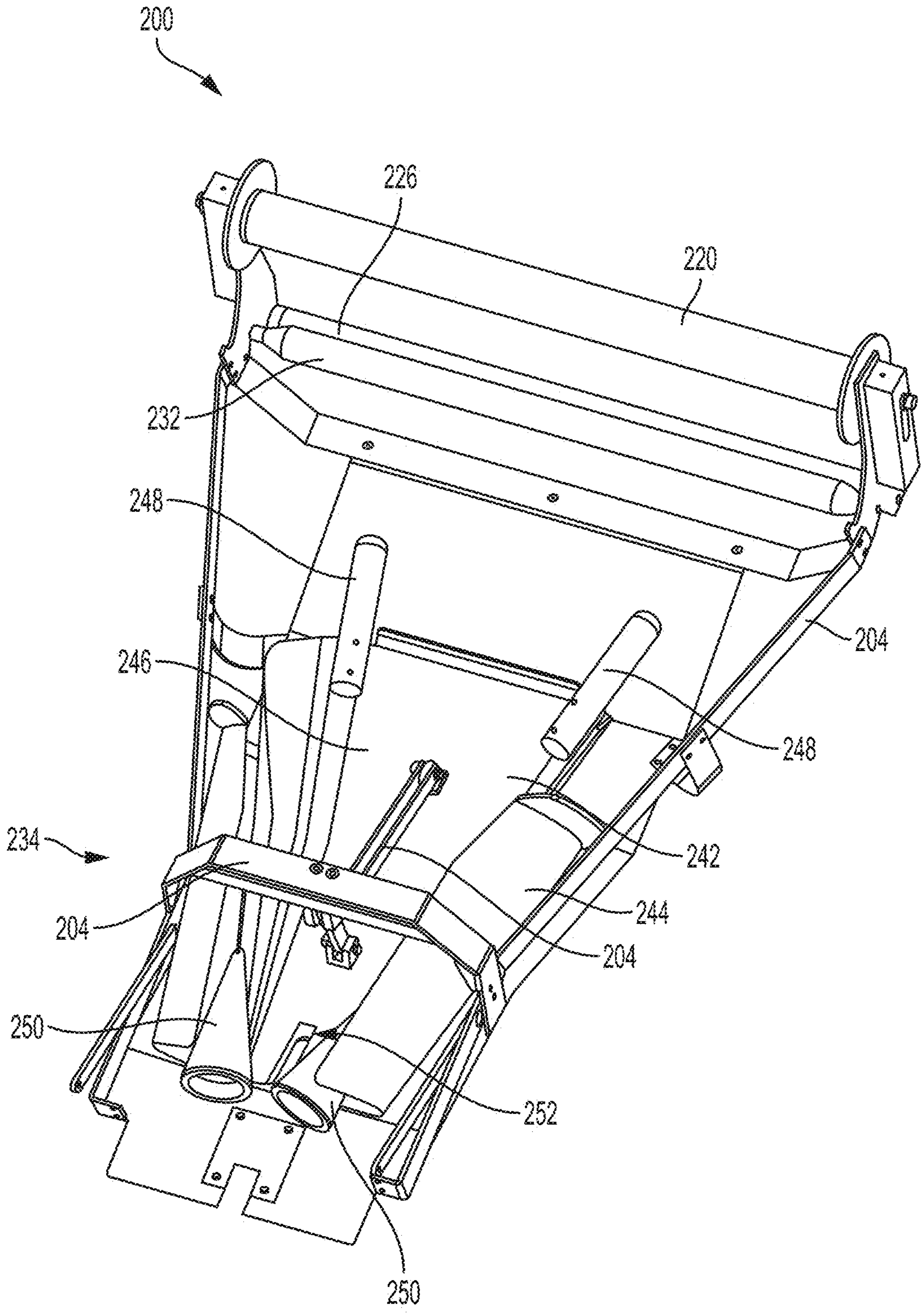
FIG. 29 is a perspective view of an upstream portion of the dunnage conversion machine of FIG. 19 with a housing portion removed to illustrate internal components.
Figure 30:
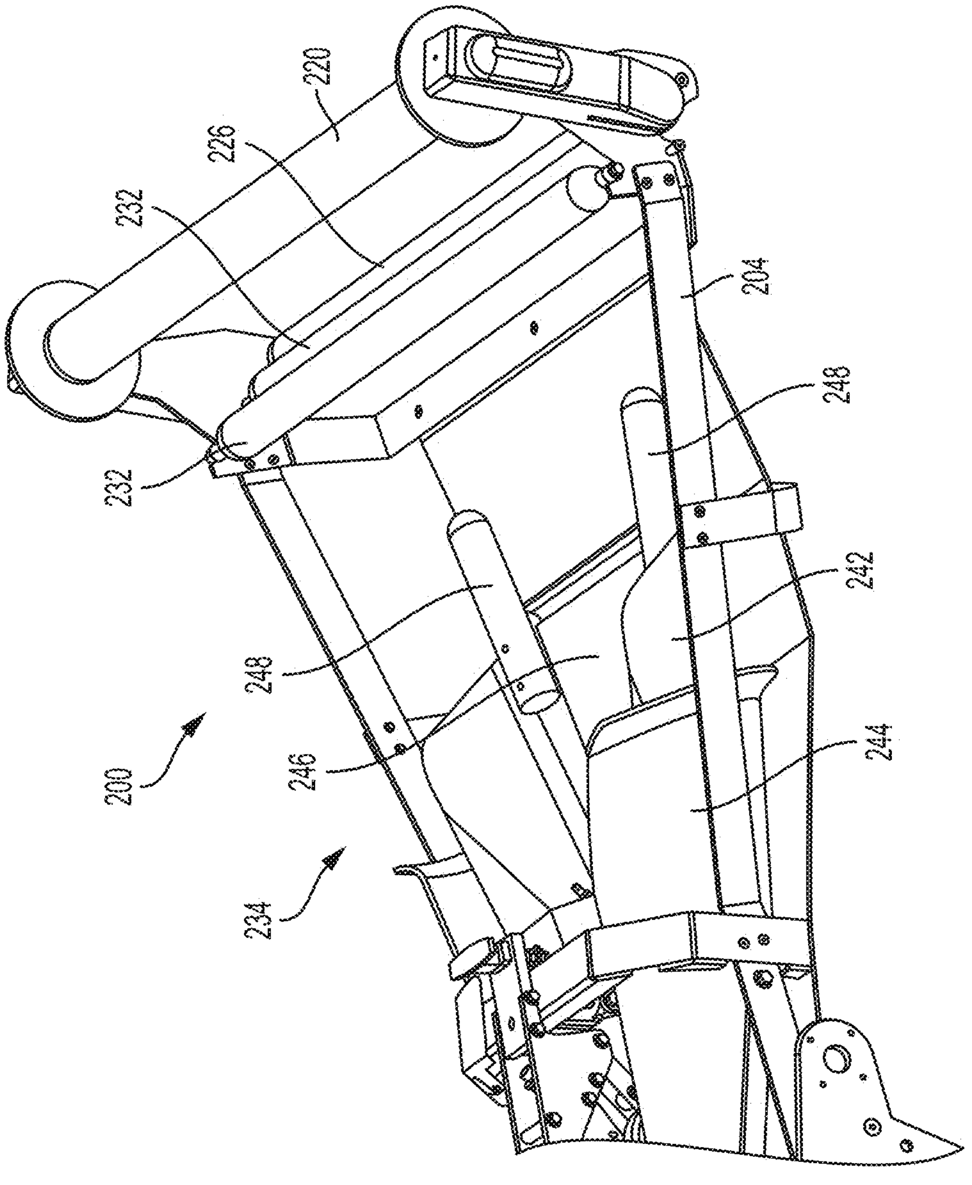
FIG. 30 is an enlarged perspective view of the portion of the dunnage conversion machine of FIG. 29 as seen from a different angle.
Figure 31:
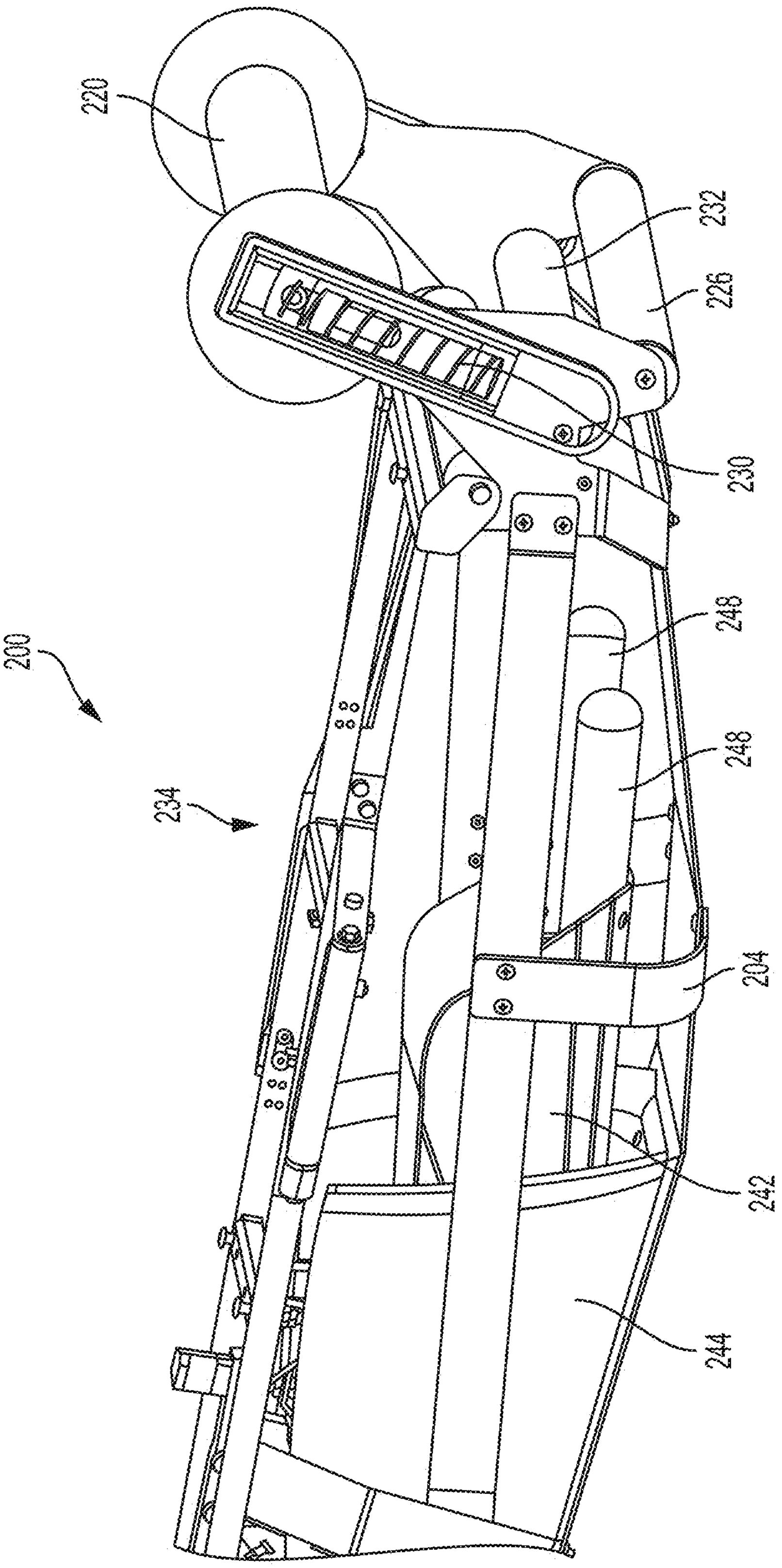
FIG. 31 is an enlarged perspective view of the portion of the dunnage conversion machine of FIG. 30 with a cover portion of a biasing assembly removed to reveal an internal spring.
Figure 32:
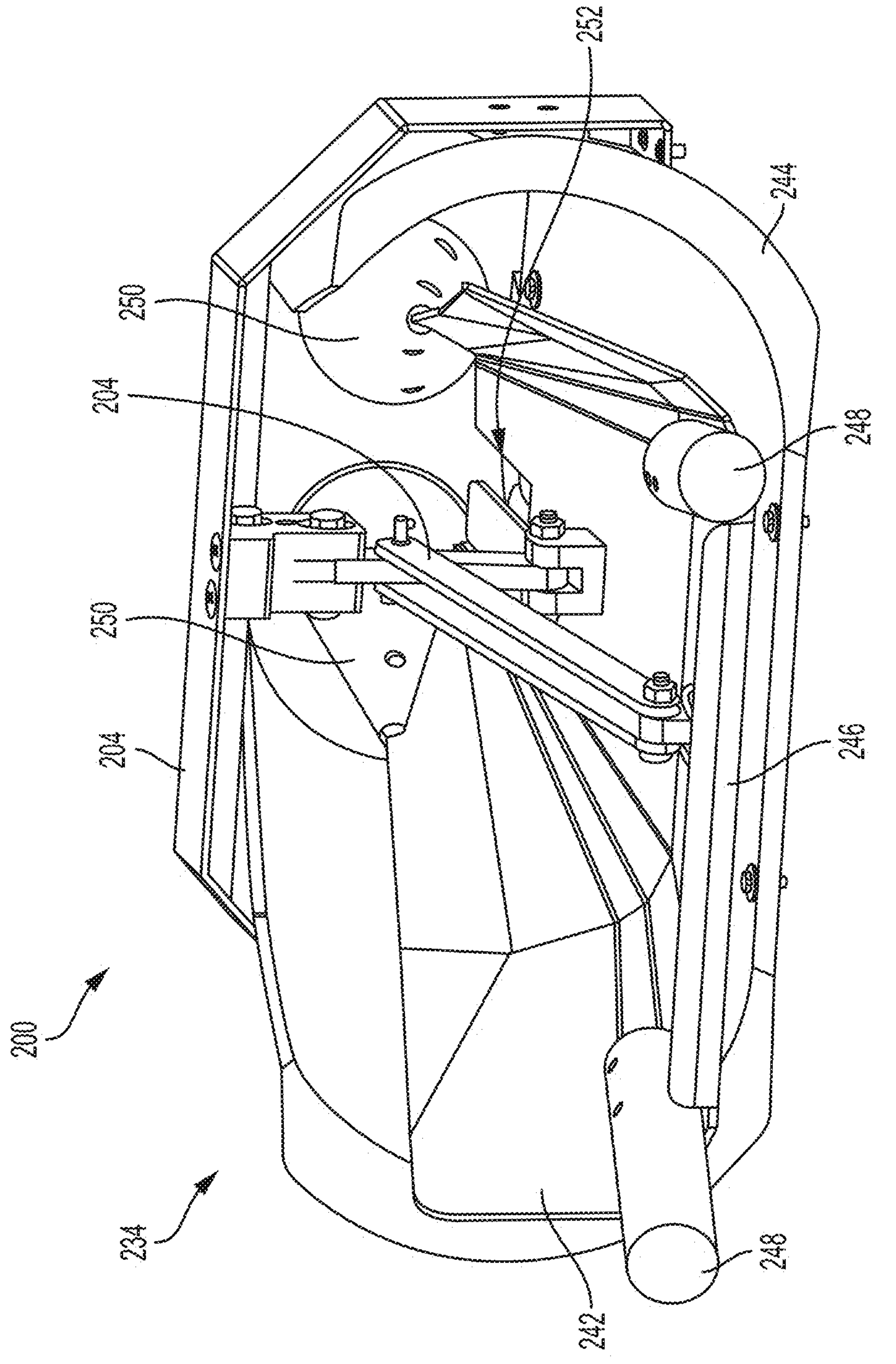
FIG. 32 is a perspective view of a subassembly of the portion of the dunnage conversion machine of FIG. 29.

As seen in FIGS. 27 and 28, the conversion machine 200 further includes an additional guide roller 226 outside the housing 210 that may guide the sheet stock material to the constant-entry roller 220. The guide roller 226 helps to guide the sheet stock material from a supply to the constant-entry roller 220 when the dunnage conversion machine 200 has been rotated from a generally horizontal orientation, such as shown in FIG. 27, to an inclined position like that shown in FIG. 28. The guide roller 226 thus increases the range of angles at which the dunnage conversion machine 200 may be mounted relative to a supply of sheet material, and thereby provides an increase in the range of directions in which the outlet 222 of the conversion machine 200 can point to dispense dunnage.

As in the previous embodiment, the constant-entry roller 220 provides a consistent point of entry for the sheet material into the conversion machine 200. Unlike the previous embodiment, however, the illustrated constant-entry roller 220 is mounted to the frame 204 of the conversion machine 200 through laterally-spaced springs 230 (FIG. 31) that support lateral ends of the constant-entry roller 220. The constant-entry roller 220 is mounted for movement in a direction transverse the upstream-to-downstream direction, and the springs 230 bias the constant-entry roller 220 to an upper position to help smooth out fluctuations in the tension in the sheet stock material. By providing some relief from higher tension conditions, the biased constant-entry roller helps to minimize the chances that the sheet material will tear as it is being drawn into the conversion machine. Maintaining a more uniform tension in the sheet material also helps to form a more consistent dunnage product. Increased tension in the sheet stock material compresses the springs 230, relieving some of the tension to minimize or eliminate tearing of the sheet material and provide more consistent tension in the sheet material as it is formed into a dunnage product.

The conversion of sheet stock material into a dunnage product is similar in this embodiment to that of the preceding embodiment. From the constant-entry roller 220, respective plies of the sheet stock material follow separate paths around one or more separators 232, which also may be rollers, to separate the plies. The sheet material then travels through a forming assembly 234 that shapes and randomly crumples the sheet stock material. Separating the plies and then drawing each ply into the forming assembly 234 along a different path increases the opportunity for each ply to randomly crumple in a different manner, creating more loft and increasing the cushioning properties of the resulting strip of dunnage.

From the forming assembly 234, the crumpled strip of dunnage is drawn through a feeding/connecting assembly 236 that both draws the sheet material into the conversion machine 200 and connects overlapping layers of the crumpled sheet stock material to hold the crumpled strip of sheet stock material in its crumpled state. Once connected, the crumpled strip may be referred to as a strip of dunnage. A severing assembly 240 downstream of the feeding/connecting assembly 236 then severs discrete lengths of dunnage product from the generally continuous crumpled strip of dunnage being formed upstream of the severing assembly 240. The dunnage product leaves the conversion machine 200 through the outlet 222 at the downstream end 224 of the conversion machine 200.

In FIGS. 26-33 a portion of the housing 210 has been removed to show a portion of the frame 204 that supports the guide roller 226, the constant-entry roller 230, and one of the separators 232, along with the forming assembly 234. As the sheet material is drawn over the constant-entry roller 230 in a downstream direction into the conversion machine 200, the sheet material passes a separator 232, which separate plies of a two- or three-ply sheet material passing on different sides of the separators 232. Each ply then follows its own path to the forming assembly 234, where it passes between a forming frame 242 and a converging chute 244 that converges from a relatively larger upstream end toward a relatively smaller downstream end. The forming frame 242 extends into the converging chute 244 and includes a base plate 246 and a pair of extensions 248 extending upstream from the base plate 246. The base plate 246 is supported in a spaced relationship from the converging chute 244 by elements of the frame 204. The base plate 246 has substantially planar surfaces that cooperate with the converging chute 244 to define a path for the sheet stock material therebetween.

When the sheet stock material comes from a roll, the sheet material is substantially flat as it enters the conversion assembly. When the sheet stock material comes from a fan-folded stack, however, the sheet stock material is folded and compressed into a compact stack and as a result is not flat adjacent the fold lines, but extends alternately up and down at sequential fold lines. The extensions 248 extend upstream from the base plate 246 and help to "iron" the sheet material into a flatter state, with less deformation adjacent the fold lines.

As the sheet material travels through the forming assembly 234, lateral portions of the sheet material turn inwardly over the top of the base plate 246, and the sheet stock material randomly crumples in the space between the forming frame 242 and the converging chute 244. A pair of expanding cones 250 at a downstream end of the forming frame 242 internally expand the crumpled sheet material as the sheet material exits the forming assembly 234 and is drawn into the feeding/connecting assembly 236. The cones 250 expand from a relatively smaller upstream end to a relatively larger downstream end. The downstream end of the expanding cones 250 may extend downstream of the converging chute 244. The cones 250 preferably are in contact with the base plate 246 at a downstream end, whereby edges of the sheet material that wrap around the cones 250 contact the base plate 246 and are deflected and fold under in the central area between the cones 250, increasing the density of the sheet material in a central portion of the strip of dunnage. The increased density in the central portion of the crumpled strip helps to increase the holding strength of the tabs formed therein by the feeding/connecting assembly 236, as described below. The base plate 246 also has a central notch 252 in a downstream end thereof for receipt of an upstream pair of opposed, rotatable feed members 254 and 255 to help ensure that the sheet material passes from the forming assembly 236 and between the feed members 254 and 255 as it enters the feeding/connecting assembly 236.

In addition to the forming frame 242, the forming assembly 234 further may further include a forming plow 259 mounted above the cones 250 to help adjust the height of the strip of dunnage as it exits the converging chute 244. The position of the forming plow 259 is adjustable relative to the forming frame 242 and the cones 250 to engage an upper portion of the strip of dunnage passing thereunder to limit the height of the strip. The forming plow 259 is mounted to an upper portion of the housing 210 along with the upper feed member 255 and upper rotatable connecting member 258 and is movable away from the lower feed member 254 and lower connecting member 256 when the housing 210 is opened. The forming plow 259 also helps to reduce back pressure and crimp loss in the sheet material before the overlapping layers in a central portion of the crumpled strip are connected to form the connected strip of dunnage.

Figure 33:
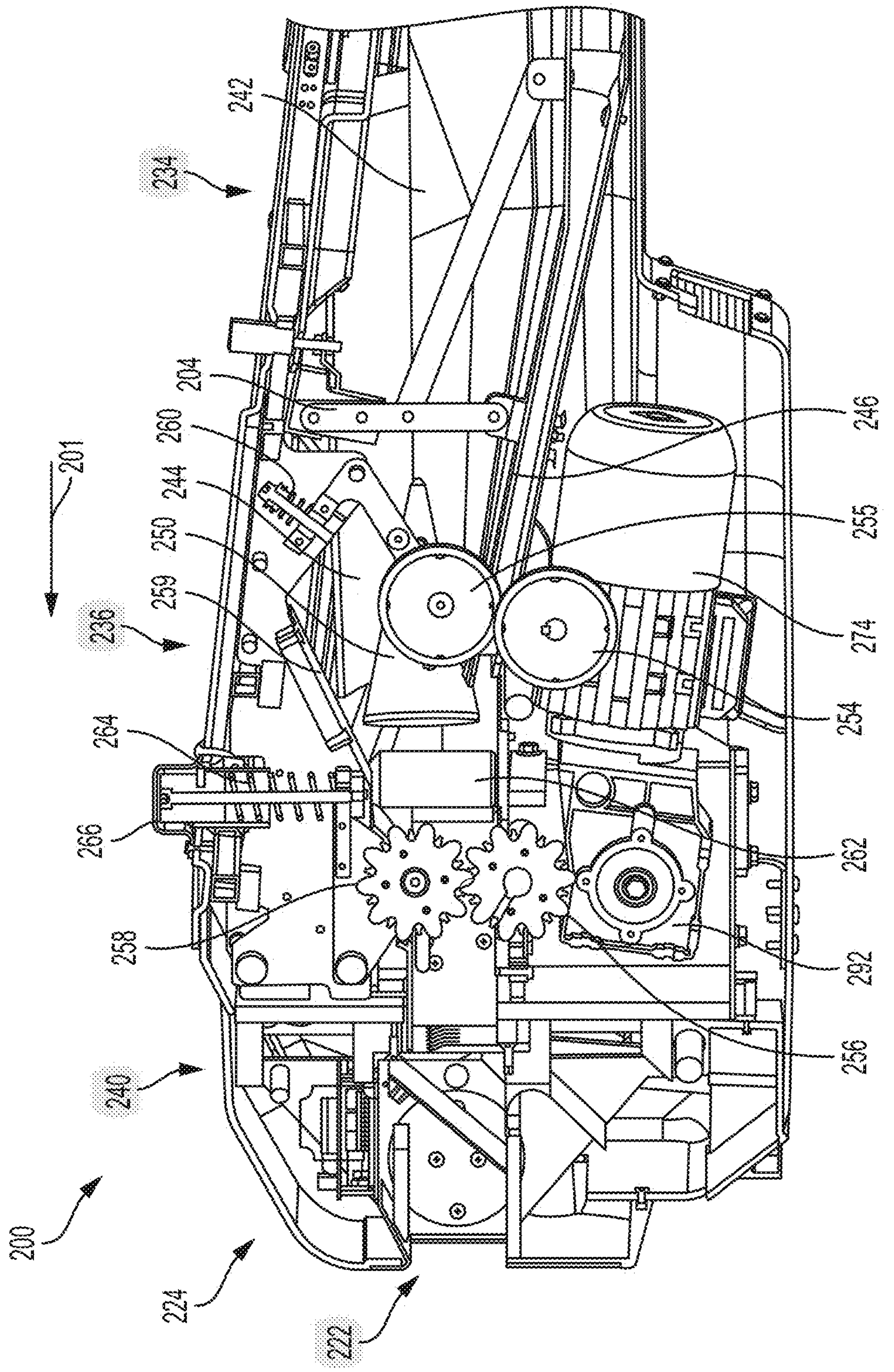
FIG. 33 is a right side elevation view of a downstream end of the dunnage conversion machine of FIG. 26.
Figure 34:
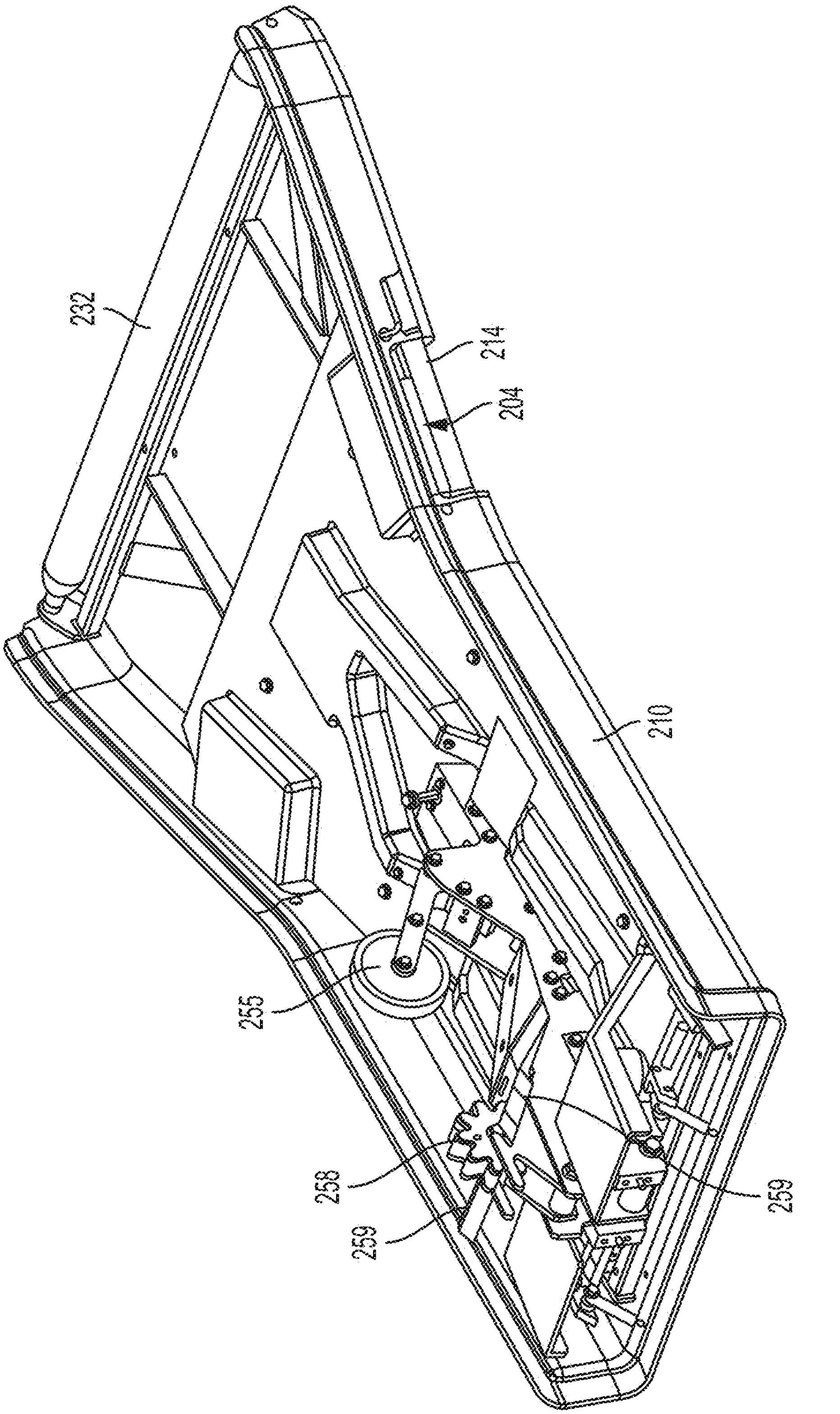
FIG. 34 is a perspective view of a top cover portion of the housing of the conversion machine of FIG. 26.
Figure 35:
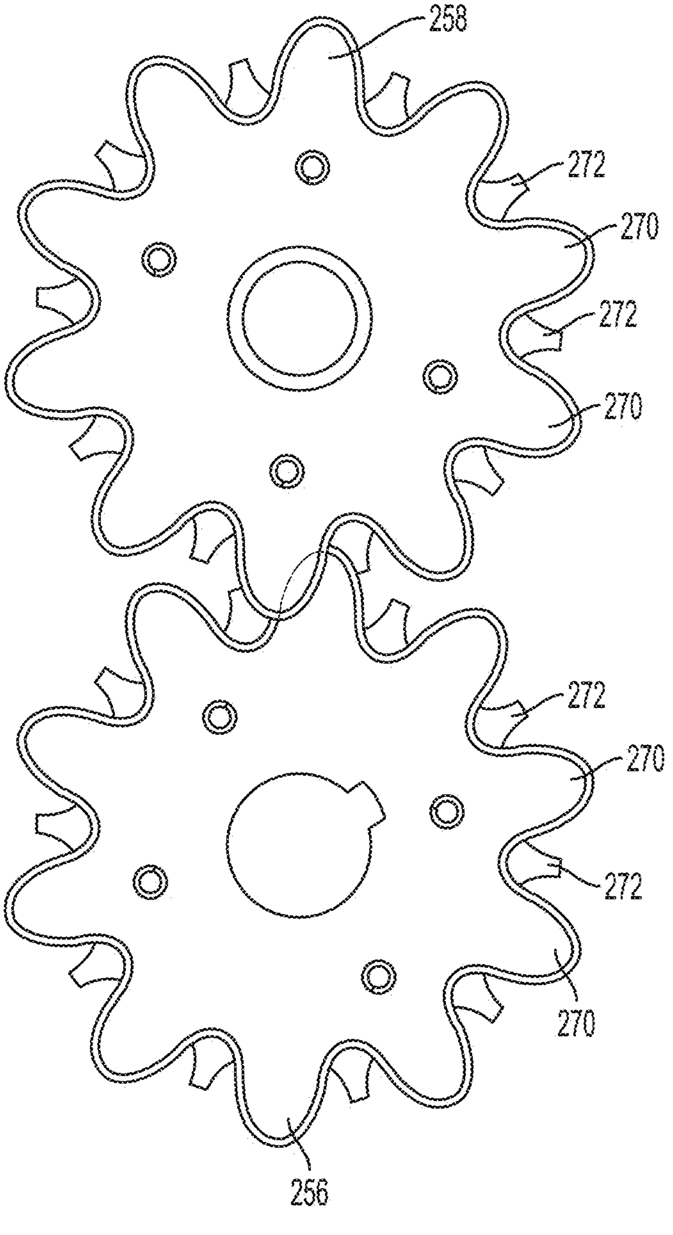
FIG. 35 is a side elevation view of a pair of rotating members for the dunnage conversion machine of FIG. 26.
Figure 36:
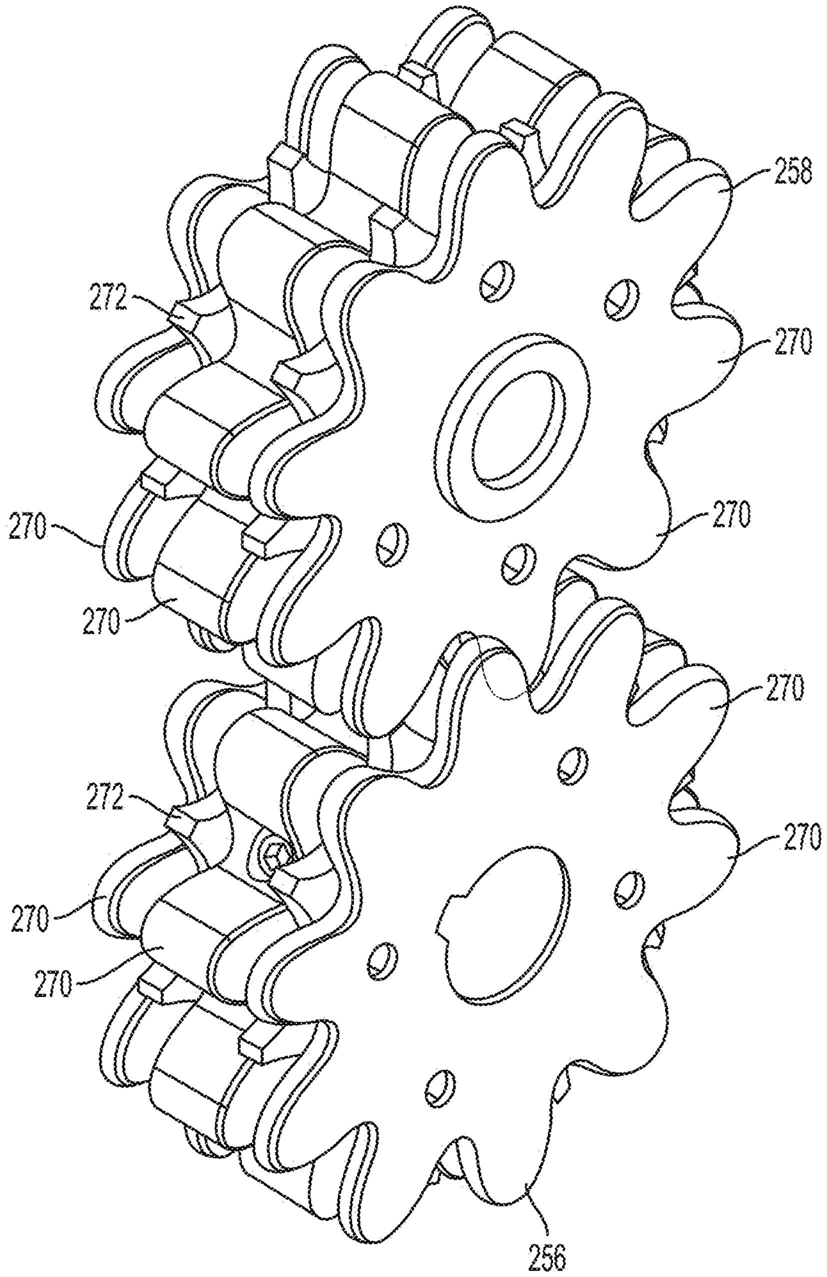
FIG. 36 is a perspective view of the rotating members of FIG. 35 from a side.
Figure 37:
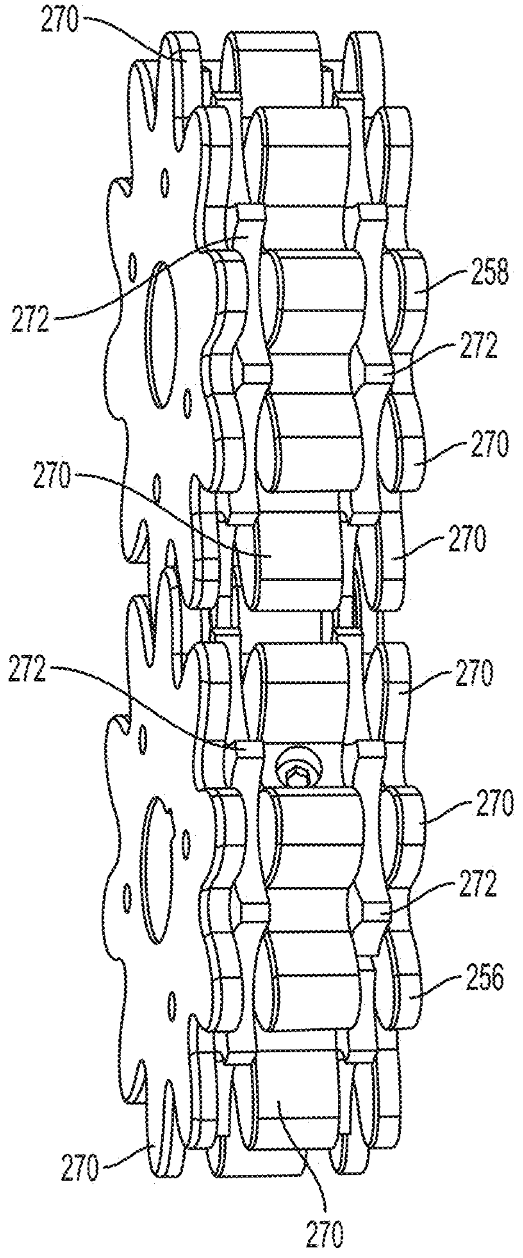
FIG. 37 is a perspective view of the rotating members of FIG. 35 from in front.

Referring now to FIGS. 33 and 34, the feeding/connecting assembly 236 includes the upstream pair of feed members 254 and 255 and a downstream pair of opposed, rotatable connecting members 256 and 258. The feed members 254 and 255, also referred to as rotating members or feed wheels, include a lower, driven feed wheel 254, and an upper feed wheel 255 that is biased toward the driven feed wheel 254, such as by a spring 260, or other biasing means. The upper feed wheel 255 is mounted to an upper portion of the housing 210, as seen in FIG. 34. The feed wheels 254 and 255 have a suitable surface for gripping the sheet material and engage, as by pinching the sheet material passing therebetween. The lower feed wheel 254 is driven and together with the upper feed wheel 255 cooperate to advance the sheet material through the converter 200, pulling the sheet material from the supply and into and through the forming assembly 234. The feed wheels 254 and 255 also help to separate or minimize the transmission of tension in the sheet material upstream of the feed wheels 254 and 255 from tension in the sheet material downstream of the feed wheels 254 and 255.

The upstream feed members 254 and 255 are synchronously driven with the downstream connecting members 256 and 258. Thus the feed members 254 and 255 operate whenever the connecting members 256 and 258 operate, typically driven by action of the same motor. Moreover, the feed members 254 and 255 operate whenever the connecting members 256 and 258 advance sheet stock material between respective upstream and downstream rotatable members 254, 255, 256, and 258 at the same rate. Consequently, the feed members 254 and 255 operate continuously while the connecting members 256 and 258 operate, and feed sheet material therethrough at the same rate to avoid longitudinal crumpling between the feed members 254 and 255 and the connecting members 256 and 258. The feed members 254 and 255 also facilitate maintaining an even rate of crimp loss (reduced length due to longitudinal crumpling when compared to the length of sheet material fed into the conversion assembly), in contrast to prior converters where the crimp loss might change dramatically from when a roll of sheet material is new to when a roll of sheet material is nearly depleted. The feed members 254 and 255 thus also ensure that drag from the roll, the constant entry roller 220, the separator rollers 232, and the forming frame 242 are isolated from the rotatable members 256 and 258. This facilitates operating the conversion machine 200 with a wider variety of sheet materials with different widths, thicknesses, and strengths.

As the sheet stock material exits the forming assembly 234 and enters the feeding/connecting assembly 236, the sheet material, now in the form of a crumpled strip, passes between the feed members 254 and 255, which advance the sheet material downstream between a pair of laterally spaced, width-adjustable rotating members or rollers 262 (also referred to as lateral guide rollers 262) that restrict the maximum width of the strip of dunnage before the feeding/connecting assembly 236 connects overlapping layers of sheet material to retain the shape of the randomly crumpled strip of dunnage. The lateral guide rollers 262 rotate about parallel axes that generally are transverse, including perpendicular, to the axes of the rotatable feed members 254 and 255, and those axes also are transverse the downstream direction. The spacing between the lateral guide rollers 262 is adjustable, in a manner further explained below.

The feeding/connecting assembly 236 includes both the feed members 254 and 255 and the connecting members 256 and 258 mentioned above. Specifically, the opposed connecting members 256 and 258 have interengaging gear-like teeth that cut a series of intermittent, longitudinally-extending, parallel slits in the sheet material, parallel to the upstream-to-downstream direction, and punch tabs between the slits out of the plane of the adjacent layers of sheet material, just like the gears of the feeding/connecting assembly 140 of the previous embodiment, so that the crumpled strip of dunnage retains its crumpled strip-like shape. The connecting members 256 and 258 include a lower, driven gear 256 and an upper gear 258 biased toward the driven gear 256, for example by a spring 264. The spring pressure is adjustable through a control knob 266 accessible from outside the housing 210 to adjust the pressure applied by the spring 264 to force the upper gear 258 against the lower gear 256.

In contrast to the gears described in connection with the prior embodiment, each gear 256 and 258 is composed of a stack of planar plates, some of which have gear-like projections 270 that cooperate to cut the slits in the sheet material and punch-like projections 272 that cooperate to push the tabs between the slits out of their planar configuration. Multiple thin flat plates are easier to manufacture than a single cast gear and can be stacked to provide a desired thickness. In the exemplary embodiment illustrated in FIGS. 35-37, the gears 256 and 258 include two parallel sets of tab-punching plates and corresponding gear-like projections 270 to form two rows of tabs in the crumpled strip, with longitudinally-spaced tabs being displaced in alternating directions relative to adjacent portions of the sheet material. In other words, the gears 256 and 258 alternately stitch the sheet material, pushing a tab above a plane of adjacent portions of the sheet material outside the slits, in an upward direction and then in a downward direction. The gears 256 and 258 provide an excellent grip on the sheet material passing therebetween, greatly assisting in preventing tearing of the sheet material at higher feed speeds, and resistance to jamming in the vicinity of the gears 256 and 258. The lower gear 256, like the lower feed member 254, is driven by a motor 274 (FIG. 33), while the upper gear 258, like the upper feed member 255, rotates freely, driven by interengagement with the lower gear 256.

The upper gear 258, like the upper feed wheel 255, also is mounted to the upper portion of the housing 210, specifically a top wall of the housing, so that upon opening the housing 210 by moving this upper portion or top wall, the upper and lower feed wheels 254 and 255 and the upper and lower gears 256 and 258, respectively separate to facilitate loading a new supply of sheet material into the dunnage converter 200 and to facilitate clearing jams. In the illustrated embodiment, the upper portion of the housing 210 is pivotally mounted at a downstream end, such that opening the upper portion of the housing 210 also separates the upper feed wheel 255 from the lower feed wheel 254 and the upper gear 258 from the lower gear 256, and exposes the path of the sheet material between the upper and lower feed wheels 255 and 254 and the upper and lower gears 258 and 256.

Figure 38:
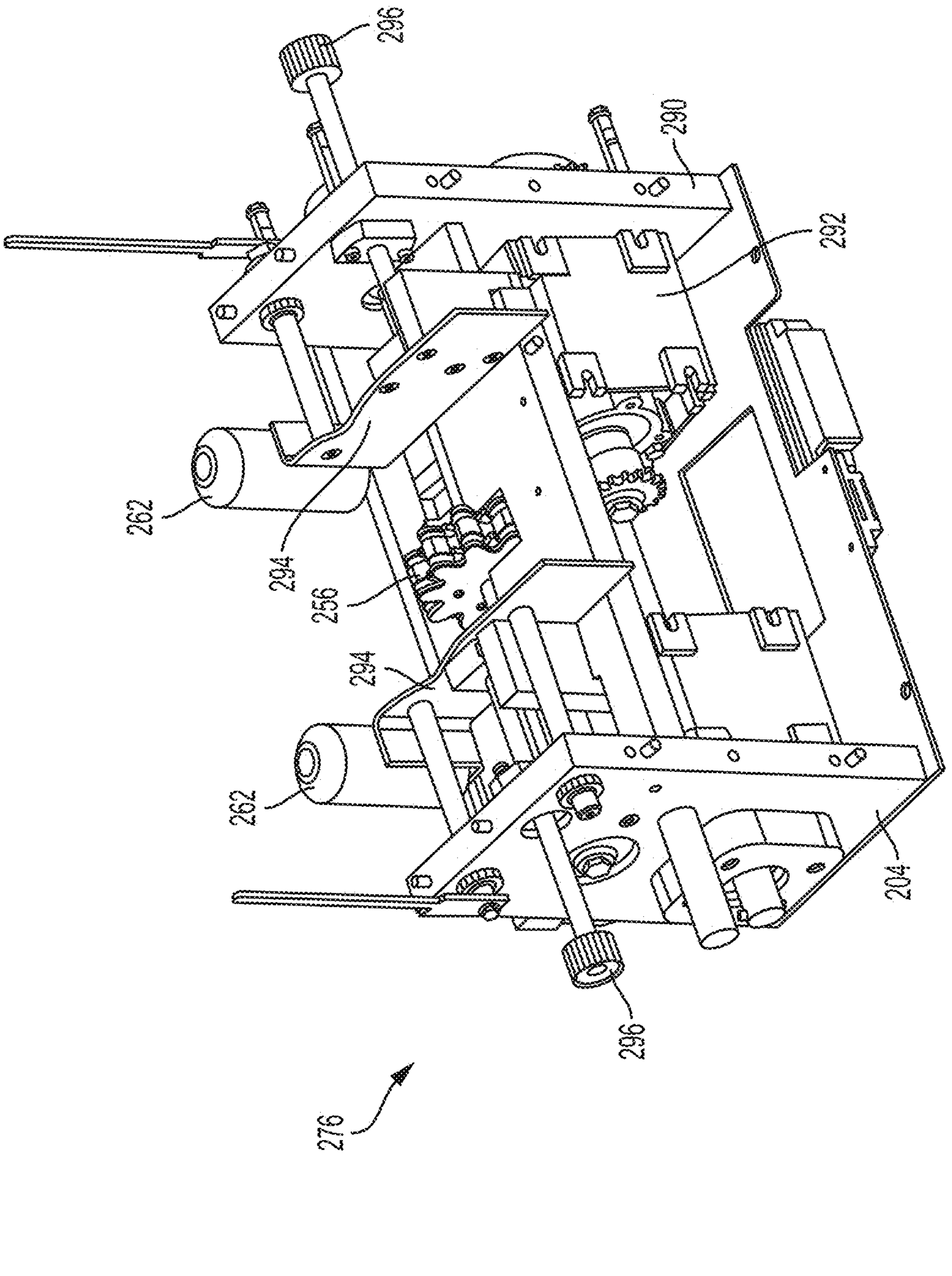
FIG. 38 is a perspective view of a subassembly of the dunnage conversion machine of FIG. 26.

The lower driven gear 256 is mounted to a portion of the frame 204 that can be removed as a unit 276, as shown in FIG. 38. This unit or subassembly 276 forms part of the feeding/connecting assembly 236 and includes frame elements 290 having a generally U-shape cross-section perpendicular to the downstream direction, the motor 274 (FIG. 33), and a gearbox 292 mounted to the frame elements 290 and coupled between the motor 274 and the driven gear 256 (FIG. 33) for adjusting the rotational speed of the driven gear 256.

Figure 39:
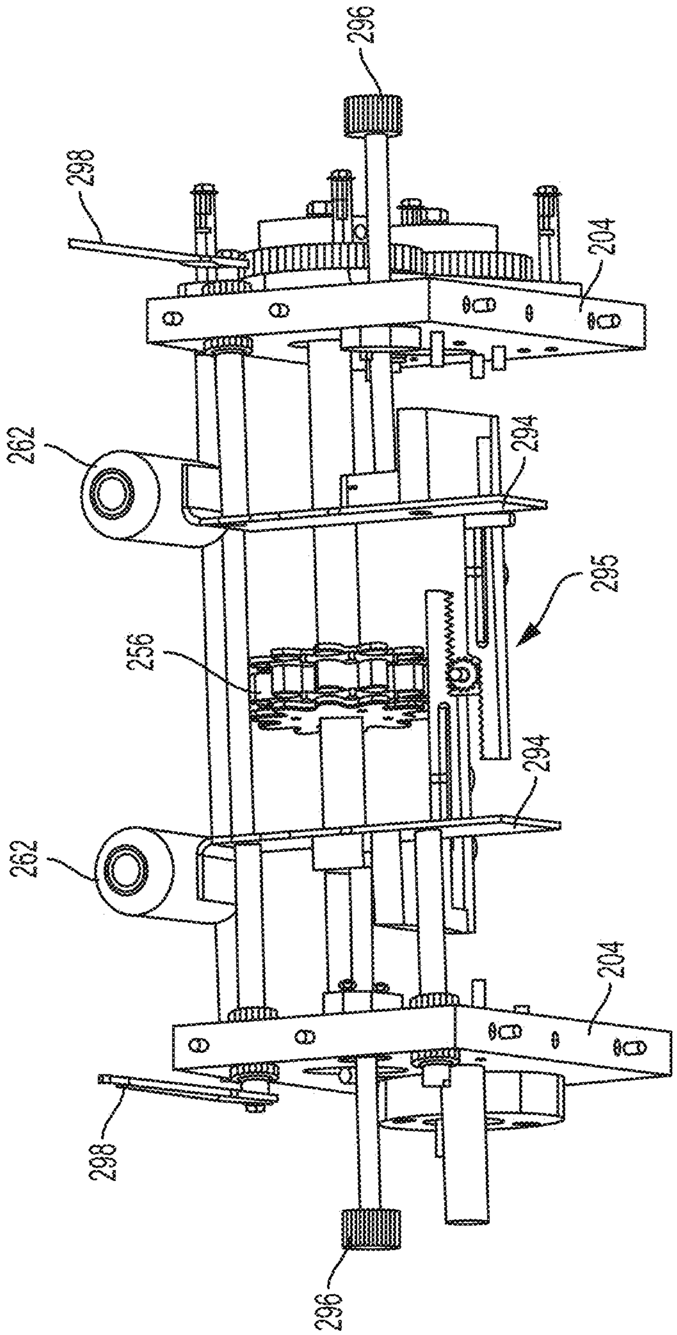
FIG. 39 is a perspective view of select components of the subassembly of FIG. 38.

The subassembly 276 further includes generally upright rotatable members, including both the lateral guide rollers 262 that define a width of the strip of dunnage before passing the gears 256 and 258, and laterally-adjustable chute walls 294 bounding the driven gear 256 to contain and guide the strip of dunnage through the connecting gears 256 and 258. The motor 274 also drives the lower feed wheel 254 through a drive link (not shown), and the feed wheels 254 and 255 are driven to advance the sheet stock material therethrough at the same rate as it is driven through the gears 256 and 258. A rack-and-pinion gear arrangement, best seen in FIG. 39, provides simultaneous lateral adjustment of both the lateral chute walls 294 and the lateral guide rollers 262 to define the maximum width of the dunnage passing therethrough, and the width may be controlled by either of a pair of control knobs 296 extending outside respective opposing frame elements 290 and outside the housing 210 (see FIG. 19). The subassembly 276 includes indicators 298 outside respective frame elements 290 that move with the chute walls 294. The indicators 298 are visible through slots in the housing 210 (see FIG. 24) to provide feedback to the operator without having to open the housing 210. Synchronous movement of the lateral chute walls 294 and the lateral guide rollers 262 also facilitates forming dunnage pads of different widths by ensuring that the center of the strip of dunnage will pass between the gears 256 and 258. The gears 256 and 258 form the slits and tabs in overlapping layers of sheet stock material to fix the randomly crumpled sheet material in place, forming a substantially continuous strip of dunnage.

Figure 40:
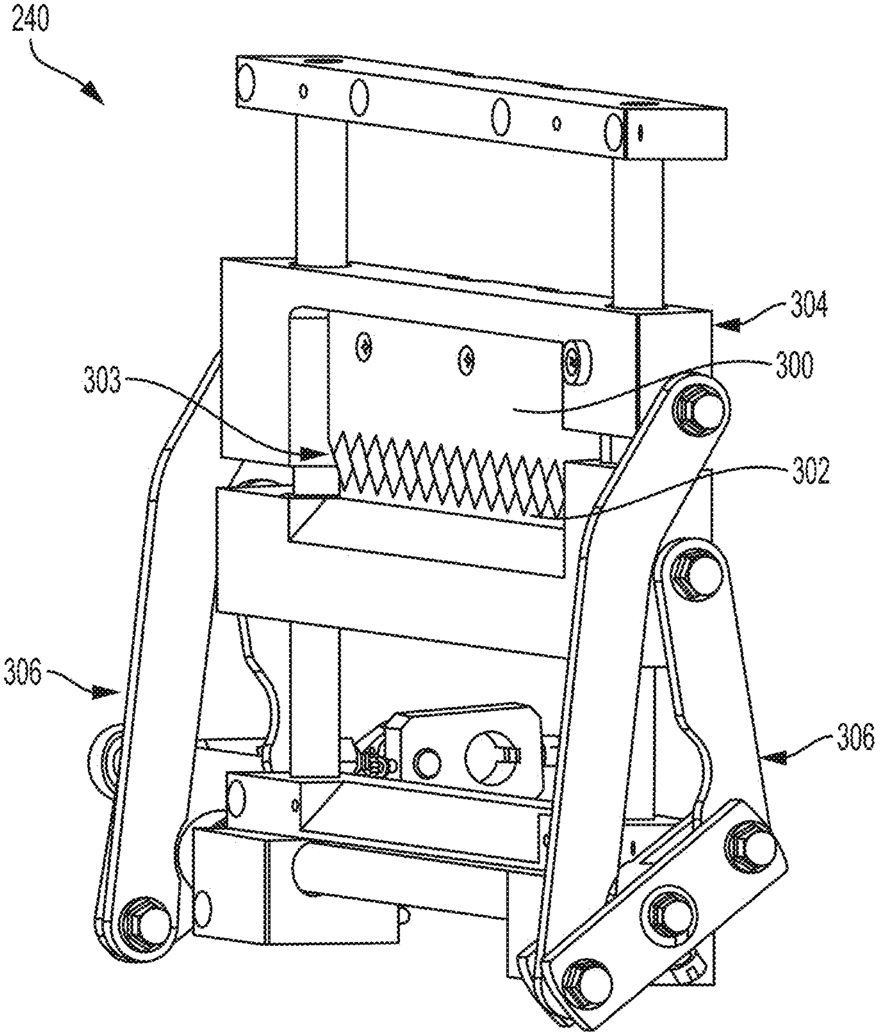
FIG. 40 is a perspective view of a cutting assembly of the dunnage conversion machine of FIG. 26.
Figure 41:
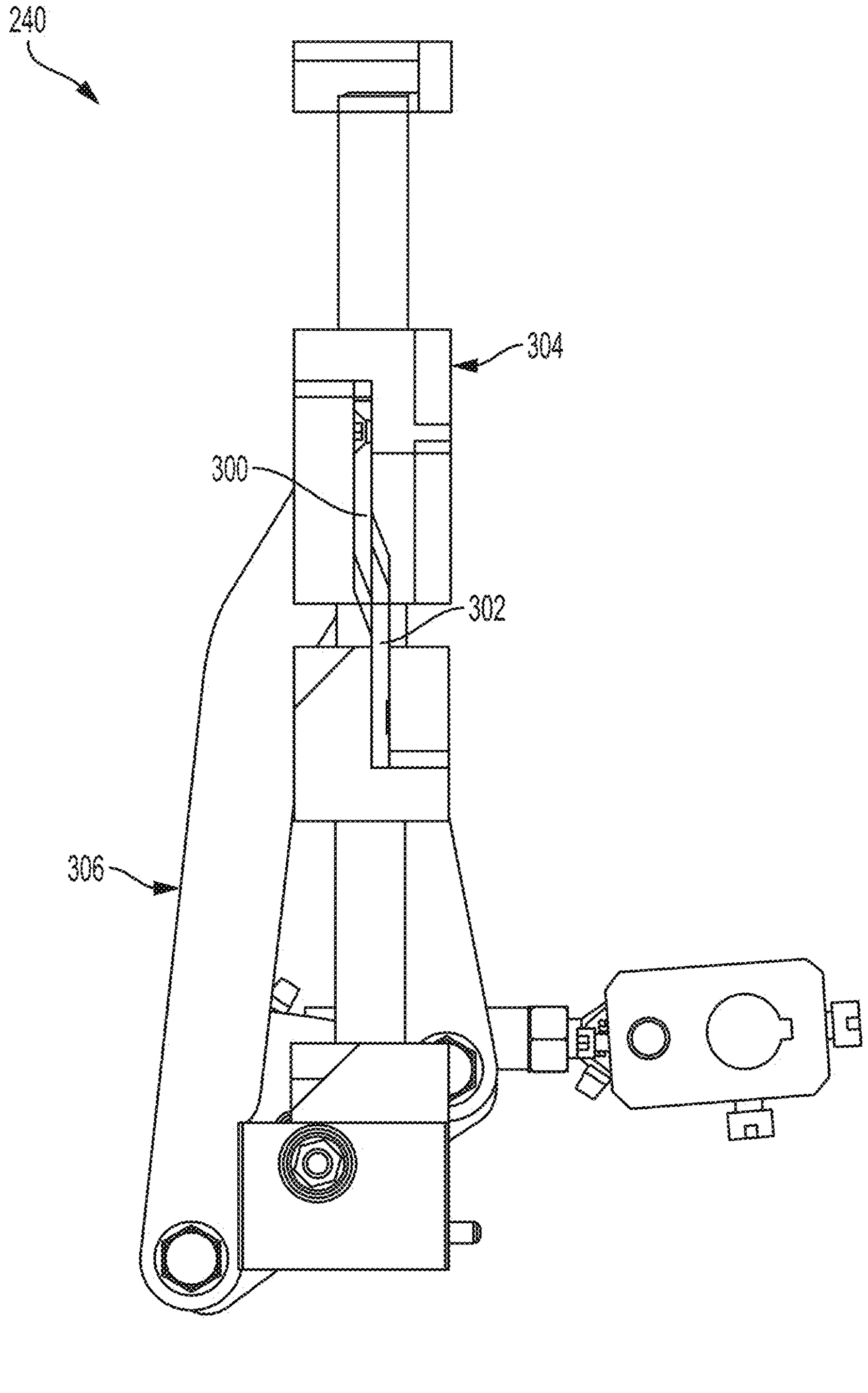
FIG. 41 is a cross-sectional side elevation view of the cutting assembly of FIG. 40.
Figure 42:
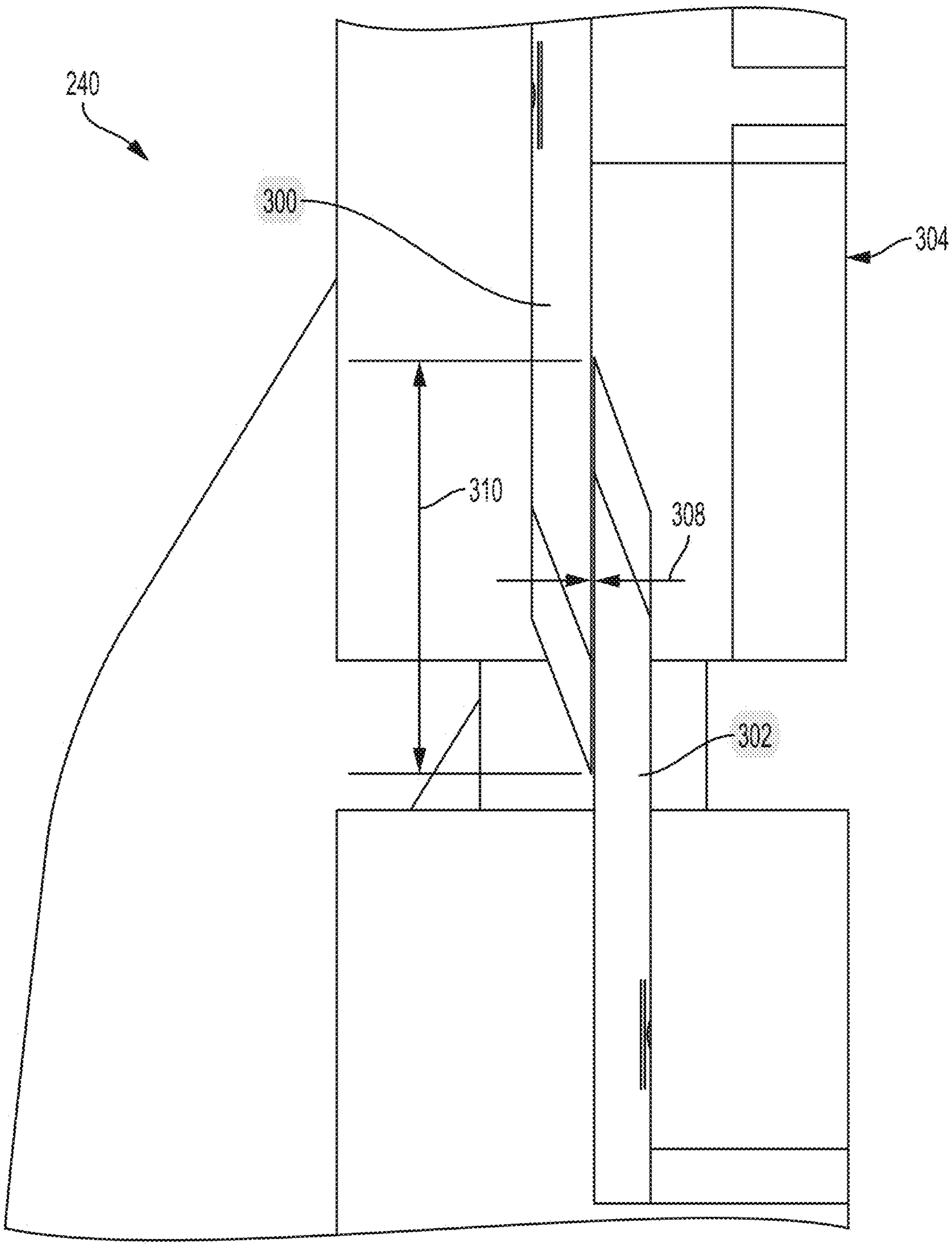
FIG. 42 is an enlarged view of a portion of the cutting assembly of FIG. 41.

Referring now to FIGS. 40-42, after connecting the overlapping layers of sheet material together, the feeding/connecting assembly 236 advances the substantially continuous strip of dunnage downstream to the severing assembly 240 to facilitate severing discrete dunnage products of desired lengths from the substantially continuous strip of dunnage. The severing assembly 240 includes a pair of cutting blades 300 and 302 with serrated teeth 303, coupled to a frame 304 that guides the relative movement of the blades 300 and 302, and a linkage mechanism 306 that coordinates movement of the blades 300 and 302 relative to one another. In the illustrated embodiment, the severing assembly 240 includes a lower blade 302 and an upper blade 300 that move from respective converting positions on opposing sides of a path of the strip of dunnage therebetween, across or transverse a path of the strip of dunnage, to severing positions closer to a center of the path and the strip of dunnage. The linkage mechanism 306 is coupled to a motor (not shown) to drive movement of the cutting blades 300 and 302. As the cutting blades 300 and 302 move to their respective severing positions, leading ends of each blade pass each other but leave a longitudinal gap 308 therebetween, parallel to the downstream direction. The leading ends of the serrated teeth 303 pass each other a sufficient distance 310 to weaken the strip of dunnage passing therebetween, if not completely sever a dunnage product from the strip of dunnage. If not completely severed, the cuts typically are sufficient to enable a packer to complete the separation with minimal effort. Because the cutting blades 300 and 302 have a longitudinal gap 308 therebetween, precise longitudinal adjustment of the position of the cutting blades 300 and 302 relative to each other is not necessary, simplifying setup and maintenance of the cutting blades 300 and 302.

Figure 43:
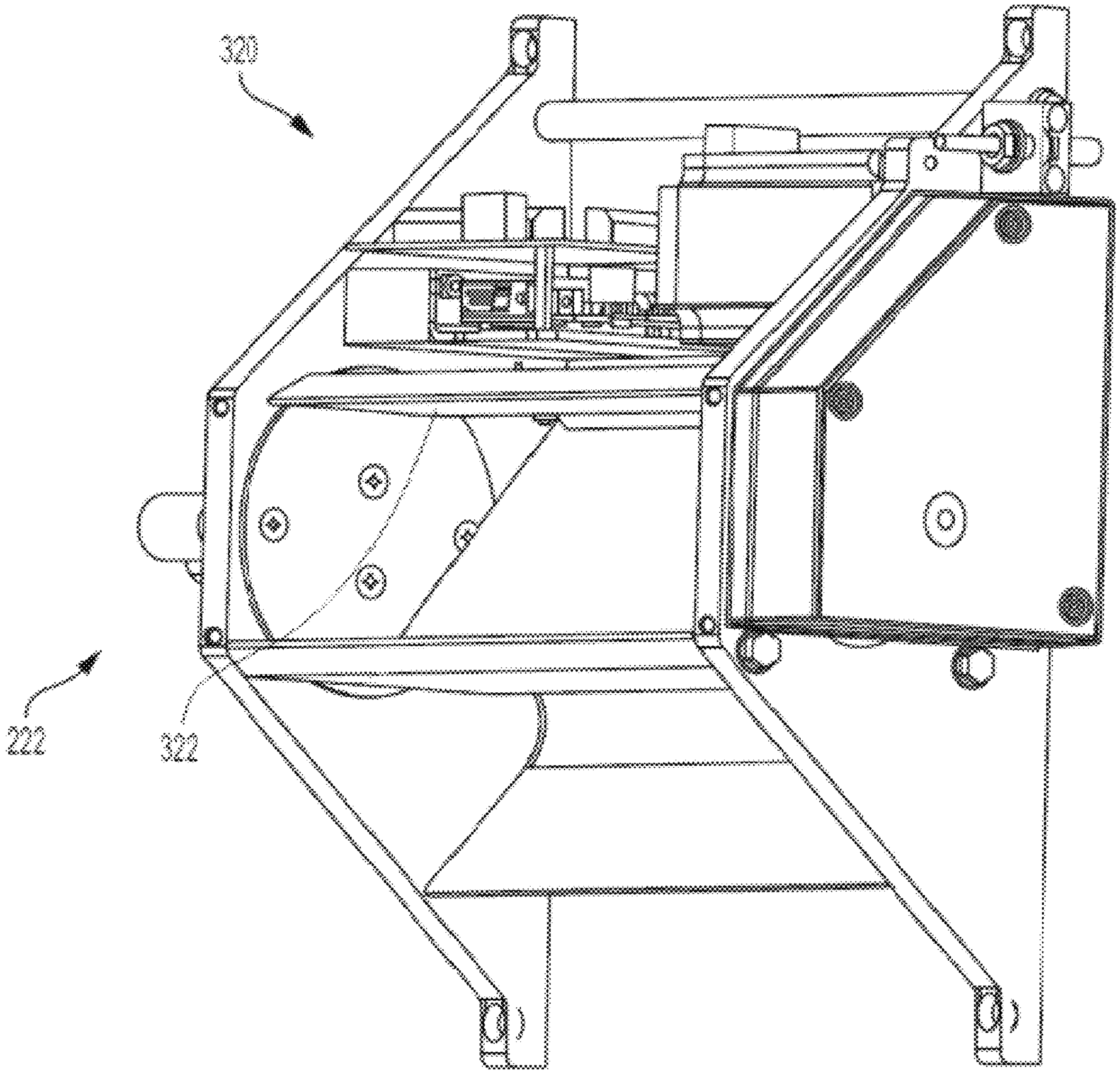
FIG. 43 is a perspective view of an outlet chute portion of the dunnage conversion machine of FIG. 26.
Figure 44:
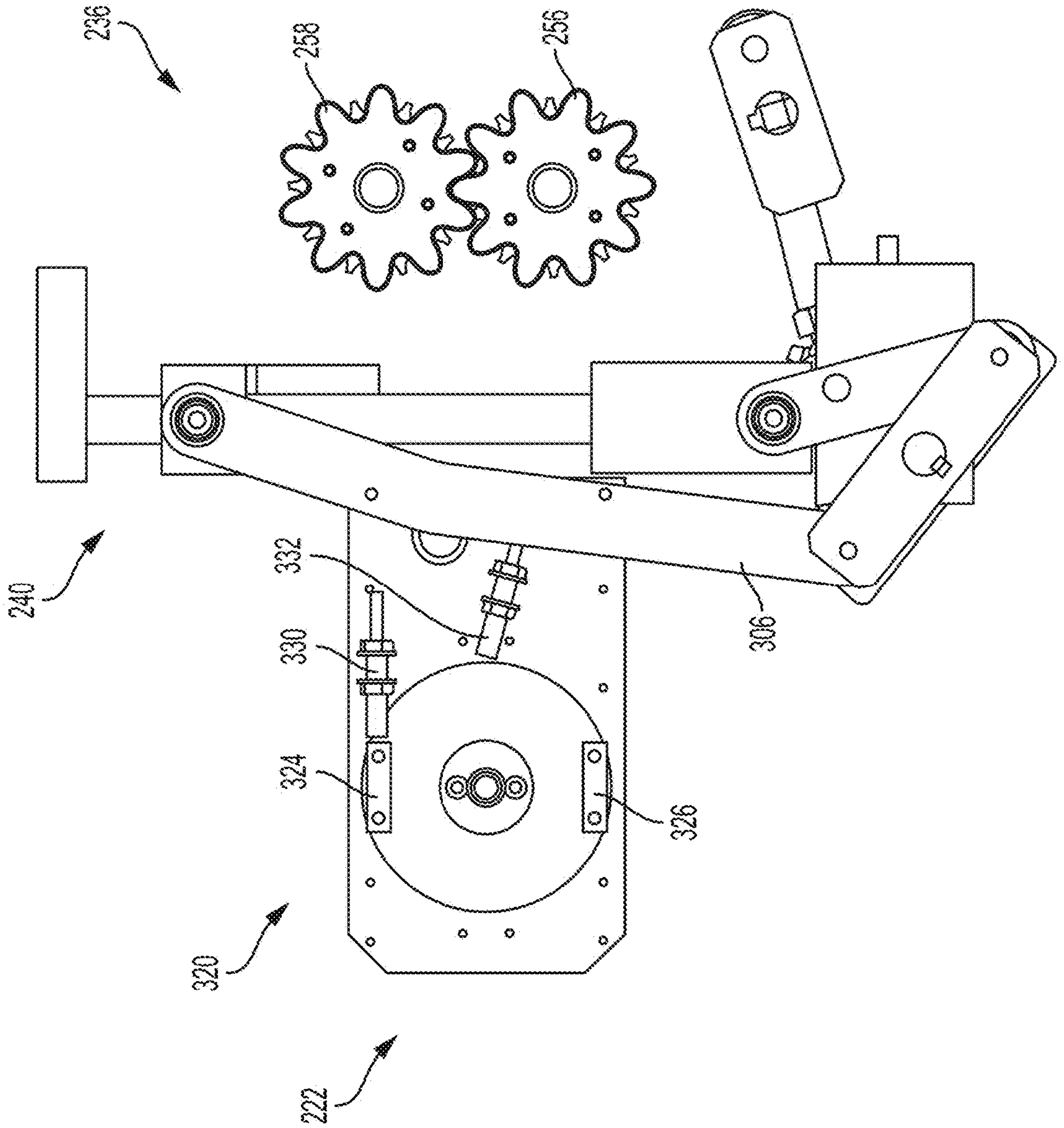
FIG. 44 is a right side elevation view of a rotating component in an operating position with a portion of an outer housing removed.
Figure 45:
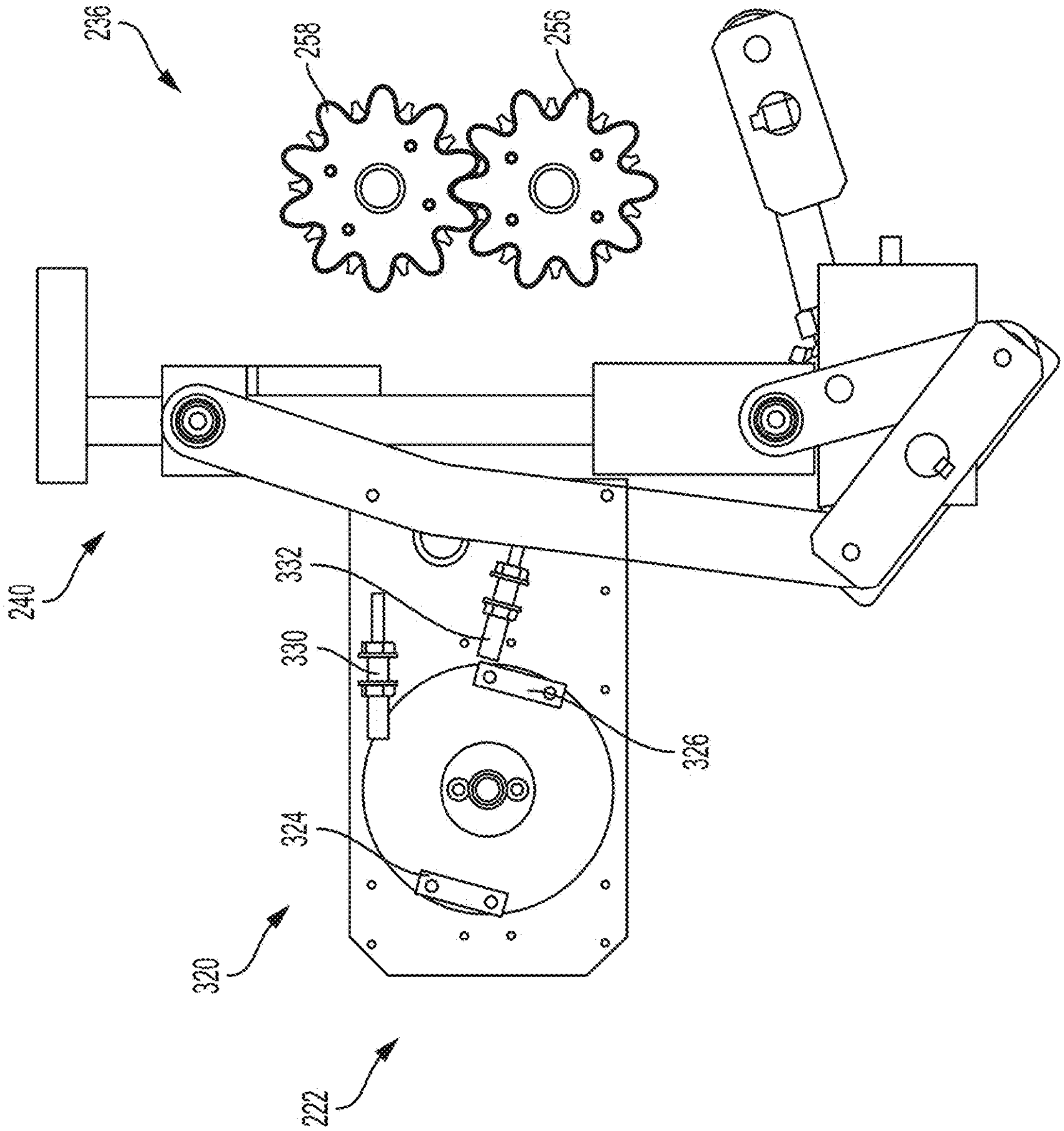
FIG. 45 is a right side elevation view of a rotating component in a cutting position with a portion of an outer housing removed.
Figure 46:
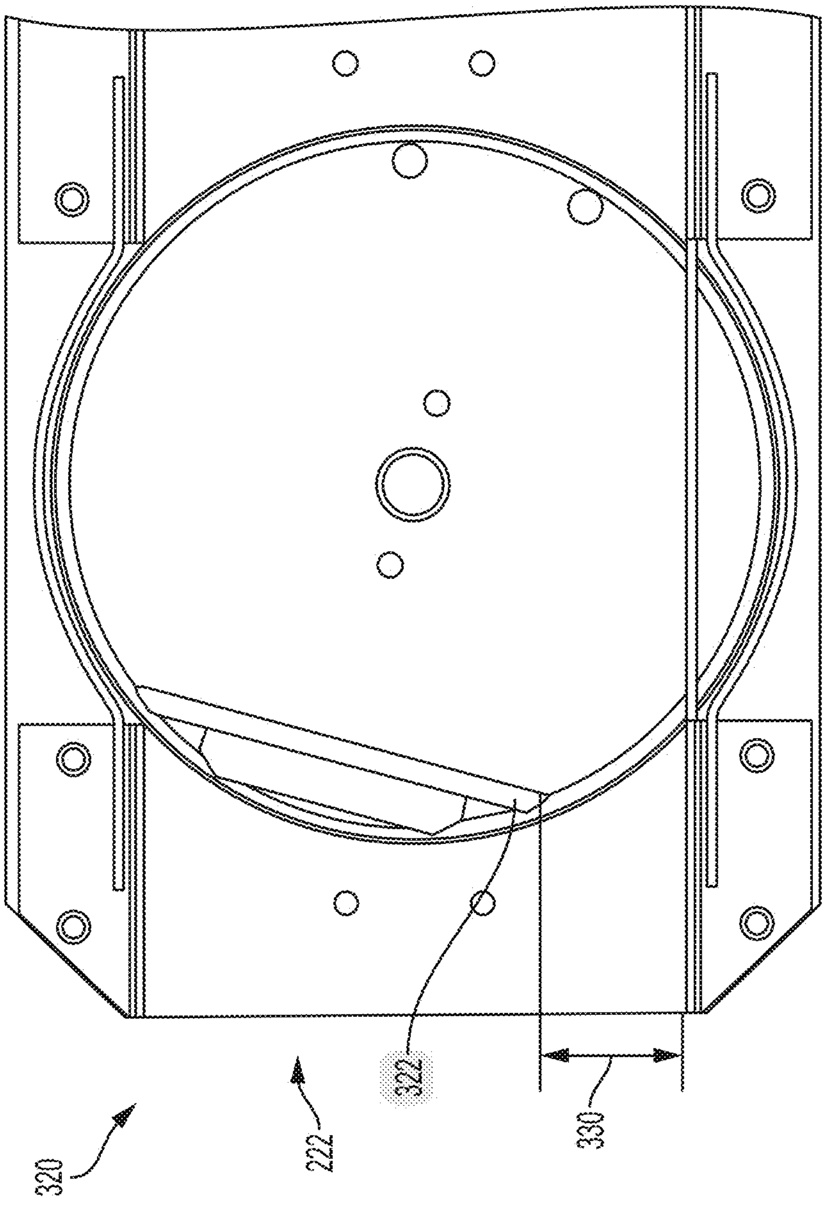
FIG. 46 is an enlarged cross-sectional view of the outlet chute portion of FIG. 43, as seen along lines 46-46 of FIG. 43.
Figure 47:
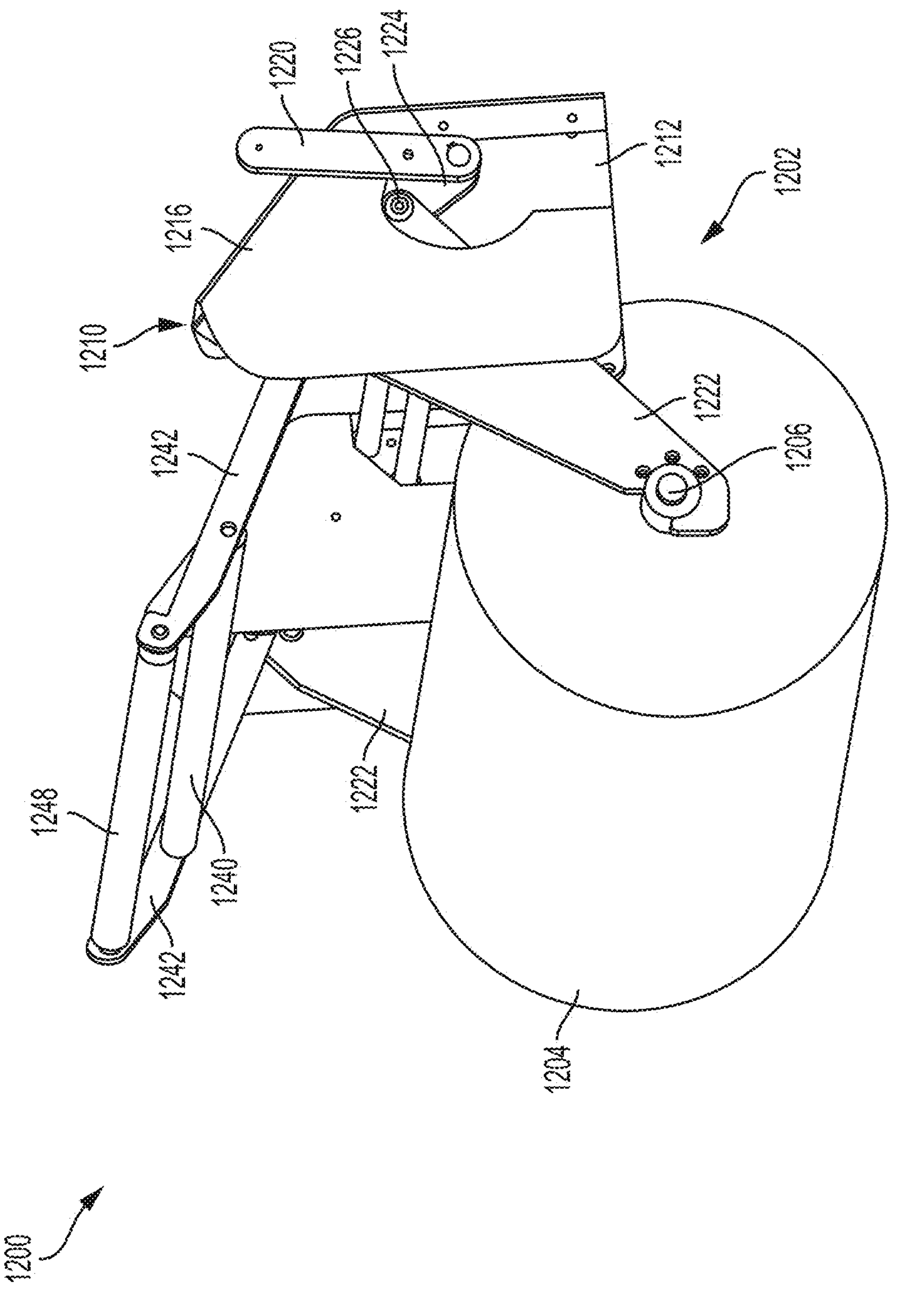
FIGS. 47-51 are perspective views of an exemplary stock supply assembly that includes a stock roll-loading mechanism that is movable between a loading position (FIGS. 47 and 51) and an operating position (FIGS. 48-50).

Turning to FIGS. 43-45, proceeding downstream from the severing assembly 240, the strip of dunnage extends through the severing assembly 240, into an output chute 320, and through the outlet 222 at the downstream end 224 of the conversion machine 200 (FIG. 33), from which the severed dunnage product is dispensed from the converter 200. The output chute 320 has a generally rectangular cross-section perpendicular to the downstream direction 201 (FIG. 33), and includes a rotating shield 322 that rotates from a dispensing position (FIG. 44) generally parallel to a wall of the chute 320 to an inclined closed position (FIGS. 45 and 46) transverse the walls of the chute 320 to minimize the height of a passage through the output chute 320 while the severing assembly 240 is active. The strip of dunnage typically is flexible enough to compress under the shield 322 and sufficiently resilient not to be unduly damaged in the process. An exemplary gap between a distal end of the shield 322 and an opposing wall of the chute is about 20 mm, with a distance of at least about 120 mm between the distal end of the shield 322 and the cutting blades 300 and 302 of the severing assembly 240.

Guide blocks 324 and 326 mounted outside the output chute 320 and rotatable with the shield 322 are used in conjunction with one or more sensors 334 and 336, such as proximity sensors, to detect the position of the shield 322 inside the output chute 320. As shown, when the shield 322 is in the open or dispensing position, the open guide block 324 is detected in proximity to the open sensor 334 (FIG. 44). And when the shield 322 is rotated to the closed position, the open guide block 324 moves away from the open sensor 334 and the closed guide block 326 moves toward and is detected in proximity to the closed sensor 336. A controller (not shown) is configured to provide power to the severing assembly 240 only when the shield 322 is detected in the closed position, shown in FIGS. 45 and 46. If the shield 322 moves from the closed position, the controller automatically stops the severing assembly 240. While the illustrated embodiment employs guide blocks 324 and 326 visible outside the chute 320 in conjunction with the sensors 334 and 336, other means for monitoring the position of the shield 322 may be employed.

The resulting dunnage product is substantially similar to the dunnage product produced by the dunnage converter provided by the preceding embodiment.

Although the feeding/connecting assembly 236 can advance the sheet stock material therethrough at a relatively higher speed than prior feeding/connecting assemblies, when a new supply of sheet stock material is spliced to an expiring supply of sheet stock material, there may be problems with tearing near the spliced connection at higher speeds. Tearing is minimized in the present conversion machine 200 by reducing the speed at which the stock material is being fed through the feeding/connecting assembly 236 until the spliced connection has passed through the feeding/connecting assembly 236. A sensor (not shown) associated with the stock supply assembly (not shown) detects a trailing end of an expiring supply of sheet stock material, which may be used as a signal to stop the feeding/connecting assembly 236 until a leading end of a new supply of sheet stock material has been spliced to the trailing end of the expiring supply of sheet stock material.

Splicing may be quickly performed using a pre-applied adhesive on either the leading end of the new stock material or the trailing end of the expiring stock material, and the conversion machine 200 can resume producing dunnage without opening the conversion machine 200 to thread the leading end into the feeding/connecting assembly 236. When the conversion machine 200, and particularly the feeding/connecting assembly 236 are restarted after the detection of the trailing end of an expiring supply of sheet stock material, the feeding/connecting assembly will pull the sheet stock material therein at a lower rate, below the normally-higher feed rate for the feeding/connecting assembly 236 for a predetermined time designed to allow the leading end of the new supply of sheet stock material to be pulled into and to travel through the feeding/connecting assembly 236. A similar lower feed-speed may be employed when feeding a new supply of sheet stock material into the conversion machine 200 even when there is no preceding supply of sheet stock material to splice. A special button may be provided toward an upstream end of the conversion machine to initiate the slower feeding speed. This method of avoiding tearing in sheet stock material can be employed in other types of dunnage conversion machines and is not limited to the illustrated conversion machine 200. All that is required is an end-of-web sensor to detect the end of a supply of sheet stock material, and to provide a predetermined delay before increasing the speed after detecting the end of the web of sheet stock material.

Another exemplary stock supply assembly 1200 provided by the invention is shown in FIGS. 47-51. The stock supply assembly 1200 includes a stock roll loading mechanism 1202, also called a stock roll lifter, that can be mounted to a base portion of a stand (not shown), as in the previous embodiment shown in FIG. 1. The stock roll loading mechanism 1202 facilitates lifting a roll of sheet stock material 1204 from a loading position on the floor and rotatably supporting the stock roll 1204 at an elevated operating position for feeding sheet stock material to a conversion assembly. The stock roll 1204 is provided with an axle 1206 that extends from both sides of a hollow core of the stock roll 1204 and defines an axis about which the stock roll 1204 may rotate as the sheet material is withdrawn from the outer surface of the roll 1204.

The stock roll loading mechanism 1202 includes a frame 1210 having a pair of laterally-spaced upright frame members 1212 that provide structural support for a linkage 1214. The linkage 1214 may be protected by sheathing elements 1216. The sheathing elements 1216 have been removed from FIGS. 49-51 to further reveal the frame members 1212 and the linkage 1214.

Figure 48:
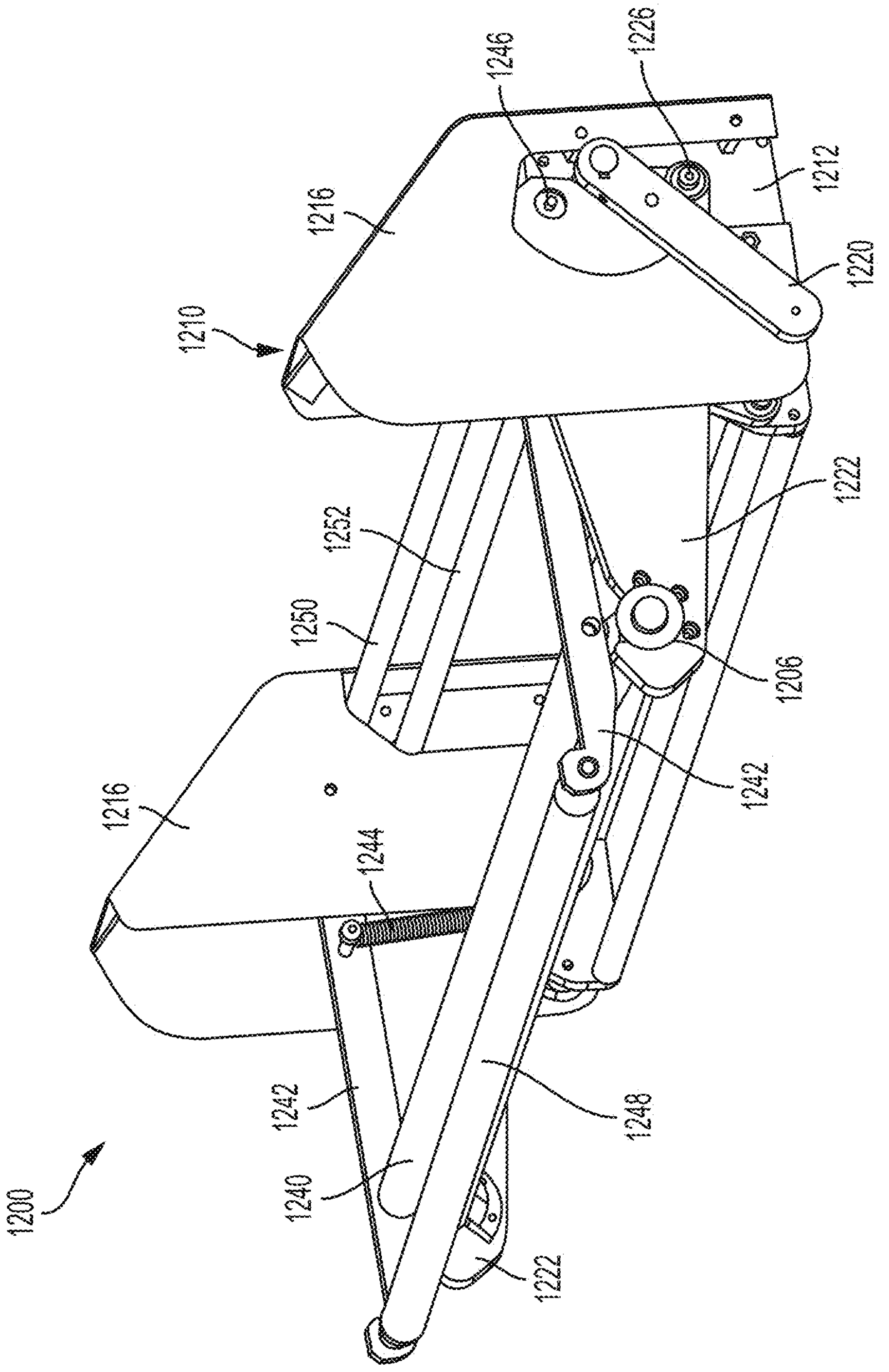
Figure 49:
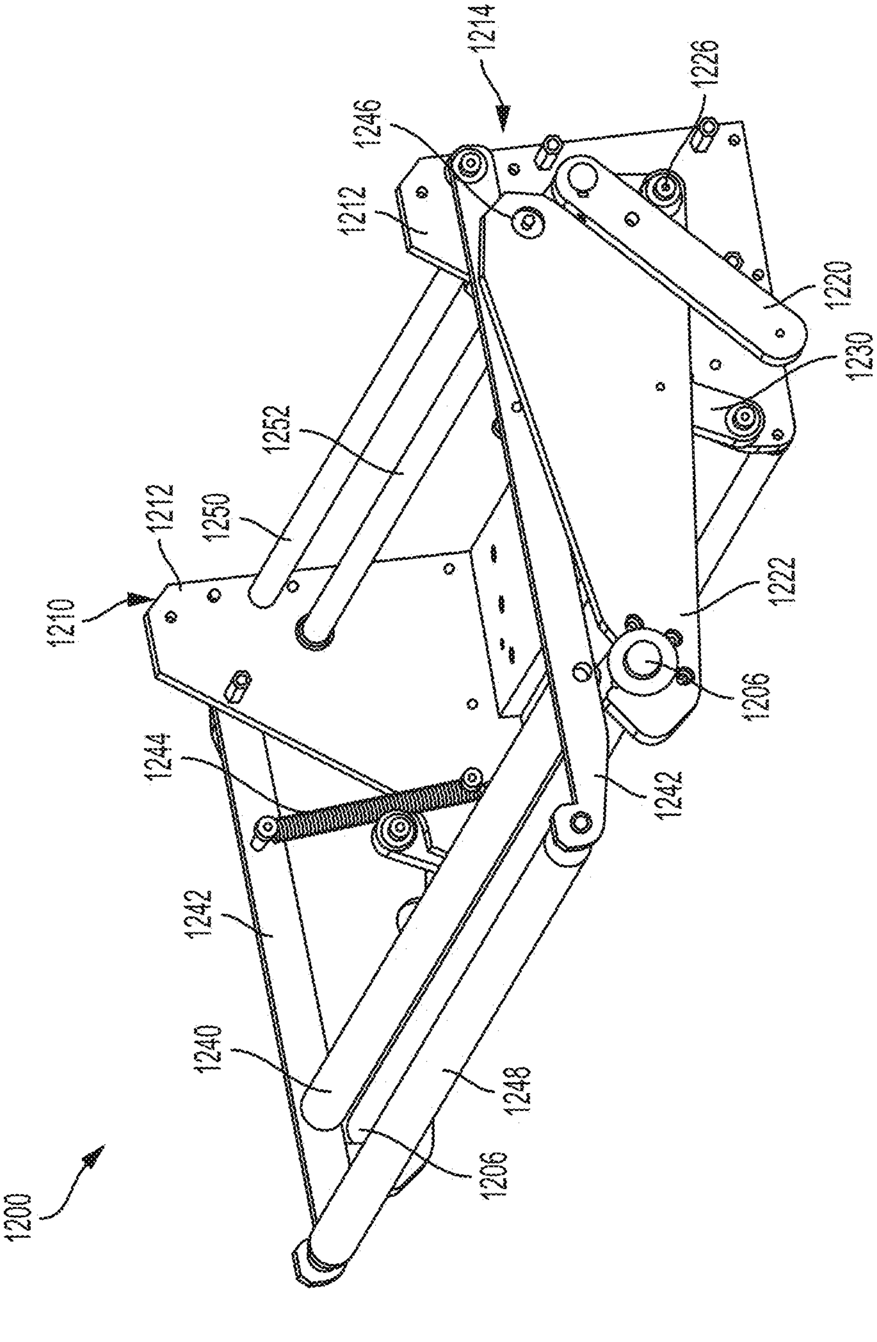
Figure 50:
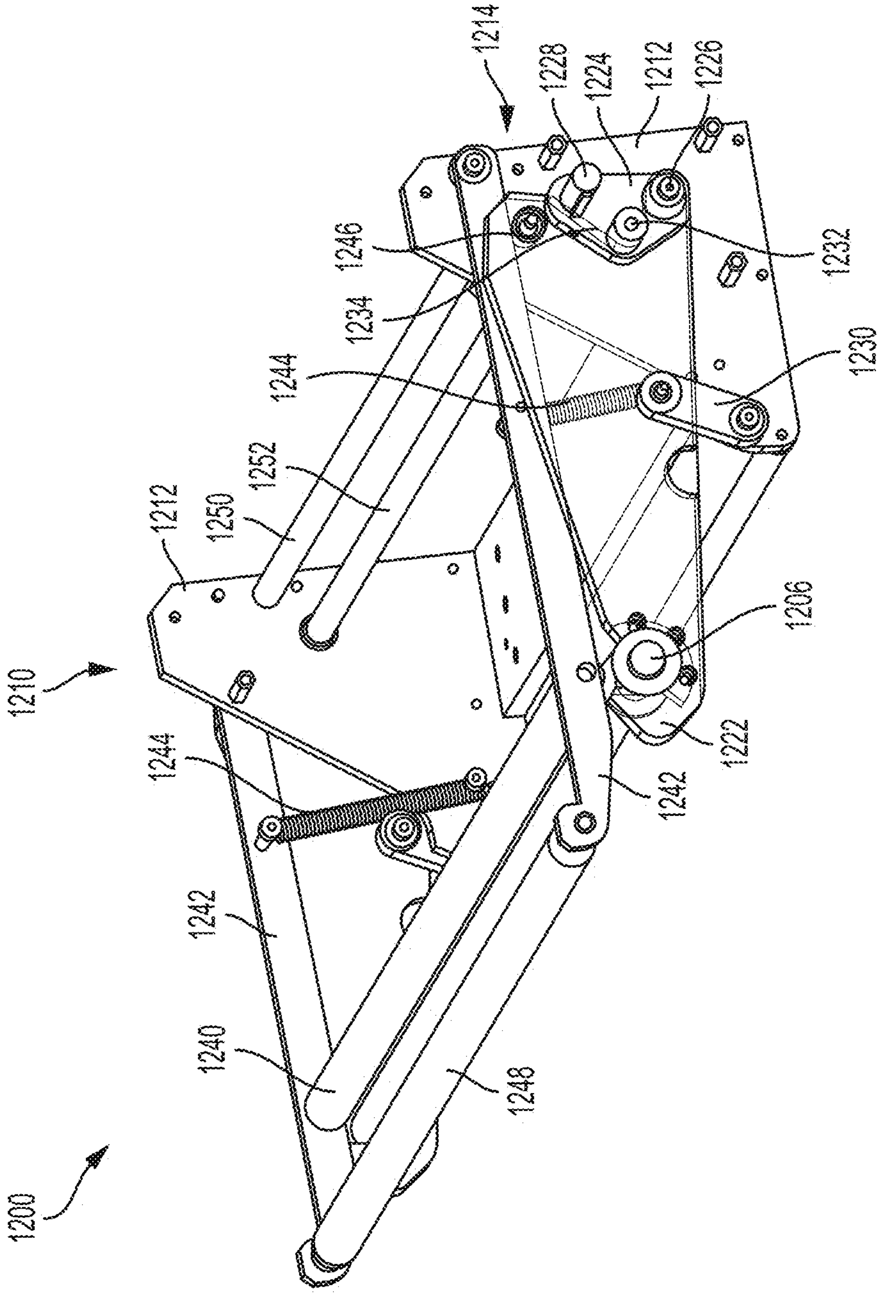
Figure 51:
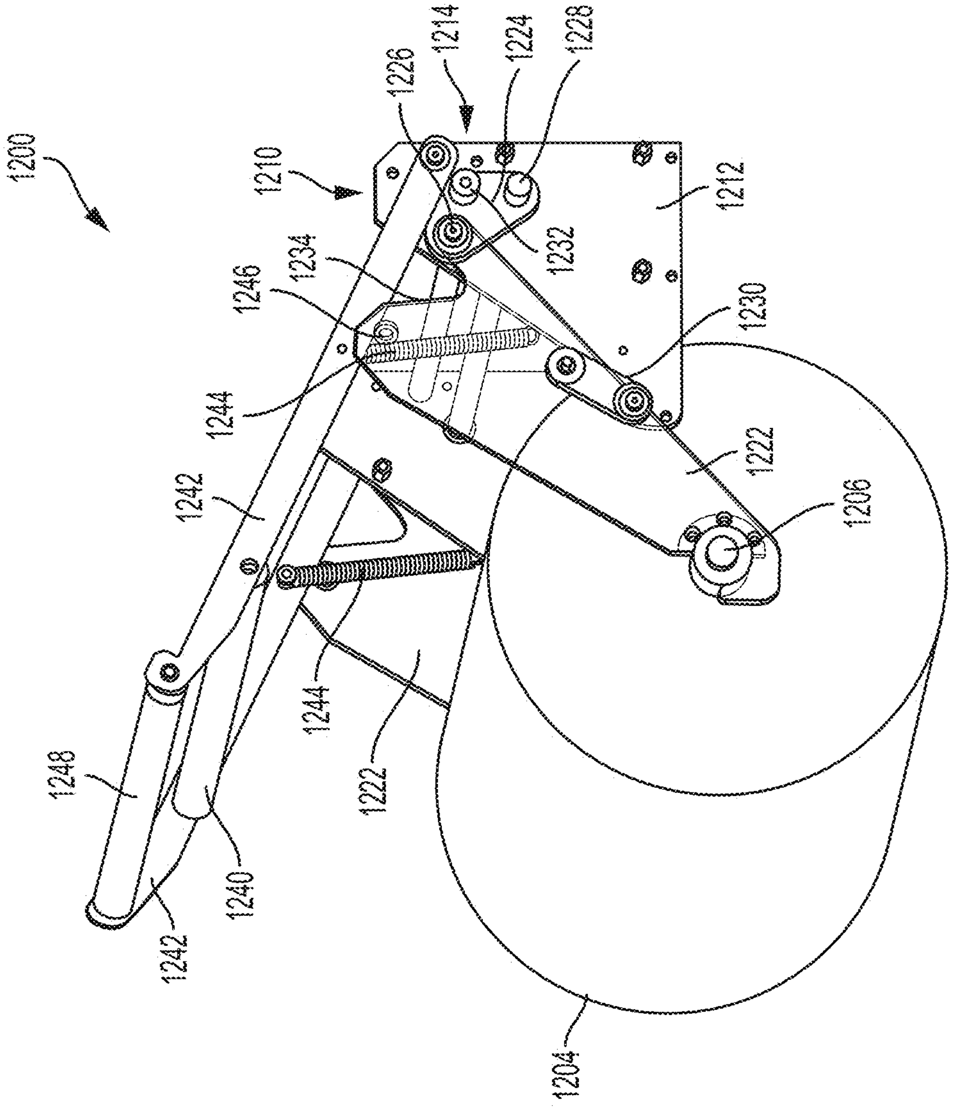

The linkage 1214 generally includes duplicate components connected to respective frame members 1212, with only a few connecting elements, which will be described further below. One exception is that one side of the illustrated linkage 1214 includes a crank arm 1220 (omitted from FIGS. 50 and 51) that may be coupled to a handle or a foot pedal for driving the linkage 1214 between a loading orientation in the loading position (FIGS. 47 and 51) to an operating orientation in the operating position (FIGS. 48-50). For simplicity, the focus of the description will be on the crank-arm side of the linkage 1214, with the understanding that the opposite side is substantially identical. A crank arm 1220 may be provided at either side, or both sides, of the linkage 1214.

The linkage 1214 includes parallel, spaced stock roll lifter arms 1222 with upwardly-facing notches toward a distal end that may engage the axle 1206 to raise the stock roll 1204 from the loading position (FIGS. 47 and 51) to the elevated operating position (FIGS. 48-50). The stock roll lifter arms 1222 are not directly connected to the upright frame members 1212. A proximal end of the stock roll lifter arm 1222 is rotatably coupled to a cam 1224 at a lifter arm pivot 1226, and the cam 1224 is pivotally mounted to the upright frame member 1212 at a cam pivot 1228. Motion of the stock roll lifter arm 1222 is constrained by a support link 1230, pivotally connected to the stock roll lifter arm 1222 at an intermediate point between the proximal end and the distal end of the stock roll lifter arm 1222. The support link 1230 is pivotally connected to the upright frame member 1212 and may help support the weight of the stock roll 1204.

The crank arm 1220 is coupled to the cam 1224 at the cam pivot 1228 and at a bearing member 1232 mounted to the cam at a location spaced from the cam pivot 1228. The crank arm 1220 may be used to move the stock roll lifter arms 1222 from the loading position (FIGS. 47 and 51), with a distal end of the stock roll lifter arms 1222 at a lower elevation for receiving and engaging the ends of the stock roll axle 1206, and the elevated operating position (FIGS. 48-50), where the stock roll 1204 can freely rotate as sheet stock material is drawn from the roll 1204 and fed into the conversion machine. As the stock roll lifter arms 1222 rotate, the bearing member 1232 extending from the cam 1224 engages a bearing surface 1234 at the proximal end of the stock roll lifter arm 1222.

In addition to the stock roll loading mechanism 1202, the stock supply assembly 1200 may also include a friction bar 1240, as shown, that rests against an outer surface of the stock roll 1204 in the operating position and creates friction to limit continued rotation of the stock roll 1204 when the conversion assembly stops drawing sheet material from the roll 1204. In other words, the friction bar 1240 helps to minimize or to prevent overrun, and helps to maintain a consistent tension in the sheet material, even as the sheet stock material is drawn from an increasingly smaller roll. The friction bar 1240 is connected to the stock roll loading mechanism 1202 through the linkage 1214 such that the friction bar 1240 moves toward the distal end of the stock roll lifter arms 1222, and the stock roll 1204, if present, when the stock roll lifter arms 1222 move from the loading position to the operating position. The friction bar 1240 moves away from the stock roll lifter arms 1222 when the stock roll lifter arms 1222 move from the operating position to the loading position. Specifically, the friction bar 1240 is mounted toward a distal end of a pair of pivot arms 1242 pivotally mounted to respective ones of the upright frame members 1212. A spring 1244 mounted between an intermediate point on the pivot arm 1242 and the upright frame member 1212 biases the pivot arm 1242, and thus the friction bar 1240, toward the notches at the distal end of the stock roll lifter arm 1222, and thus a stock roll 1204 supported in the stock roll lifter arms 1222. A bearing 1246 mounted toward the proximal end of the stock roll lifter arm 1222 engages a lower surface of the pivot arm 1242 and moves the pivot arm 1242 upward, automatically moving the friction bar 1240 away from the proximal end of the stock roll lifter arm 1222, as the stock roll lifter arm 1222 moves from the operating position to the loading position. Under the influence of the spring 1244, the pivot arm 1242 and the friction bar 1240 are biased toward the stock roll 1204 as the stock roll lifter arms 1222 lift the stock roll 1204 from the loading position to the operating position.

Along with the friction bar 1240, the pivot arms 1224 may further support a constant entry member 1248 at a distal end to provide a consistent point of entry for the stock material passing from the stock roll 1204 to the conversion machine. Additional transverse members 1250 and 1252 extend between and further support the upright frame members 1212. Transverse member 1252 is aligned with the bearing 1246 and is coupled to the roll lifter arms 1222 to couple rotation of the roll lifter arms 1222 on respective sides of the linkage 1214.

The constant entry member 1248 is rotatably mounted to the pivot arms 1242, and not only provides a consistent point of departure as the diameter of the stock roll 1204 decreases, but also acts like a dancer roller upon startup. When the stock roll 1204 is at rest, the inertia of the stock roll 1204 must be overcome to get it to rotate and thus pay off stock material. Having the friction bar 1240 in contact with the stock roll 1204 inhibits the efforts of the conversion machine to draw sheet stock material from the roll and cause the stock roll 1204 to rotate. By mounting both the friction bar 1240 and the constant entry member 1248 to the pivot arms 1242, an increase in tension in the sheet stock material passing over the constant entry member 1248, such as at startup, when the stock roll 1204 is at rest, causes the pivot arms 1242 to rotate away from the stock roll 1204, relieving the tension in the stock material and also removing the friction bar 1240 from the stock roll 1204 so that the stock roll 1204 may freely rotate. Once the tension in the sheet material decreases, such as when the stock roll 1204 is rotating at a sufficient rate to pay off sheet material at the rate requested by the conversion machine, the spring force applied by the springs 1244 overcomes the tension and rotates the pivot arms 1242 until the friction bar 1240 engages the outer surface of the stock roll 1204 once again. If the conversion machine stops drawing sheet material, the friction bar 1240 also minimizes or eliminates continuing rotation of the stock roll 1204. Continued rotation of the stock roll 1204 would create a loose loop of sheet stock material, and as that loose stock material is taken up by the conversion machine upon restart, the tension can increase in the stock material suddenly, leading to tearing or other problems. Maintaining a consistent tension in the stock material is thus advantageous in producing a consistent dunnage product and in preventing tearing of the stock material or other problems.

The stock supply assembly 1200 provided by the invention thus makes loading a stock roll easier, and via the friction bar 1240 and associated linkage 1214 includes automatically-applied features that help to maintain consistent tension on sheet material being fed from the stock supply assembly 1200 to the conversion assembly.

In summary, the present invention provides a conversion assembly 34 for a dunnage conversion machine 30 that includes both a downstream pair of rotatable members 142 and 144 and an upstream pair of rotatable members 146 and 148 upstream of the downstream rotatable members 142 and 144. The downstream rotatable members 142 and 144 include a pair of gears, and each gear has a plurality of teeth and is rotatable about a respective axis. The gears are positioned so that the teeth of one gear are sequentially interlaced with the teeth of the other gear as the gears rotate. The upstream rotatable members 146 and 148 include a pair of feed wheels, and the gears and the feed wheels define a path for a sheet stock material from between the upstream pair of feed wheels to between the downstream pair of gears. The rate at which the sheet stock material is advanced by the feed wheels is the same as the rate at which the sheet stock material is advanced by the gears.

Although the invention has been shown and described with respect to certain embodiments, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

The invention claimed is:

1. A stock supply assembly including: a stock roll loading mechanism having a pair of laterally spaced arms, the arms being pivotably mounted for rotation between a loading position for engaging an axle for a roll of sheet stock material and an operating position different from the loading position, a friction member pivotally mounted to rest against the roll in the operating position, and a linkage connecting the arms to the friction member such that the friction member moves toward the arms when the arms move from the loading position to the operating position and away from the arms when the arms move from the operating position to the loading position.

2. A dunnage conversion machine having a conversion assembly, a stock supply assembly that supports a supply of sheet stock material, and a constant entry member interposed in a path of the sheet stock material between the stock supply assembly and the conversion assembly, the constant entry member being mounted for pivotable movement about an axis spaced from the constant entry member, the constant entry member being biased to an operating position, wherein the constant entry member is centrally supported by a support member contacting a center of the constant entry member, the support member being pivotably mounted to a frame of the dunnage conversion machine, wherein a spring is interposed between the frame and the support member to bias the constant entry member toward the operating position.

3. The dunnage conversion machine as set forth in claim 2, wherein the spring is mounted to an arm connected to the frame, the arm having a collar adjustably secured thereto for adjusting a stiffness of the spring.

4. The dunnage conversion machine as set forth in claim 3, further including a latch link connecting a distal end of the arm supporting the spring to the frame, the latch link being rotatable in a first direction for moving the constant entry member from the operating position to a loading position, and being rotatable in a second direction opposite to the first direction for moving the constant entry member from the loading position to the operating position.

5. A dunnage conversion machine comprising:

a conversion assembly that converts a sheet stock material into a strip of relatively lower density dunnage;

the conversion assembly including a forming assembly that inwardly turns lateral regions of the stock material and randomly crumples the stock material as the stock material travels therethrough to form a crumpled strip;

the forming assembly including an external forming device and an internal forming device;

the external forming device having an inlet, an outlet relatively smaller than the inlet, and surfaces therebetween that define an internal space;

the internal forming device being positioned relative to the external forming device within the internal space so that the stock material passes through the internal space and around the internal forming device as it travels through the external forming device;

the internal forming device having portions with laterally outer edges which at least partially define a turning perimeter around which the lateral regions of the sheet stock material inwardly turn;

the internal forming device having a continuous sheet that is bent to form a continuous bottom surface and continuous lateral side surfaces extending in a common direction from the bottom surface, the lateral side surfaces converging toward each other at downstream ends of the lateral side surfaces; and the internal forming device having outwardly-expanding cones expanding outwardly from the downstream ends of the lateral side surfaces, a downstream end of the bottom surface contacting the cones.

6. A dunnage conversion machine as set forth in claim 5, wherein the internal forming device includes a pair of laterally spaced apart extensions at an upstream end of the bottom surface which extend from the bottom surface in an upstream direction away from a downstream end of the internal forming device.

7. A dunnage conversion machine as set forth in claim 5, wherein the forming assembly includes a forming plow spaced from a downstream end of the cones opposite the bottom surface to restrict a height of the strip of dunnage.

8. The dunnage conversion machine as set forth in claim 5, wherein a body portion of the internal forming device is made of sheet-metal to form the continuous bottom surface and the continuous lateral side surfaces.

* * * * *